United States Patent [19]
Crabbe

[11] 3,867,423

[45] Feb. 18, 1975

[54] DIFLUOROMETHYLENE SUBSTITUTED PROSTAGLANDIN DERIVATIVES

[75] Inventor: Pierre Crabbe, Grenoble, France

[73] Assignee: Syntex (U.S.A.) Inc., Palo Alto, Calif.

[22] Filed: July 13, 1973

[21] Appl. No.: 379,127

Related U.S. Application Data

[63] Continuation-in-part of Ser. No. 287,333, Sept. 8, 1972, abandoned.

[52] U.S. Cl..... 260/468 D, 260/240 R, 260/243.56, 260/343.2 R, 260/346.2 M, 260/501.11, 260/501.17, 260/514 D, 424/305, 424/317
[51] Int. Cl... C07c 61/32, C07c 61/36, C07c 61/74
[58] Field of Search..................... 260/468 D, 514 D

[56] References Cited
OTHER PUBLICATIONS
Kirmse, Carbene Chemistry, 2nd ed., p. 314, (1971).

*Primary Examiner*—Robert Gerstl
*Attorney, Agent, or Firm*—Gerard A. Blaufarb; Leon Simon; William B. Walker

[57] ABSTRACT

Novel antimeric or racemic prostaglandin derivatives having a difluoromethylene group attached to the C-11, 12 positions of the molecule, oxygenated functions at C-9 and C-15 and unsaturations at C-13 or at C-5 and C-13, which may be further substituted at C-15 by a methyl or ethyl group, the C-20 nor- or bis-nor- derivatives and certain C-20 alkyl derivatives thereof, processes for the production of such compounds and novel and useful intermediates obtained thereby. Also included are the methyl esters of the carboxylic acid function and pharmaceutically acceptable salts thereof. These compounds possess prostaglandin-like activities and thus are useful in the treatment of mammals, where prostaglandins are indicated.

127 Claims, No Drawings

DIFLUOROMETHYLENE SUBSTITUTED PROSTAGLANDIN DERIVATIVES

This application is a continuation-in-part of application Ser. No. 287,333 filed Sept. 8, 1972, now abandoned, which is hereby incorporated by reference and made a part hereof.

The present invention relates to certain novel prostaglandin derivatives, to a process for the production thereof and to certain novel intermediates obtained by this process.

In a further aspect, the present invention relates to antimeric and racemic prosta-13-trans-enoic acid derivatives and 5-cis-13-trans-dienoic acid derivatives having a difluoromethylene (difluorocyclopropyl) group attached to the C-11,12 positions, and oxygenated functions at C-9 and C-15 positions of the molecule, which may be further substituted at C-15 by a methyl or ethyl group, the C-20-nor or bisnor derivatives and certain C-20-alkyl derivatives thereof, the alkyl group containing from 1 to 4 carbon atoms inclusive, processes for the production of such compounds and novel and useful intermediates obtained thereby. Also included are the methyl esters of the carboxylic acid function and pharmaceutically acceptable salts thereof.

Prostaglandins are a group of chemically related 20-carbon chain hydroxy fatty acids having the basic skeleton of prostanoic acid:

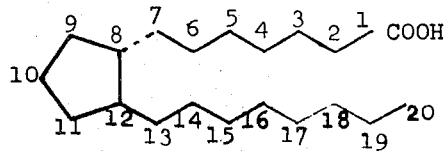

PROSTANOIC ACID

The prostaglandins having a keto group at the C-9 position are known as the PGE series, those having a hydroxyl group in place of the keto group are known as the PGF series and are further designated by an $\alpha$ or $\beta$ suffix to indicate the configuration of the hydroxyl group at said position. The natural compounds are the $9\alpha$-hydroxy substituted compounds. They may contain different degrees of unsaturation in the molecule, particularly at C-5, C-13 and C-17, the unsaturation is also indicated by a suffix. For a review on prostaglandins and the definition of primary prostaglandins, see for example S. Bergström, *Recent Progress in Hormone Research* 22, pp. 153–175 (1966) and *Science* 157, page 382 (1967) by the same author.

Prostaglandins are widely distributed in mammalian tissues and have been isolated from natural sources in very small amounts. In addition a number of the natural occurring prostaglandins have been prepared by chemical synthesis; note, for example, *J. Am. Chem. Soc.* 91, 5675 (1969), *J. Am. Chem. Soc.* 92, 2586 (1970) and *J. Am. Chem. Soc.* 95, 1489–1493 (1971) and references cited therein, W. P. Schneider et al, *J. Am. Chem. Soc.* 90, 5895 (1968), U. Axen et al, *Chem. Commun.*, 303 (1969), and W. P. Schneider, *Chem. Commun.* 304 (1969).

Because of the remarkable range of biological and pharmacological properties exhibited by this family of compounds, a great deal of interest has focused upon such compounds and the preparation of analogs of such compounds; accordingly we have discovered processes and intermediates for preparing modified prostaglandins and derivatives thereof.

The novel prostaglandin derivatives of the present invention can be represented by the following generic formula:

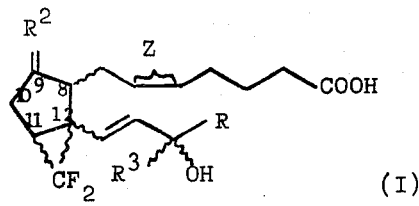

which comprises racemic mixtures and antimeric compounds wherein

R represents an alkyl group of straight chain of three through nine carbon atoms inclusive; $R^2$ represents a keto group or the grouping

and

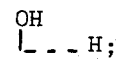

$R^3$ represents hydrogen, methyl or ethyl;

Z represents a single bond or a cis double bond; and the wavy line ($\xi$) indicates the $\alpha$ or $\beta$ configuration or mixtures thereof, provided that a. when the side chain attached at the C-12 position is $\beta$, the difluoromethylene group at the C-11,12 positions is $11\alpha,12\alpha$ only; and when the side chain attached at the C-12 position is $\alpha$, the difluoromethylene group at the C-11,12 positions is $11\beta,12\beta$ only; and b. when $R^3$ is $\alpha$, the hydroxyl group, attached to the same carbon as $R^3$, is $\beta$; and when $R^3$ is $\beta$, the hydroxyl group, attached to the same carbon as $R^3$, is $\alpha$;

and the pharmaceutically acceptable salts or methyl esters thereof.

The antimeric compounds encompassed by formula (I) above can be represented in further detail as follows:

The antimeric compounds wherein $R^2$ is keto and the side chain attached at the C-12 position is $\beta$, can be represented by the subgeneric formulas:

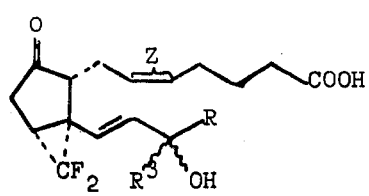

(A)

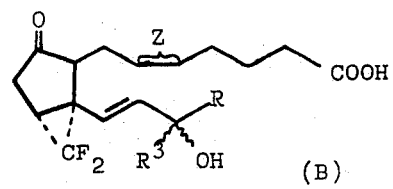

(B)

The antimeric compounds wherein $R^2$ is

and the side chain attached at the C-12 position is $\beta$, can be represented by the subgeneric formulas:

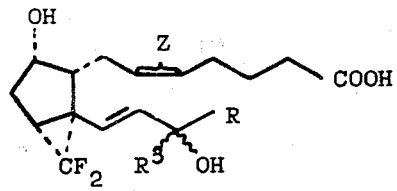

(C)

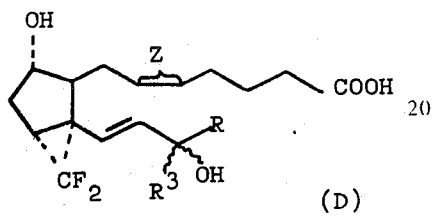

(D)

The antimeric compounds wherein $R^2$ is

and the side chain attached at the C-12 position is $\beta$, can be represented by the subgeneric formulas:

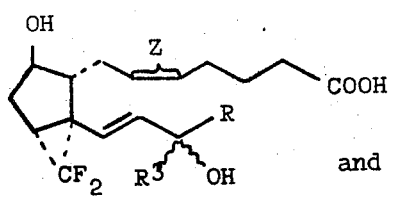

(E)

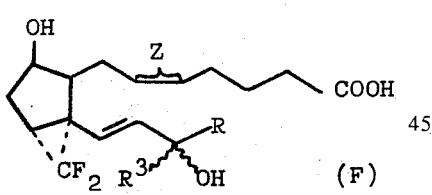

(F)

The antimeric compound wherein $R^2$ is keto and the side chain attached at the C-12 position is $\alpha$, can be represented by the subgeneric formulas:

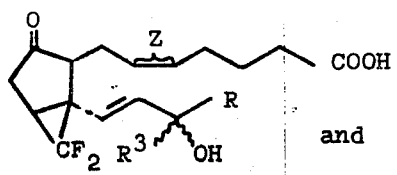

(G)

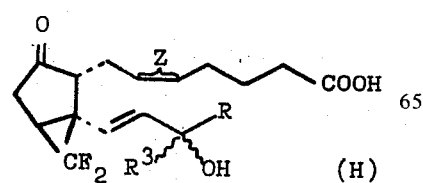

(H)

The antimeric compounds wherein $R^2$ is

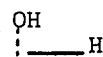

and the side chain attached at the C-12 position is $\alpha$, can be represented by the subgeneric formulas:

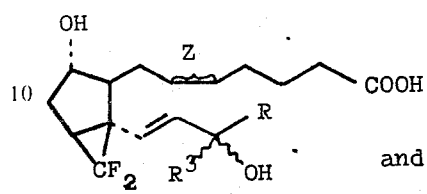

(J)

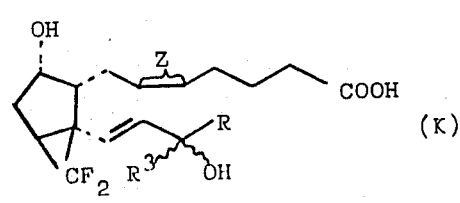

(K)

The antimeric compounds wherein $R^2$ is

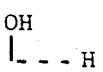

and the side chain attached at the C-12 position is $\alpha$, can be represented by the sugeneric formulas:

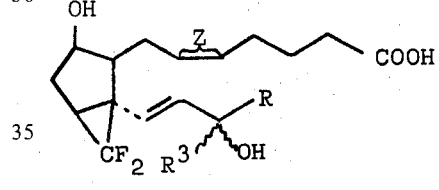

(L)

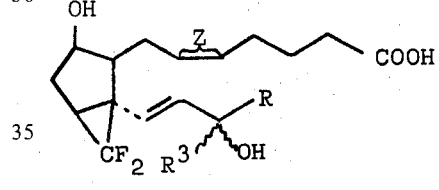

(M)

In turn, the antimeric compounds of Formula (A) and (B) wherein $R^3$ is $\alpha$ and the hydroxyl group, attached to the same carbon atom as $R^3$, is $\beta$, can be represented by the formulas:

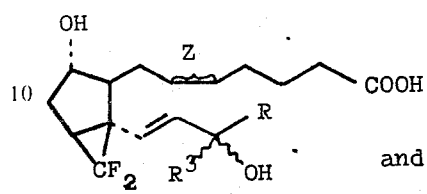

(A')

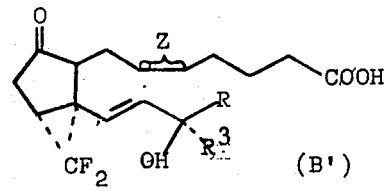

(B')

and those wherein $R^3$ is $\beta$ and the hydroxyl group, attached to the same carbon atom as $R^3$, is $\alpha$, can be represented by the formulas:

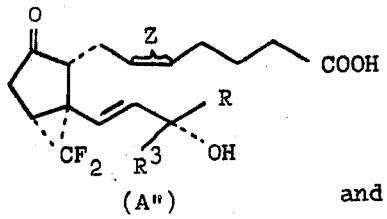
(A")

and

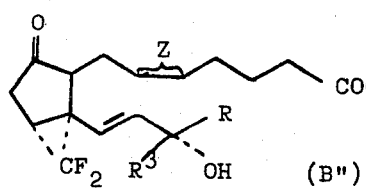
(B")

The antimeric compounds of formulas (C) and (D) wherein $R^3$ is $\alpha$ and the hydroxyl group, attached to the same carbon atom as $R^3$, is $\beta$, can be represented by the formulas:

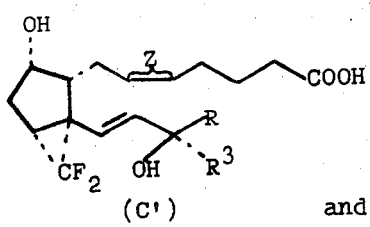
(C')

and

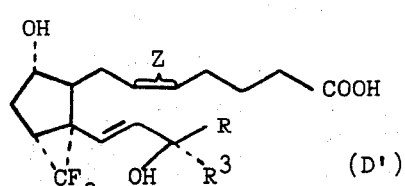
(D')

and those wherein $R^3$ is $\beta$ and the hydroxyl group, attached to the same carbon atom as $R^3$, is $\alpha$, can be represented by the formulas:

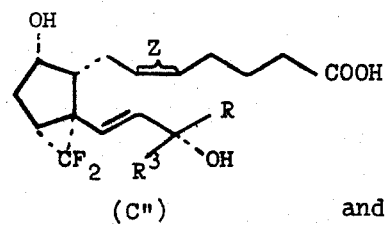
(C")

and

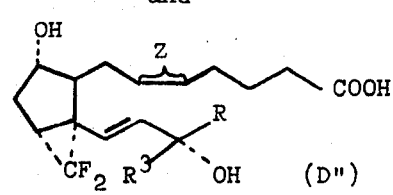
(D")

The antimeric compounds of formulas (E) and (F) wherein $R^3$ is $\alpha$ and the hydroxyl group, attached to the same carbon atom as $R^3$, is $\beta$, can be represented by the formulas:

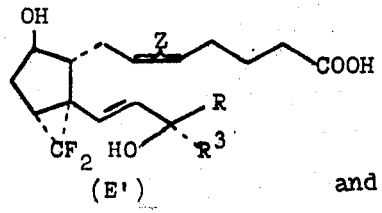
(E')

and

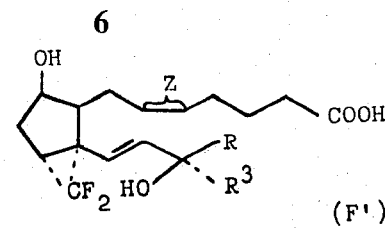
(F')

and those wherein $R^3$ is $\beta$ and the hydroxyl group, attached to the same carbon atom as $R^3$, is $\alpha$, can be represented by the formulas:

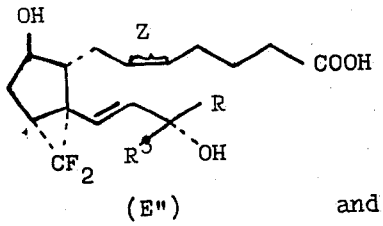
(E")

and

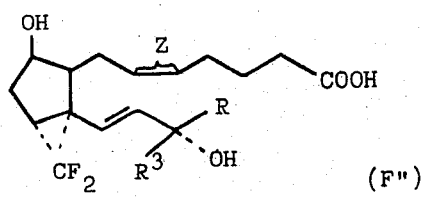
(F")

The antimeric compounds of Formulas (G) and (H) wherein $R^3$ is $\alpha$ and the hydroxyl group, attached to the same carbon atom as $R^3$, is $\beta$ can be represented by the formulas:

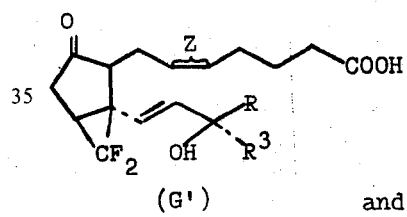
(G')

and

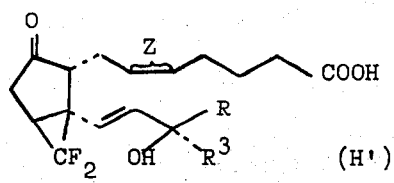
(H')

and those wherein $R^3$ is $\beta$ and the hydroxyl group, attached to the same carbon atom at $R^3$, is $\alpha$ can be represented by the formulas:

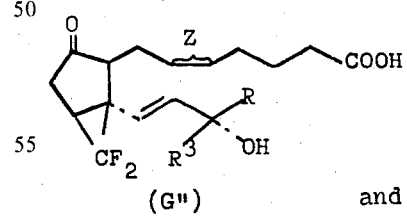
(G")

and

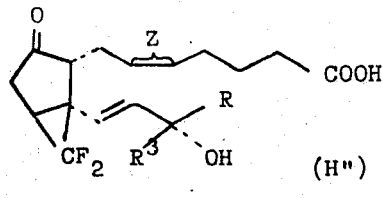
(H")

The antimeric compounds of Formulas (J) and (K) wherein $R^3$ is $\alpha$ and the hydroxyl group, attached to the same carbon atom as $R^3$, is $\beta$, can be represented by the formulas:

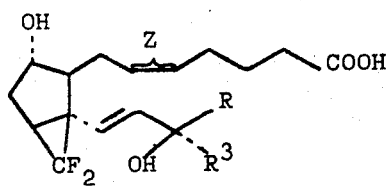

(J')

and

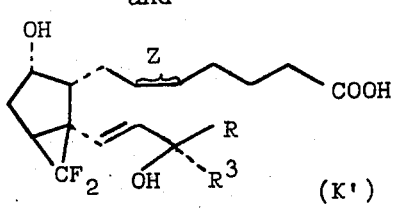

(K')

and those wherein R³ is β and the hydroxyl group, attached to the same carbon atom as R³, is α, can be represented by the formulas:

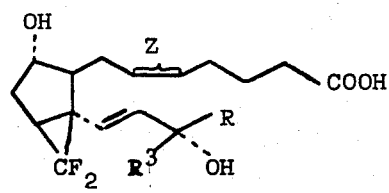

(J")

and

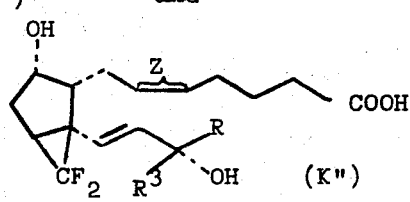

(K")

The antimeric compounds of formulas (L) and (M) wherein R³ is α and the hydroxyl group, attached to the same carbon atom as R³, is β, can be represented by the formulas:

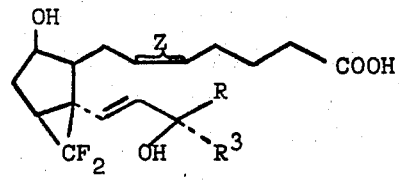

(L')

and

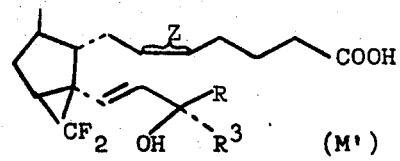

(M')

and those wherein R³ is β and the hydroxyl group, attached to the same carbon atom as R³, is α, can be represented by the formulas:

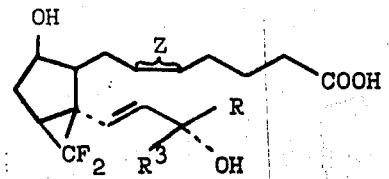

(L")

and

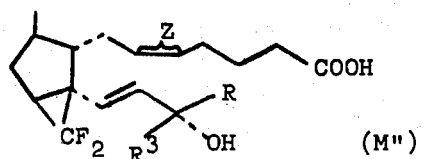

(M")

The racemic mixtures encompassed by formula I above are mixtures in equal proportion of the following compounds:

| | | |
|---|---|---|
| (A') | and | (G") |
| (B') | and | (H") |
| (C') | and | (L") |
| (D') | and | (M") |
| (E') | and | (J") |
| (F') | and | (K") |
| (G') | and | (A") |
| (H') | and | (B") |
| (J') | and | (E") |
| (K') | and | (F") |
| (L') | and | (C") |
| (M') | and | (D") |

The dotted lines shown in the above formulas and in the formulas below indicate that the substituents are in the α configuration, i.e., below the plane of the cyclopentane ring.

The compounds of formulas A, C and E possess the side chain at C-8 in α configuration and the side chain at C-12 in β configuration, thus the side chains are trans with respect to the cyclopentane nucleus, as in natural prostaglandins. The compounds of formulas G, J and L also have the side chains in trans configuration; however, the side chain at C-8 is β and the side chain at C-12 is α, i.e., they are opposite to the configuration of natural prostaglandins. The side chains in compounds of formulas B, D and F are (β,β) cis while the side chains in compounds of formulas H, K and M are (α,α) cis with respect to the cyclopentane nucleus.

The double bonds in the compounds of the present invention have the same configuration as in natural prostaglandins of the $E_1$ or $E_2$ or $F_{1\alpha}$ or $F_{2\alpha}$ series, i.e., the double bond at C-5,6 is in cis configuration and the double bond at C-13,14 is in trans configuration.

When the compounds of the present invention are racemic mixtures, they are produced starting from racemates, while when the compounds of the invention are indvidual antimers the compounds are preferably obtained starting from the appropriate individual antimer.

The use of the symbol "R" or "S" preceding a substituent designates the absolute stereochemistry of that substituent according to the Cahn-Ingold-Prelog rules [see Cahn et al., *Angew. Chem. Inter. Edit.*, Vol 5, p. 385 (1966), errata p. 511; Cahn et al., *Angew. Chem.*, Vol. 78, p. 413 (1966); Cahn and Ingold, *J. Chem. Soc.* (London), 1951, p. 612; Cahn et al., *Experientia*, Vol. 12, p. 81 (1956); Cahn. *J. Chem. Educ.*, Vol. 41, p. 116 (1964)]. Because of the interrelation of the designated substituent with the other substituents in the compound having α or β-prefixes, the designation of the absolute configuration of one substituent fixes the absolute configuration of all substituents in the compound and thus the absolute configuration of the compound as a whole.

The preferred compounds of the present invention are those in which the side chain attached to the C-12 position has the same unit structure of natural prostaglandins, i.e., the compounds wherein R is the group n-pentyl.

The numbering system and the stereochemistry nomenclature used herein for the compounds of the present invention is the art accepted numbering and stereochemistry nomenclature [see *Progress in the Chemistry of Fats and Other Lipids*, Vol. IX, Part 2, pages 233–236 (1968) Pergamon Press, New York, and *J. Lipids Research*, Vol. 10, pages 316 to 319 (1969)]. The α or β configuration for the side chains has been indicated only in the cases wherein one or both side chains are attached to the cyclopentane ring in opposite configuration to the configuration of natural prostaglandins, i.e., when the carboxylic side chain at C-8 is in β configuration and/or the alkyl side chain at C-12 is in α configuration.

The term "pharmaceutically acceptable salts" refers to those salts which do not significantly adversely affect the pharmacological properties of the parent compound. Suitable pharmaceutically acceptable salts include, for example, metal salts such as sodium, potassium, calcium, magnesium, aluminum, and the like, as well as organic amine salts, such as ammonium, diethylamine, β-(dimethylamino) ethanol, β-(diethylamino) ethanol, lysine, arginine, caffeine, procaine, N-ethylpiperidine and the like.

The individual antimeric compounds of the present invention, except those which are further substituted at C-15 by a methyl or ethyl group can be obtained by a process illustrated by the following scheme:

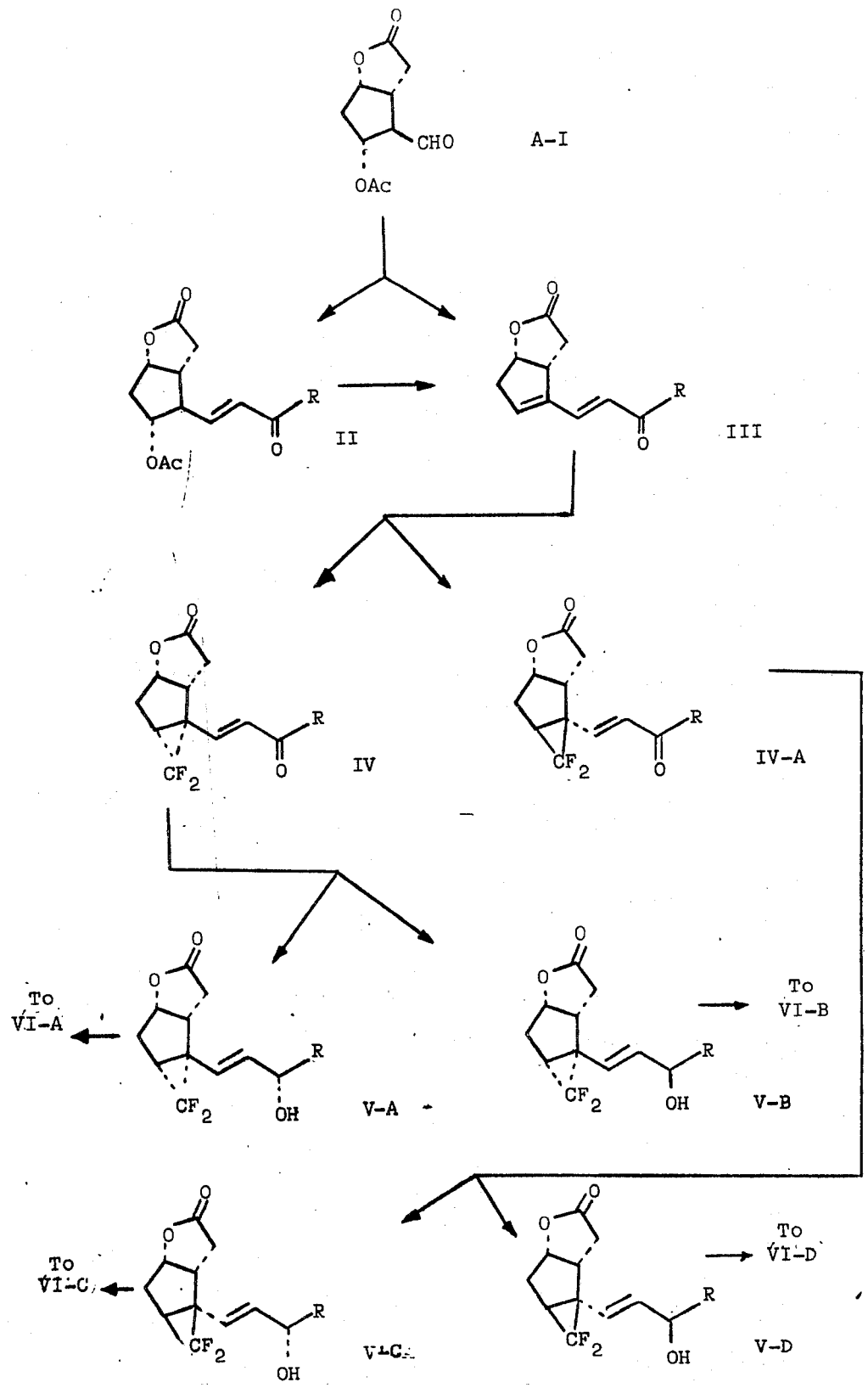

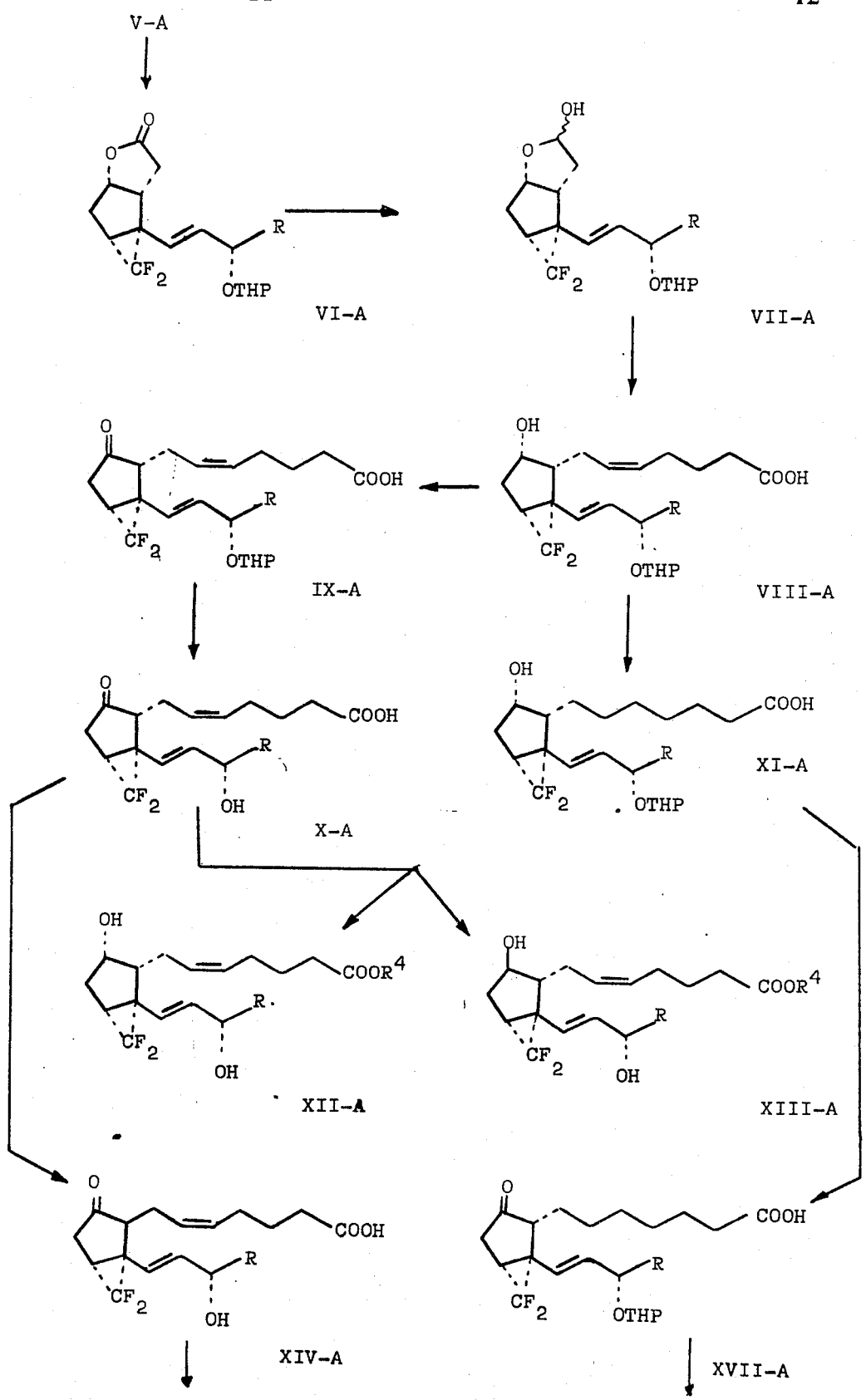

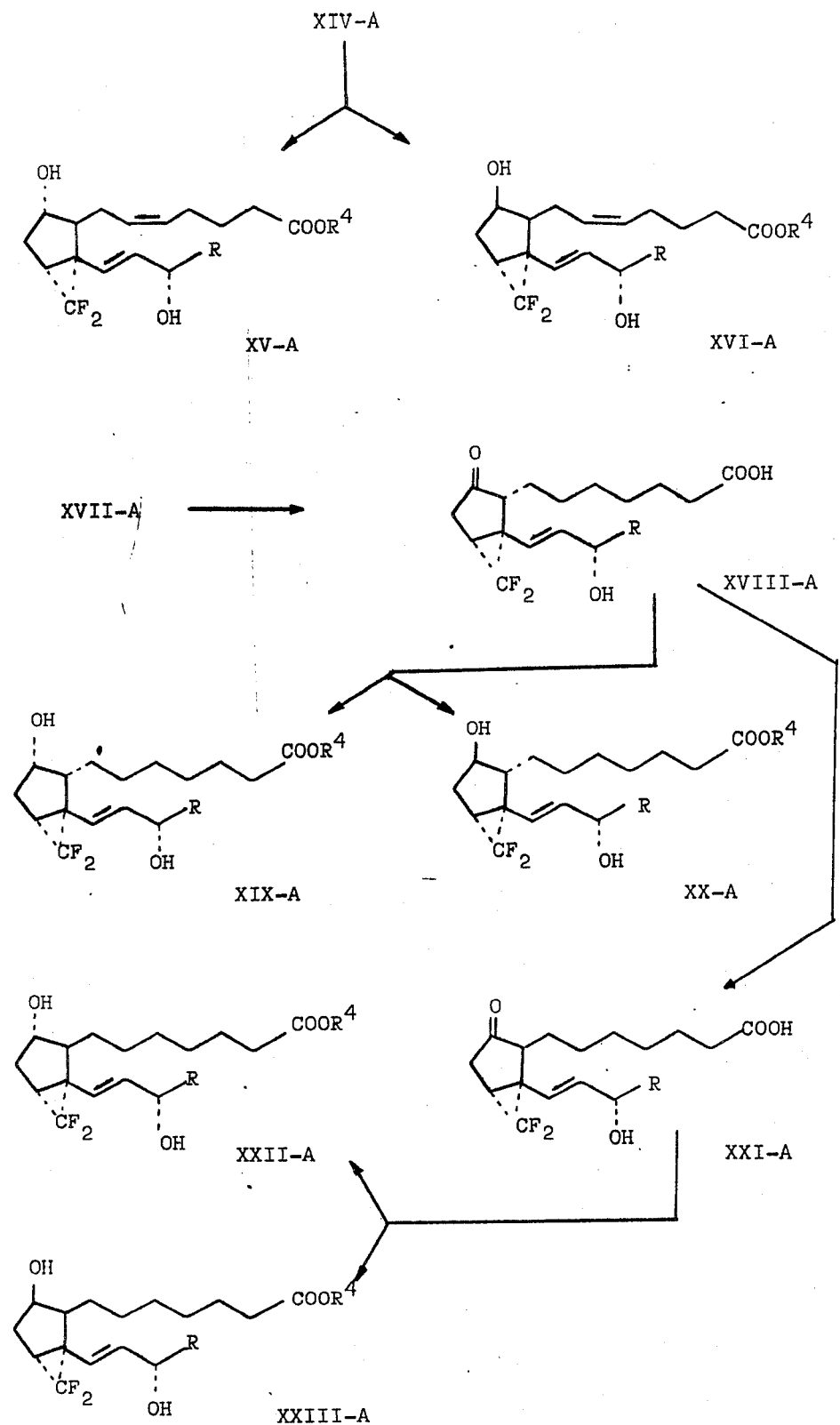

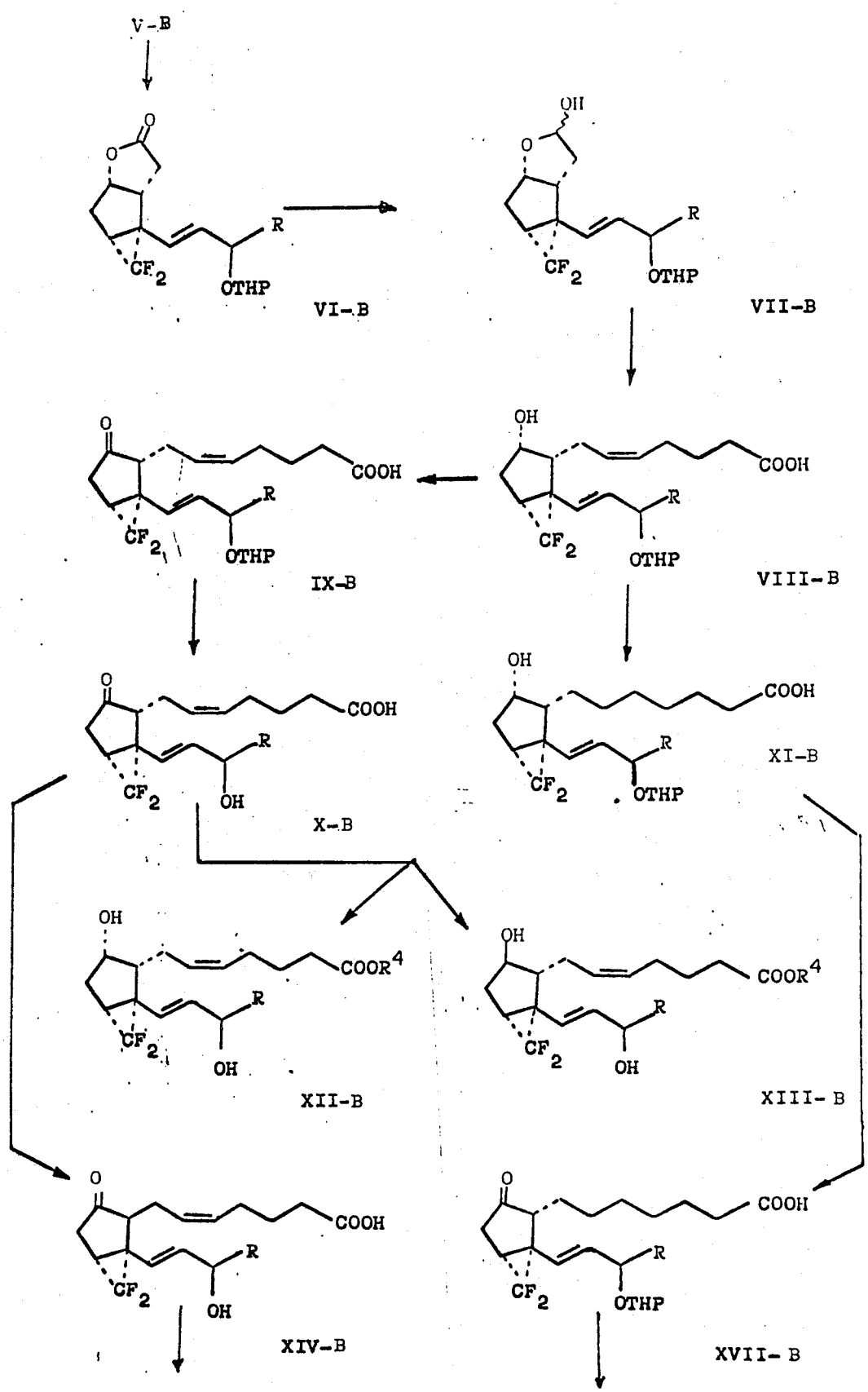

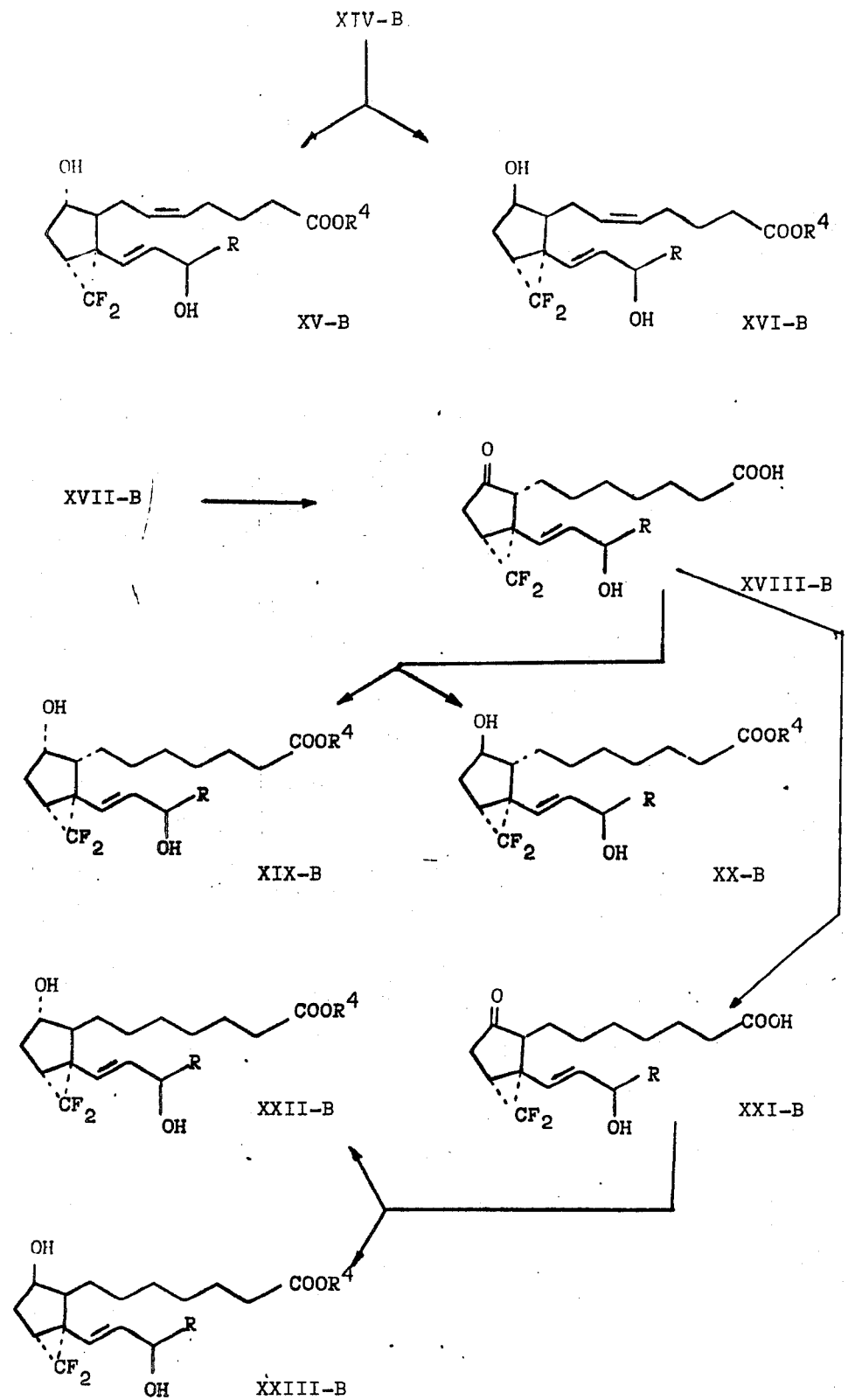

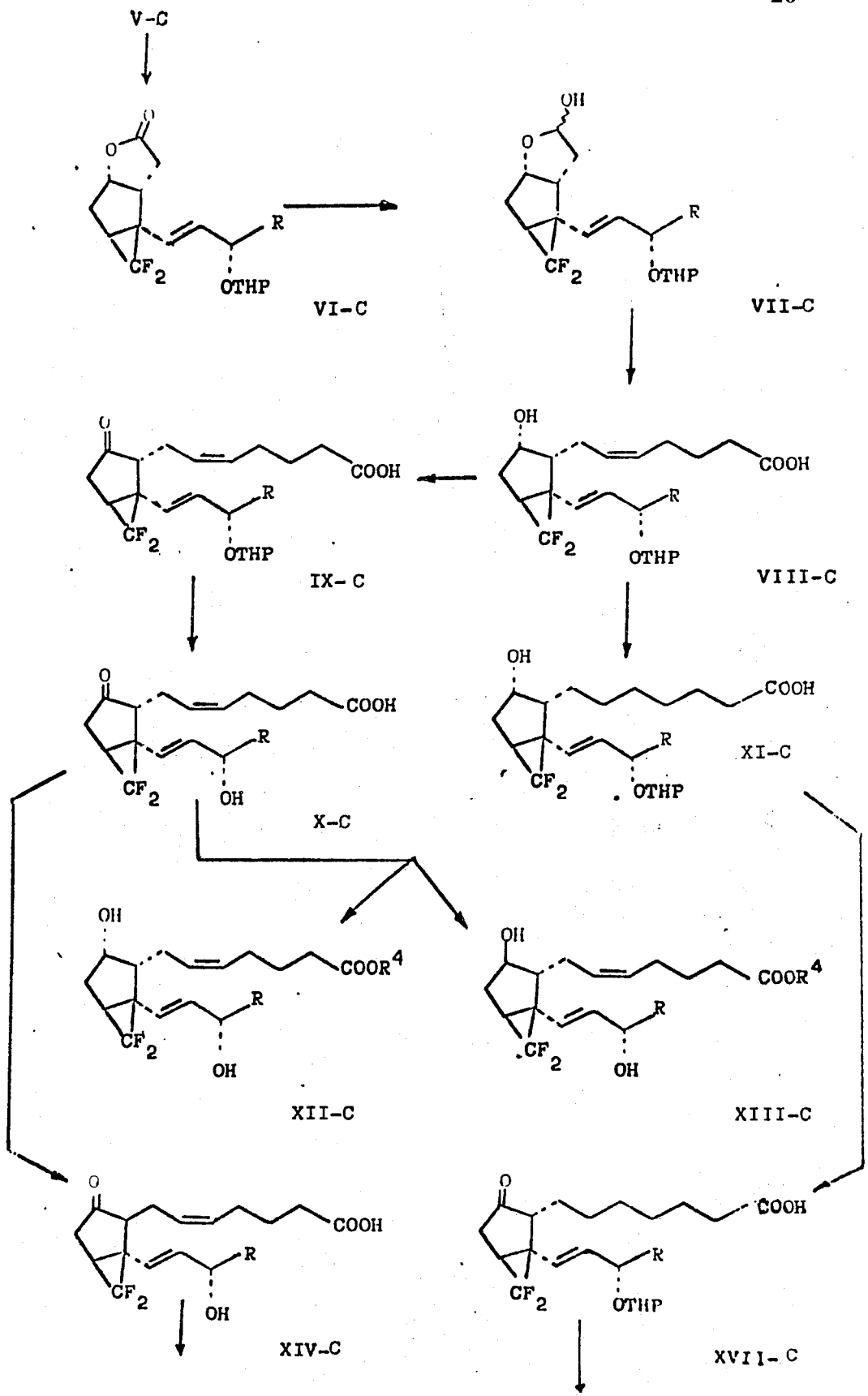

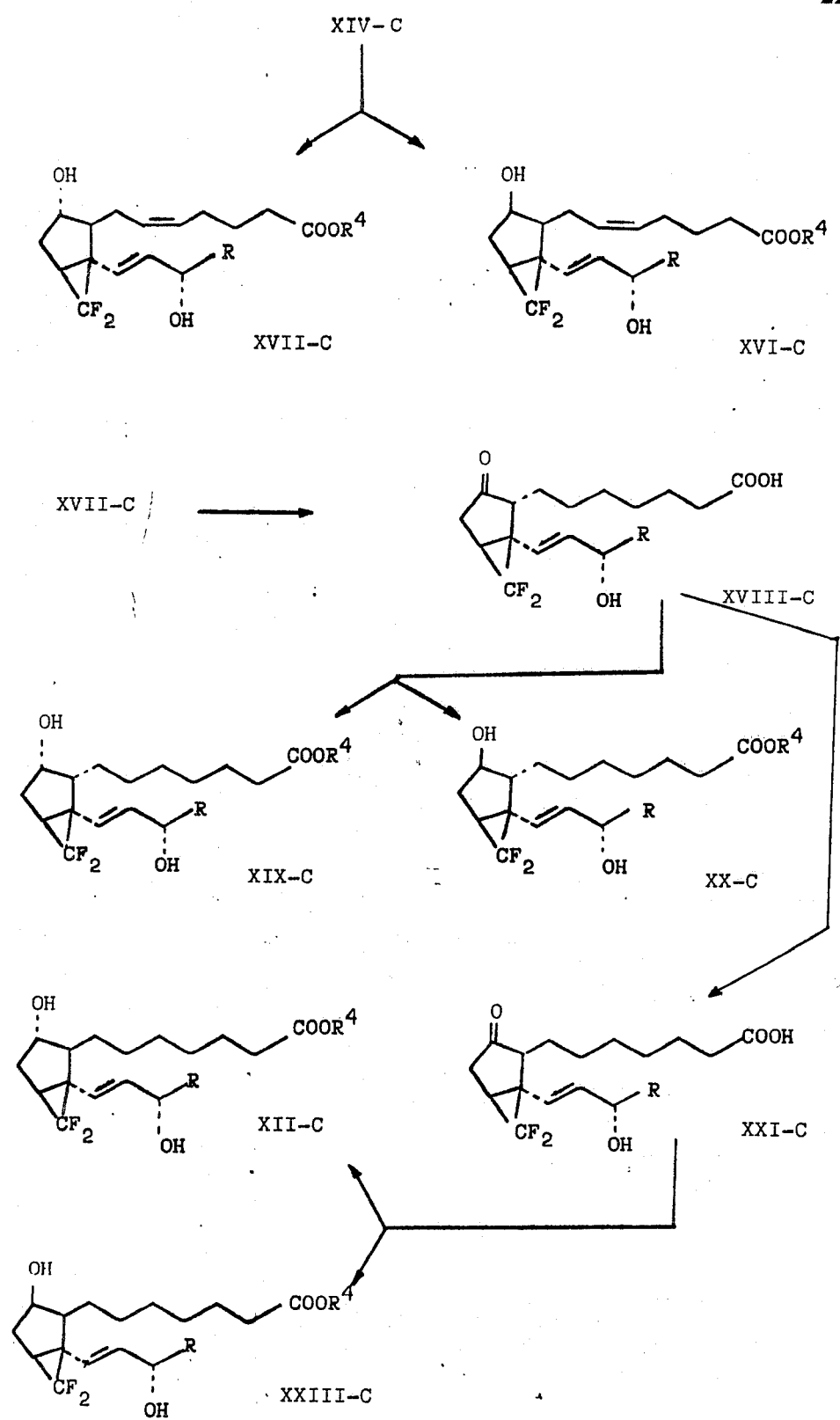

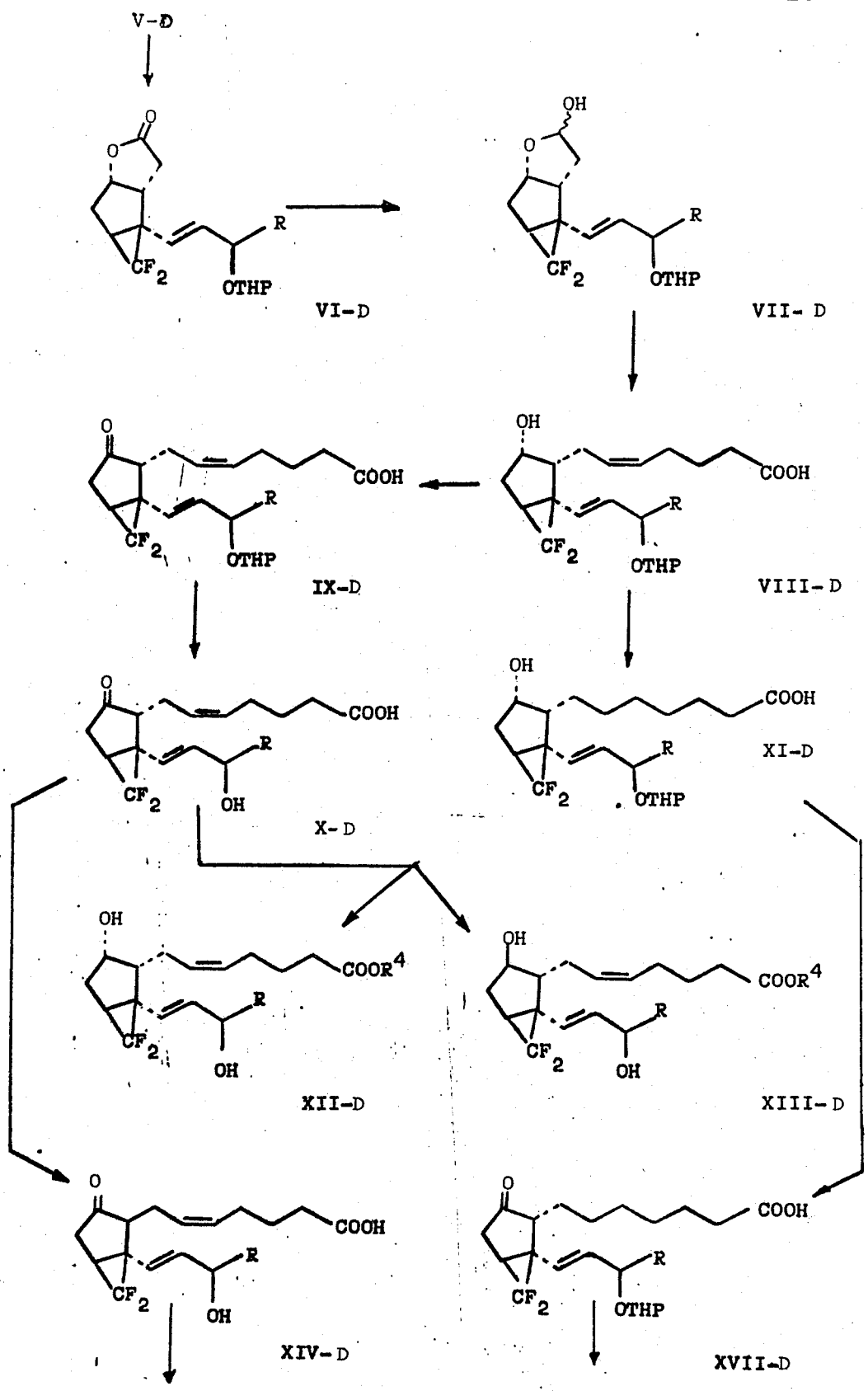

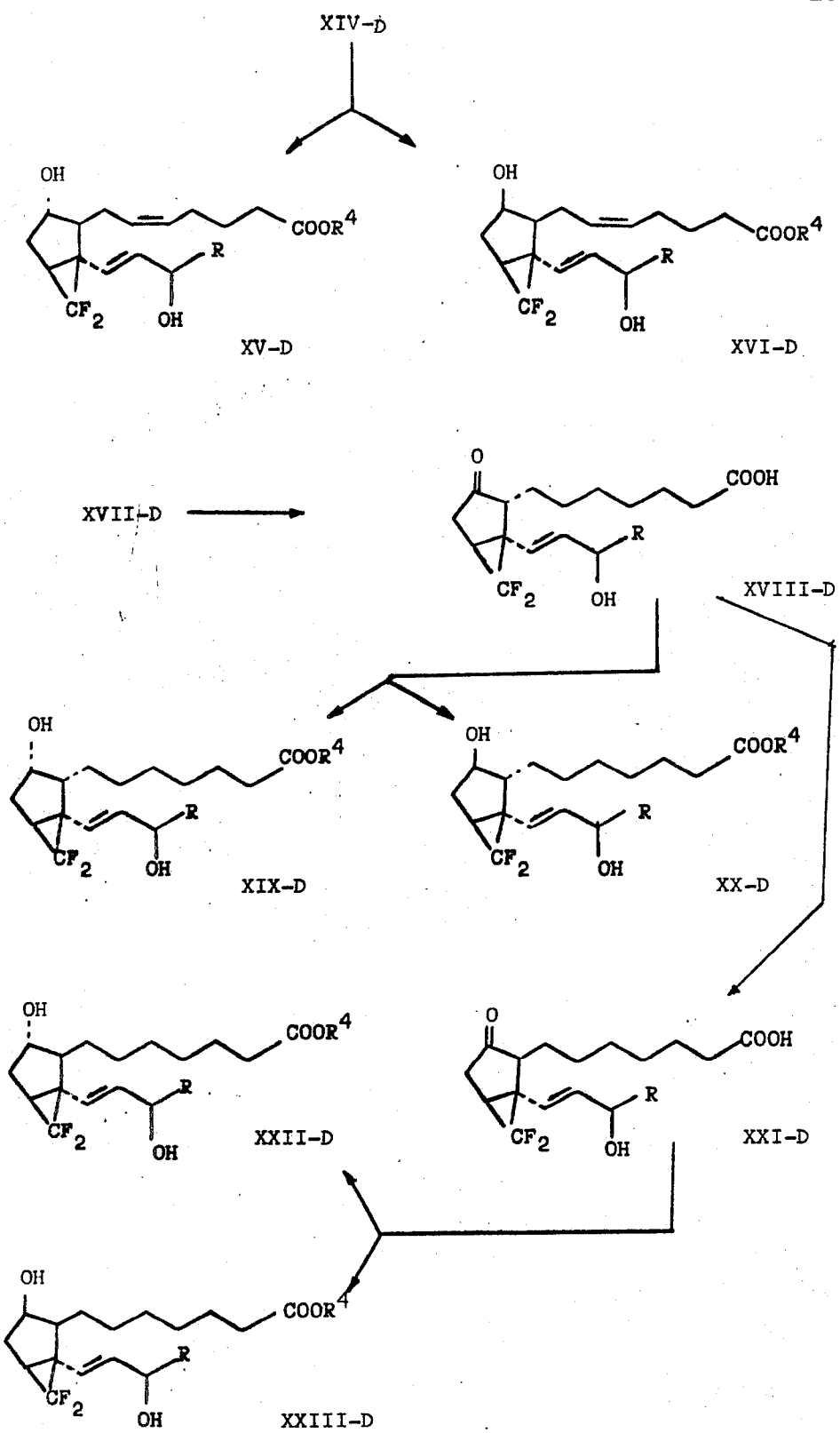

wherein
R has the above-indicated meaning;
R⁴ represents hydrogen or methyl;
THP is tetrahydropyranyl and Ac is acetyl.

In practicing the process illustrated above, the starting compound, namely 1′R-(2′α-hydroxy-4′α-acetoxy-5′β-formylcyclopent-1′α-yl)-acetic acid 1,2′-lactone, represented by formula A-I is treated with the sodium anion of dimethyl 2-oxo-n-alkylphosphonate of the formula:

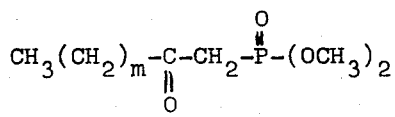

wherein m is an integer of from 2 to 8, in dimethoxyethane solution to produce a mixture of the trans enone and dienone lactones of formulas II and III, respectively, which are separated by conventional techniques. In addition, acid or base treatment of II affords III, thus increasing the yield of the latter compound. This alkylation involves a modified Wittig reaction. Procedures for the Wittig reaction are well known in the art, see for example S. Trippet et al, *Adv. in Organic Chemistry*, Vol. 1, pages 83–102, S. Trippet, *Quaterly Reviews*, Vol. 17, pages 400–440. The sodium anion of a dimethyl 2-oxo-n-alkylphosphonate is prepared in accordance with the method described by E. J. Corey et al, *J. Am. Chem. Soc.*, 88, 5654 (1966), from dimethyl α-lithiomethanephosphonate and a methyl or ethyl ester of a n-alkanoic acid containing from 4 to 9 carbon atoms, e.g., ethyl n-butanoate, methyl-n-hexanoate, methyl n-octanoate and ethyl n-nonanoate. The reaction is preferably conducted under an inert atmosphere, i.e., under nitrogen or argon atmosphere at temperatures of about from 0°C to 40°C, preferably at room temperature or below, using at least one molar equivalent of the reagent per mol of aldehyde, and preferably 1.2 to 2 moles. This reaction is typically carried out for a period of about one to four hours, depending on the temperature and concentration of the reaction mixture. In the preferred conditions, the reaction is conducted at room temperature for about two hours. The reaction product can be recovered from the reaction mixture by neutralization of the excess base with acetic acid to pH~7, followed by evaporation of the solvent under high vacuum, at low temperature, or by adding water and extracting the product with an adequate solvent immiscible with water, e.g., methylene chloride, diethyl ether and the like, followed by evaporation of the solvent. Compounds II and III are separated by conventional techniques, such as chromatography on silica gel or thin-layer chromatography (t.l.c.).

In the keystone step of our process the 1′R-antimeric dienone of formula III is then treated with difluorocarbene in a suitable organic solvent resulting in the addition of a difluorocyclopropyl group across the double bond most remote to a keto group, i.e., the ring double bond, thus affording a mixture of the two epimeric difluoromethylene 1′-S-antimeric compounds of formulas IV and IV-A in which the fused difluorocyclopropyl group is in α or β configurations, respectively. The side chain in compound of formula IV is in β configuration, i.e., it has the configuration required for natural prostaglandins, while the compound of formula IV-A has the side chain attached in α configuration. These compounds are readily separated by conventional techniques, known to the skilled in the art.

In the preferred embodiments, the reaction is conducted under anhydrous conditions, using sodium chlorodifluoroacetate as source of difluorocarbene, at a temperature above which the salt decomposes, using an inert nonaqueous solvent of sufficient polarity to dissolve the haloacid salt. Suitable solvents include dimethoxyethane, diethyleneglycol dimethyl ether (diglyme), triethylene glycol dimethyl ether and the like. Generally, the reaction is performed at temperatures in the range of about 80° to 180°C and preferably at the boiling point of the solvent used, for a period of time of about five minutes to one hour. The course of the reaction can be monitored by thin-layer chromatography or by determination of the UV spectrum.

Alternatively, this difluorocyclopropyl addition can be effected with other reagents known to generate difluorocarbenes such as phenyl (trifluoromethyl) mercury and trimethyl (trifluoromethyl) tin in the presence of sodium iodide in an aromatic hydrocarbon solvent, at or near the boiling point of the solvent used for a period of time of the order of about two to about 18 hours.

The 1′S-antimeric difluoromethylene compounds of formulas IV and IV-A can be separated by conventional techniques such as fractional crystallization, column chromatography or thin-layer chromatography. The individual compounds are in turn submitted separately to the same sequence of reactions in order to obtain the difluoromethylene prostaglandin antimers of the invention.

Thus, the keto group of the 1′S-antimeric enone lactones of formulas IV or IV-A can be selectively reduced with a solution of zinc borohydride in an ether solvent such as dimethoxyethane, to yield a mixture of the α-hydroxy compound and the β isomer thereof (V-A and V-B and V-C and V-D, respectively). The reaction is conducted at temperatures in the range of about from 5° to 20°C for about from 15 minutes to three hours, preferably using an excess of zinc borohydride. The zinc borohydride reagent solution can be prepared from freshly fused zinc chloride and sodium borohydride in dimethoxyethane.

The isomeric α- and β-hydroxy compounds can be separated by conventional chromatography on silica gel or by thin-layer chromatography.

Alternatively, the reduction step can be carried out via treatment with a borohydride ion (conveniently prepared by reaction of a trialkylborane derivative from either racemic or (+)-limonene, t-hexylborane and t-butyllithium) in the presence of hexamethylphosphoramide, at about from −130°C to −100°C and preferably −120°C. The predominant product of this treatment is the α-alcohol and only small or negligible amounts of the β-isomer is obtained.

A 1′S-antimeric α-hydroxy compound of formula V-A can be etherified with dihydropyran in methylene chloride, in the presence of catalytic amounts of an acid catalyst (e.g., p-toluensulfonic acid), under anhydrous conditions, to produce the tetrahydropyranyloxy derivatives of formula VI-A. Typically the reaction is conducted at about room temperature for about 15 minutes, using about three molar equivalents of dihydropyran in an inert organic solvent, e.g., using methylene chloride as solvent. A larger excess of dihydropyran, or longer reaction periods, produce polymerization of this reagent.

The product can be isolated by adding a few drops of pyridine to the reaction mixture, followed by conventional extraction and evaporation of the organic extract.

The 1'S-isomeric lactol of formula VII-A can be prepared by reduction of the lactone of formula VI-A with about from 1.1 to 3 molar equivalents of diisobutylaluminum hydride in a suitable inert organic solvent. Typically, the reduction is conducted at about from −30° to −70°C, preferably at about −60°C, for a period of about from 10 to 30 minutes, preferably using about two molar equivalents of the diisobutylaluminum hydride. Suitable inert organic solvents for this reaction include, for example, the aromatic hydrocarbons such as toluene or xylene.

The product can be isolated from the reaction mixture by conventional separation procedures and can be used for the next step with or without separation of the isomers.

The 8S-11α, 12α-difluoromethylene prostadienoic acid derivative of formula VIII-A can be prepared by condensation of the crude 8S-lactol VII-A with the Wittig reagent derived from 5-triphenylphosphoniopentanoic acid and sodium methylsulfinylcarbanion in dimethylsulfoxide solution.

Typically, this reaction is conducted under anhydrous conditions for about two to 24 hours at temperatures in the range of about from 15° to 50°C. This reaction is preferably carried out under an inert atmosphere, e.g., under argon or nitrogen atmosphere. Typically the triphenylphosphoniopentanoic acid is used in an amount varying from about two to about five moles per mol of starting lactol VII-A and the amount of sodium methylsulfinyl carbanion varies between about two to about 10 moles. In the preferred embodiments 2.5 molar equivalents of the acid reagent and five molar equivalents of the carbanion reagent are used per mol of lactol. The product is obtained as the sodium salt soluble in water, which can be converted to the free acid by acidification with oxalic acid or another weak acid to pH-2, followed by conventional extraction and evaporation. Preferably the prostaglandin derivative VIII-A is further purified by thin-layer chromatography. The 5-triphenylphosphoniopentanoic acid can be prepared according to the procedure described by R. Greenwald et al, in *J. Org. Chem.*, 28, page 1128 (1963), from 5-bromopentanoic acid and triphenylphosphine in acetonitrile. The sodium methylsulfinyl carbanion can be obtained from sodium hydride and dimethylsulfoxide, stirring the mixture at about 75°C until the evolution of gas ceases. Generally, it is preferred to prepare these reagents just prior to the reaction with the lactol of formula VII-A.

The 8R-prostadienoic acid compounds of formula IX-A can be prepared by oxidation of the corresponding 8S-9α-hydroxylated compound of formula VIII-A with Jones' reagent, Collins' reagent or with aqueous chromic acid in diethyl ether [H. C. Brown et al, *J. Org. Chem.*, 36, page 387 (1971)]. This product can in turn by hydrolyzed under mild acidic conditions for example, by treatment with a weak acid (e.g., acetic acid, oxalic acid, tartaric acid and the like) in the presence of water, to yield the 8R- compound of formula X-A. Preferably the starting material of formula IX-A is first dissolved in an inert water miscible organic solvent (e.g., tetrahydrofuran, dioxane and the like) prior to treatment with the weak acid. This hydrolysis is preferably conducted using aqueous acetic acid, at a temperature in the range of about from 0° to 50°C for about four to about 10 hours. The preferred concentration of aqueous acetic acid is 65 percent wt./wt. however, other concentrations can, or course, also be used.

The 8S-monounsaturated compounds of formula XI-A can be conveniently prepared by selectively reducing the C-5(6)-olefin bond in the corresponding dienioc compounds of formula VIII-A. This can be conveniently effected by applying the procedure described by Koch et al, in the *Journal of Labelled Compounds*, Vol. VI, No. 4, page 395 (1970), with respect to the selective reduction of $PGE_2$ prostaglandins to $PGE_1$ prostaglandins, to the dienoic compounds of formula VIII-A.

By esterification of an 8R-compound of formula X-A with ethereal diazomethane, in a conventional manner, followed by reduction with sodium borohydride in a lower aliphatic alcohol such as methanol or ethanol, at about room temperature for a period of time of about 30 minutes to one hour, there is obtained a mixture of the corresponding 8S-9α and 9β-hydroxy compounds, (XII-A and XIII-A, $R^4$ = Me) which are separated by chromatography on silica gel, obtaining approximately equal amounts of each isomer. The alkyl ester group is then hydrolyzed by chemical or enzymatic methods, to yield the corresponding free acids (XII-A and XIII-A, $R^4$ = H).

When this hydrolysis is effected chemically, the methyl ester compound is dissolved in a lower aliphatic alcohol such as methanol or ethanol and treated with an aqueous solution of an alkali metal carbonate, e.g., sodium carbonate or potassium carbonate at a temperature above room temperature, of the order of about 30° to 50°C., preferably at about 40°C. for a period of time of about 12 to 20 hours, preferably for about 16 hours, thus yielding, after acidification, the corresponding 8S-prostadienoic acid compound of formulas XII-A or XIII-A ($R^4$ = H). This hydrolysis is preferably conducted under an inert atmosphere i.e., under nitrogen or argon atmosphere.

Alternatively, the methyl ester group can be hydrolyzed by using enzymes in aqueous solutions. For this enzymatic hydrolysis, there is preferably used a crude pancreatic lipase commercially available (Sigma Steapsin), however, other enzyme systems which are known as useful for the hydrolysis of compounds unstable to alkaline or acid conditions can also be practical. Other lipases obtainable from bacterial sources, such as the partially purified lipase obtained from *Corynebacterium acnes* culture supernatant can also be used, or a lipase of those that are known to act on water insoluble esters of long chain fatty acids [L. Sarda et al, *Biochem. Biophys. Acta.* 23:264 (1957)], or baker's yeast [C. J. Sih et al., *J. C. S. Chem. Comm.* 240 (1972)].

The hydrolysis of the methyl ester group with the crude pancreatic lipase can be conducted in a buffered aqueous solution containing sodium chloride and calcium chloride, at a neutral or almost neutral pH, at a temperature of between 22° to 30°C, preferably at about 25° to 27°C., adjusting the pH of the reaction mixture to 7.2 to 7.4 by addition of, for example, dilute sodium hydroxide solution, at intervals. The methyl ester compound is dissolved in the previously prepared buffered lipase aqueous solution by sonication at about 37°C. using from about 0.5 ml. to about 1 ml. of the lipase solution per milligram of substrate. The methyl ester group is readily hydrolyzed within a short period of time, of the order of 5 minutes to 1 hour. The course of the reaction can be followed by thin layer chromatography; when the hydrolysis is complete, the free acid can be isolated from the reaction mixture by conventional techniques, such as acidification with a dilute acid solution, e.g., using dilute hydrochloric acid, extraction with a solvent immiscible with water such as diethyl ether, ethyl acetate, chloroform, methylene chloride, and the like, evaporation of the solvent and purification of the residue by column chromatography, thin layer chromatography or liquid chromatography; good results in the separation of the acid from the lipase have been obtained by column chromatography on Florisil.

Alternatively, the 8S-antimeric compounds of formulas XII-A and XIII-A can be obtained from the 8R-antimeric compounds of formula IX-A, which are esterified with diazomethane, the alkyl esters reduced with sodium borohydride to yield a mixture of the 8S-9α and 9β-hydroxylated derivatives, which upon cleavage of the tetrahydropyranyloxy moiety and chemical or enzymatic hydrolysis of the alkyl ester group afford the respective compounds XII-A and XIII-A.

The 8R-antimeric compounds of formula X-A can be converted into the corresponding 8S-antimers of formula XIV-A by strong alkaline treatment, preferably by treatment with an alkali metal alkoxide such as sodium methoxide or potassium methoxide in methanol solution. This reaction is conducted under nitrogen or argon atmosphere using from about 1.1 to about 4 molar equivalents of the alkali metal alkoxide per mol of starting compound, at room temperature for a period of time of the order of 10 minutes to 1 hour, followed by treatment with a strong mineral acid such as hydrochloric acid, to liberate the free prostadienoic acid from the alkaline salt formed during the reaction. In the preferred embodiments, the reaction is conducted using 2 molar equivalents of the alkali metal alkoxide per mol of compound X-A, for a period of time of about 25 minutes.

Upon esterification of an 8S-antimeric compound XIV-A with diazomethane followed by reduction with sodium borohydride as mentioned above in detail with regard to the transformation of compound X-A into XII-A and XIII-A there are obtained the corresponding 8R-9α and 9β-hydroxylated compounds of formulas XV-A and XVI-A respectively ($R^4$ = Me), which are converted into the corresponding free acids (XV-A and XVIA, $R^4$ = H) by chemical or enzymatic hydrolysis methods.

A monounsaturated compound of formula XI-A can be converted into the the corresponding 8R-11-keto compound of formula XVII-A by oxidation with an oxidizing reagent, e.g., using Jones' reagent or Collins' reagent and thereafter the tetrahydropyranyloxy group cleaved by treatment with for example 65 percent acetic acid, to yield an 8R-compound of formula XVIII-A. An 8R-antimeric compound of formula XVIII-A can be conventionally esterified with ethereal diazomethane, and the methyl ester thus obtained reduced with sodium borohydride in methanol solution to yield a mixture of the corresponding 8S-9α and 9β-hydroxylated compound of formulas XIX-A and XX-A, respectively ($R^4$ = Me), which are separated by chromatography and the individual isomers hydrolyzed by chemical or enzymatic methods, thus obtaining the free prostenoic acids (XIX-A and XX-A, $R^4$ = H).

The monounsaturated 8R-antimeric compounds of formula XVIII-A can be converted into the corresponding 8S-antimers of formula XXI-A by strong alkaline treatment, i.e., by treatment with sodium methoxide or potassium methoxide in methanol solution followed by acidification as described hereinbefore in detail with regard to the transformation of the corresponding dienic compounds (X-A into XIV-A). By conventional esterification of compounds of formula XXI-A with ethereal diazomethane followed by reduction of the methyl ester thus obtained with sodium borohydride in methanol solution there is obtained a mixture of the corresponding 8R-9α and 9β-hydroxy derivatives of formulas XXII-A and XXIII-A ($R^4$ = Me) which are separated by chromatography and the individual isomers hydrolyzed by chemical or enzymatic methods, to yield the corresponding free acids (XXII-A and XXIII-A, $R^4$ = H).

When the above-described reaction sequences (V-A through XXIII-A) are performed using the isomeric compound having the hydroxy group in β-configuration as starting material (V-B) there will be obtained in each and every step of the process the corresponding 15β-substituted (prostaglandin numbering) derivative (VI-A through XXIII-B).

Similarly, when starting from the antimeric compounds having the difluoromethylene group in β-orientation and the hydroxyl group in α orientation (V-C) there will be produced in each and every step of the process the corresponding antimeric compounds (VI-C through XXIII-C). Also, starting from compounds of formula V-D, there will be produced in each an every step of the process the corresponding antimeric compounds (VI-D through XXIII-D).

By substitution of a racemic mixture of the compounds of Formula A-I corresponding to the individual antimeric compounds of Formula A-I depicted above there are obtained racemic mixtures at each and every stage of the process. Thus, carrying out the process using racemic (2'α-hydroxy-4'α-acetoxy-5'β-formylcyclopent-1'α-yl)-acetic acid 1,2'-lactone as starting material yields, for example, a racemic mixture of the compounds of formula X-A and its antimeric compounds of Formula XIV-A.

Other racemic mixtures which may be noted, in addition to the compounds of formulas X-A and XIV-D, are, for example, the compounds of formulas:

| | | | | | |
|---|---|---|---|---|---|
| XII-A | and | XVI-D | X-B | and | XIV-C |
| XIII-A | and | XV-D | XII-B | and | XVI-C |
| XIV-A | and | X-D | XIII-B | and | XV-C |
| XV-A | and | XIII-D | XIV-B | and | X-C |
| XVI-A | and | XII-D | XV-B | and | XIII-C |
| XVIII-A | and | XXI-D | XVI-B | and | XII-C |
| XXI-A | and | XVIII-D | XVIII-B | and | XXI-C |
| XXII-A | and | XX-D | XXI-B | and | XVIII-C |
| XXIII-A | and | XIX-D | XXII-B | and | XX-C |
| XIX-A | and | XXIII-D | XXIII-B | and | XIX-C |
| XX-A | and | XXII-D | XIX-B | and | XXIII-C |
| | | | XX-B | and | XXII-C |

The compounds of the present invention further substituted by a methyl or ethyl group at the C-15 position can be obtained by a process illustrated by the following sequence of reactions in which, to avoid undue prolixity, each formula covers antimeric compounds and racemic mixtures as well:

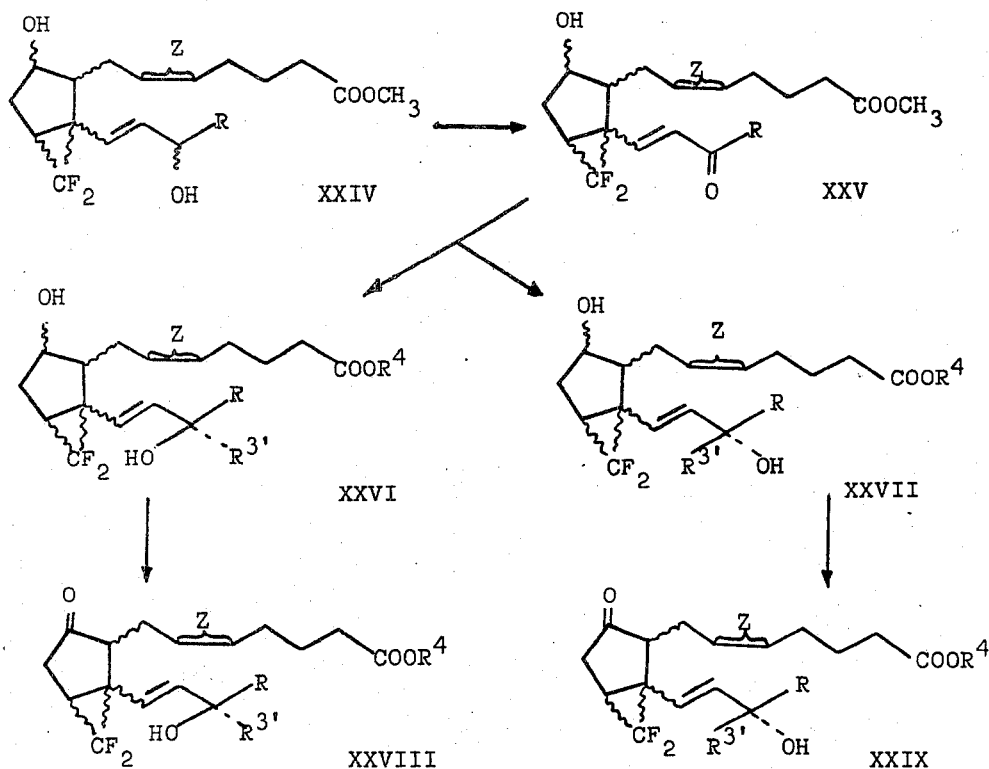

wherein R, R⁴ and Z and the wavy lines(⌇)have the above-indicated meaning and R³′ is methyl or ethyl, provided that when the side chain attached to the C-12 position is β, the difluoromethylene group at C-11, 12 is in α-configuration only and when the side chain attached to the C-12 position is α, the difluoromethylene group at C-11, 12 is in β-configuration only.

Formula XXIV is a composite of antimeric compounds of formulas:

XII-A, XIII-A, XV-A, XVI-A, XIX-A, XX-A, XXII-A and XXIII-A; and XII-B, XIII-B, XV-B, XVI-B, XIX-B, XX-B, XXII-B and XXIII-B; and XII-C, XIII-C, XV-C, XIX-C, XX-C, XXII-C and XXIII-C; and XII-D, XIII-D, XV-D, XVI-D, XIX-D, XX-D, XXII-D and XXIII-D.

When the compounds of formula XXIV are racemic mixtures, for example, a racemic mixture of the compounds of formula XII-A and XVI-D rather than an individual antimer, it is to be understood that racemic mixtures of the compounds of formulas XXV, XXVI, XXVII, XXVIII and XXIX are thereby obtained.

In practicing the process illustrated above, a compound of formula XXIV (racemic or individual antimer) is selectively oxidized at C-15 with an excess of manganese dioxide or 2,3-dichloro-5,6-dicyano-1,4-benzoquinone in a suitable inert organic solvent, e.g., chloroform, tetrahydrofuran, dioxane and the like to produce the corresponding 15-keto compound of formula XXV. When manganese dioxide is used as reagent, this reaction is conducted at room temperature, for a period of time of about 18 to 40 hours, under vigorous stirring, using preferably chloroform or tetrahydrofuran as solvents. The oxidizing agent is added portionwise at 4–6 hours intervals. When the oxidation is effected using 2,3-dichloro-5,6-dicyano-1,4-benzoquinone as reagent, the reaction is preferably conducted at 50°C. using particularly dioxane as solvent, for a period of time of the order of 14 to 20 hours, preferably for about 18 hours. In any case the course of the reaction can be followed by thin layer chromatography or by periodic determination of the ultraviolet spectrum. When the reaction is complete the oxidizing agent is separated by filtration and the reaction product isolated by conventional techniques such as evaporation of the solvent and purification of the residue by thin layer chromatography or chromatography on Florisil.

Upon reaction of a compound of formula XXV with methyl- or ethyllithium or the corresponding alkylmagnesium halide, there is obtained a mixture of the corresponding 15α-alkyl-15β-hydroxy and 15β-alkyl-15α-hydroxy compounds of formulas XXVI and XXVII, respectively, in which R⁴ is methyl. In the preferred embodiments, the reaction is carried out using preferably 1.1 to 1.2 molar equivalents of the alkyllithium, or from 6 to 12 molar equivalents of the alkylmagnesium halide per molar equivalent of starting compound, using ether or tetrahydrofuran as solvent, at a temperature comprised between −78°C to room temperature, for a period of time of the order of 2 to 10 hours and under an inert atmosphere, preferably under argon atmosphere. The mixture of 15α-hydroxy-15β-alkyl- and 15β-hydroxy-15α-alkyl compounds thus obtained is separated by thin layer chromatographic techniques, and the methyl ester group in compounds XXVI and XXVII (R⁴ = Me) is in turn saponified preferably by enzymatic methods, to yield the corresponding 15α-hydroxy-15β-alkyl and 15β-hydroxy-15α-alkyl-prostadienoic or prostenoic acids (XXVI and XXVII, R⁴ = H).

The 9-keto compounds of formulas XXVIII and XXIX (R⁴ = H) are obtained by oxidation of compounds XXVI and XXVII (R⁴ = Me or H), respectively, using particularly chromium trioxide-dipyridine complex (Collins' reagent) or an 8N chromic acid in acetone solution (Jones' reagent) followed by enzymatic hydrolysis of the methyl ester group, when required.

The salt derivatives of the prostadienoic and prostenoic acids of the present invention (individual antimers or racemic mixtures) can be prepared by treating the corresponding free acids with about one molar equivalent of a pharmaceutically acceptable base per molar equivalent of free acid. Suitable pharmaceutically acceptable bases include, for example, sodium hydroxide, potassium hydroxide, ammonium hydroxide, calcium hydroxide, trimethylamine, triethylamine, tripropylamine, β-(dimethylamino) ethanol, β-(diethylamino) ethanol, arginine, lysine, caffeine, procaine or the like. Typically, the reaction is conducted in an aqueous solution, alone or in combination with an inert, water miscible organic solvent, at a temperature of about from 0° to 30°C, preferably at room temperature.

Typical inert, water miscible organic solvents include methanol, ethanol, isopropanol, butanol, dioxane or tetrahydrofuran. When divalent metal salts are prepared, such as the calcium salts or magnesium salts, the free acid starting material is treated with at least one half molar equivalent of the pharmaceutically acceptable base.

In conducting the aforedescribed processes, it is generally preferred to separate or isolate the respective products of each reaction step prior to their use as starting materials in subsequent steps. Illustrative non-limiting separation and isolation procedures can be had by reference to the appropriate Example set forth herein below.

Also although the above processes, for purposes of simplicity, have been described with respect to tetrahydropyran and acetate protecting groups, other conventional suitable ether and ester protecting groups could, of course, also be used.

The starting materials used in the above described process, i.e., 1'R-(2'α-hydroxy-4'α-acetoxy-5'β-formylcyclopent-1'α-yl)-acetic acid 1,2'-lactone, or its racemate are prepared in accordance with the methods described, for example, by E. J. Corey et al, in *J. Am. Chem. Soc.*, 91, page 5675 (1969); *J. Am. Chem. Soc.*, 92, page 397 (1970); *J. Am. Chem. Soc.*, 93, pages 1489, 1490 and 1491 (1971) and references cited therein, as illustrated by the following sequence of reactions:

wherein
$R^5$ represents methyl or benzyl;
$R^6$ represents hydrogen or acetyl; and
M represents sodium or thallium.

Briefly, this method comprises the reaction of cyclopentadienylsodium or cyclopentadienyl thallium (1), obtained by reaction of cyclopentadiene with sodium hydride or aqueous thallous sulfate in the presence of potassium hydroxide (E. J. Corey et al, *J. Am. Chem. Soc.*, 93, page 1489 (1971) with a slight excess of chloromethylmethylether or chloromethylbenzylether in tetrahydrofuran at approximately −55°C, to yield respectively the 5-methoxymethyl-1,3-cyclopentadiene (2, $R^5$ = methyl) or 5-benzyloxymethyl-1,3-cyclopentadiene (2, $R^5$ = benzyl) which are subjected to the Diels-Alder reaction with an excess (about 5 molar equivalents) of 2-chloroacrylonitrile in the presence of cupric fluoroborate as catalyst to yield a mixture of the endo-exo cyano nitriles of formulas (3) and (4) ($R^5$ = methyl or benzyl, respectively). This mixture of stereoisomeric nitriles is treated with potassium hydroxide in dimethylsulfoxide to yield the anti-bicyclic ketones of formula (5), i.e., 7-syn-methoxymethyl-2-norbornen-5-one ($R^5$ = methyl) or 7-syn-benzyloxymethyl-2-norbornen-5-one ($R^5$ = benzyl) respectively, which upon reaction with a slight molar excess of m-chloro-perbenzoic acid in methylene chloride in the presence of sodium bicarbonate result in selective Baeyer-Villiger oxidation to form the corresponding lactone (6), namely 2-oxa-3-oxo-Δ⁵-8-syn-methoxymethylbicyclo (3.2.1)-octane, ($R^5$ = methyl) and 2-oxa-3-oxo-Δ⁵-8-syn-benzyloxymethylbicyclo (3.2.1) octane ($R^5$ = benzyl). Saponification of the foregoing lactones of formula (6) with 2.5 equivalents of sodium hydroxide in aqueous methanol, followed by neutralization with carbon dioxide and treatment with 2.5 equivalents of aqueous potassium triiodide solution at 0° to 5°C produce the respective racemic hydroxyiodolactones of formula (7). The 1'R-antimers of (7), namely 1'R-(2'α,4'α-dihydroxy-3'β-iodo-5'β-benzyloxymethylcyclopent-1'α-yl)-acetic acid 1,2'-lactone (7, $R^5$ = benzyl, $R^6$ = H) and 1'R-(2'α, 4'α-dihydroxy-3'β-iodo-5'β-methoxymethylcyclopent-1'α-yl)-acetic acid 1,2'-

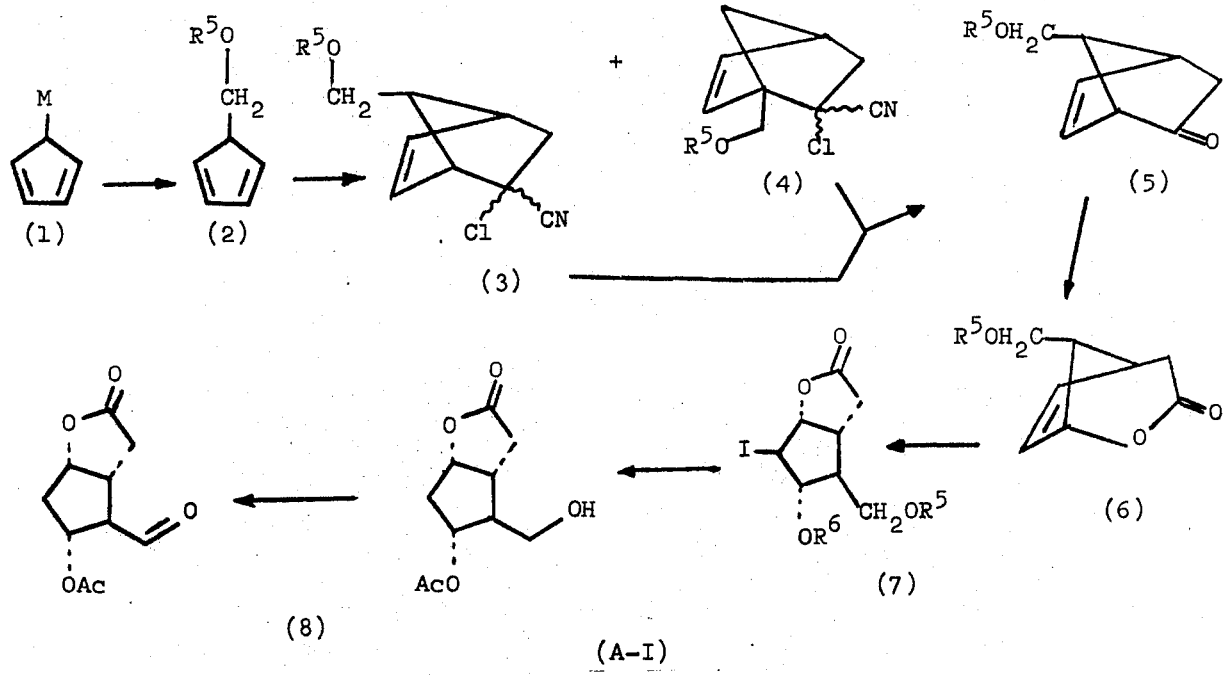

(A-I)

lactone (7, $R^5$ = methyl, $R^6$ = H) are obtained as described by E. J. Corey et al, in *J. Am. Chem. Soc.* 93, 1491 (1971) and in *J. Am. Chem. Soc.* 92, 397 (1970) respectively, via base catalyzed hydrolysis of the corresponding lactone (6) to the hydroxyacid, resolution of the hydroxyacid as the (+)-amphetamine salt for the benzyloxymethyl compound or as the (−)-ephedrine salt for the methoxymethyl compound and iodolactonization of the respective 1′R-antimeric acid. The racemic compounds of formula (7) or the 1′R-antimers thereof are then esterified with acetic anhydride in pyridine, under conventional conditions to yield the corresponding acetoxy compound, (7, $R^6$ = acetyl). The racemic compound or the 1′R-antimer is then submitted to deiodination using tri-n-butyl tin hydride in the presence of catalytic amounts of azobisisobutyronitrile in benzene solution and thence to cleavage of the 5′β-benzyloxymethyl or 5′β-methoxymethyl group to produce the hydroxymethyl compound (8) (Racemic or 1′R-antimer).

The benzyloxymethyl group is cleaved by hydrogenolysis in the presence of palladium charcoal and perchloric acid as catalysts, in a suitable organic solvent. The methoxymethyl group is hydrolyzed by reaction with boron tribromide in methylene chloride at a temperature comprised between about −78°C to 0°C.

Oxidation of a hydroxymethyl compound (8) (racemic or 1′R-antimer) with chromium trioxide-dipyridine complex (prepared as described by J. C. Collins et al. in *Tetrahedron Letters*, page 3363 (1968) in methylene chloride solution at about 0°C, affords respectively the racemic or 1′R-antimeric aldehyde of formula A-I.

The compounds, esters and salts of the invention exhibit prostaglandin-like biological activities and thus are useful in the treatment of mammals where the use of prostaglandins are indicated. The compounds, esters and salts of the invention are bronchodilators and thus are useful in treating mammals for bronchial spasm or wherever strong bronchodilators are indicated. These compounds are also useful in controlling or palliating hypertension in mammals and further exhibit central nervous system depressant activity in mammals, and are useful as sedatives. In addition, the compounds are useful for inducing labor, in pregnancy, and for inducing menses to correct or reduce menstrual abnormalities.

The compounds and/or salts, of the invention, can be administered in a wide variety of dosage forms, either alone or in combination with other pharmaceutically compatible medicaments, in the form of pharmaceutical compositions suited for oral or parenteral administration or inhalation in the case of bronchodilators. The compounds are typically administered as pharmaceutical compositions consisting essentially of the compounds and/or salts, of the invention, and a pharmaceutical carrier. The pharmaceutical carrier can be either a solid material, liquid, or aerosol, in which the compound and/or salt is dissolved, dispersed or suspended, and can optionally contain small amounts of preservatives and/or pH buffering agents. Suitable preservatives which can be used include, for example, benzyl alcohol and the like. Suitable buffering agents include, for example, sodium acetate and pharmaceutical phosphate salts and the like.

The liquid compositions can, for example, be in the form of solutions, emulsions, suspensions, syrups or elixirs. The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, talcum, sodium bisulfite and the like.

For inhalation administration, the compounds and/or salts can, for example, be administered as an aerosol comprising the compounds or salts in an inert propellant together with a co-solvent (e.g., ethanol) together with optional preservatives and buffering agents. Additional general information concerning the inhalation administration of aerosols can be had by reference to U.S. Pat. Nos. 2,868,691 and 3,095,355.

The compounds of this invention are typically administered in dosages of about from 0.01 to 10 mg. per kg. of body weight. The precise effective dosage will, of course, vary depending upon the mode of administration, condition being treated and host.

A further understanding of the invention can be had from the following Preparations and Examples, however they are not intended to limit its scope. Further, when individual antimers are used as starting materials, antimeric compounds are obtained as products, while when racemic mixtures are used as starting materials, the products obtained are racemates. Also where needed, Examples are repeated to provide starting materials for subsequent Examples.

PREPARATION 1.

A. To a stirred solution of 125 g. of thallium sulfate and 50 g. of potassium hydroxide in 750 ml. of water are added, under an atmosphere of argon, 43 ml. of freshly distilled cyclopentadiene and the mixture is vigorously stirred for 10 minutes; the yellow precipitate formed as filtered off, washed with ice water, methanol and ether, to yield 132 g. of cyclopentadienylthallium (1, M = thallium).

B. A mixture of 216.28 g. of benzyl alcohol, 61.44 g. of paraformaldehyde, 481.6 g. of anhydrous magnesium sulfate and 1200 ml. of methylene chloride is cooled to a temperature of between −50° to −55°C in a dry ice-acetonitrile bath, and the stirred cold solution is saturated with anhydrous hydrogen chloride gas. The reaction mixture is kept at −50° to −55°C for 10 minutes further, and then the excess of hydrogen chloride is eliminated by passing a stream of nitrogen during 30 minutes. The reaction mixture is filtered and the solid material washed well with pentane, and the combined filtrates are evaporated to dryness at a temperature below 30°C, to produce an oil which is then distilled under reduced pressure to yield chloromethyl benzyl ether.

C. A suspension of 132 g. of cyclopentadienylthallium in 200 ml. of anhydrous ether is cooled to −20°C in a dry ice-carbon tetrachloride bath. To the cooled mixture are added under stirring and under an argon atmosphere, in a 15 minute period, 90 g. of chloromethyl benzyl ether. The reaction mixture is stirred for 3 ½ hours at −20°C, it is then filtered in a filtration flask previously cooled to −78°C and the solid precipitate washed with cold pentane (−78°C).

The filtered solution is immediately added to a mixture of 216 g. of anhydrous α-chloroacrylonitrile and 30 g. of anhydrous cupric fluoroborate, previously cooled to −78°C. The reaction mixture is evaporated to half its original volume at a temperature not higher than 0°C, and the concentrate is stirred at 0°C for 48 hours. The reaction mixture is then poured into 200 ml.

of saturated sodium chloride solution and extracted three times with ether. The combined extracts are washed with saturated sodium bicarbonate solution (2 × 200 ml.) and saturated sodium chloride solution (2 × 200 ml.), dried over magnesium sulfate and evaporated to dryness under reduced pressure. The resulting residue is purified by filtration through 100 g. of silica gel using benzene as eluant, thus obtaining the pure 2-chloro-2-cyano-$\Delta^5$-7-syn-benzyloxymethylbicyclo-(2.2.1)-heptane [mixture of (3) and (4), $R^5$=benzyl]

PREPARATION 2

To a well-stirred slurry of 74.1 g. of cyclopentadienylthallium in 100 ml. of anhydrous ether cooled to −20° to −22°C (internal temperature) in a dry-ice carbon tetrachloride bath under an argon atmosphere, are added dropwise, in a 15 minute period, 20.13 g. of chloromethyl methyl ether and the slurry is stirred at −20°C to −22°C for 7 hours. The reaction mixture is then filtered into a precooled (−70°C., dry-ice-acetone) flask and the residue of thallium chloride washed with three 100 ml. portions of cold (−70°C) ether. The combined filtrate is added dropwise from a dropping funnel with a dry-ice jacket to a suspension of 29.65 g. of cupric tetrafluoroborate in 87.5 g. of anhydrous α-chloroacrylonitrile maintained at 0°C. When the addition is complete, the mixture is stirred at 0°C in the dark for 18 hours.

One hundred milliliters of saturated aqueous sodium chloride solution is then added and the reaction mixture extracted with ether. The ether extracts are successively washed with saturated sodium bicarbonate (2 × 100 ml.) and sodium chloride (2 × 100 ml.), and dried over magnesium sulfate. Evaporation under reduced pressure at room temperature give 2-chloro-2-cyano-$\Delta^5$-7 -syn-methoxymethylbicyclo-(2.2.1)-heptane [mixture of (3) and (4), $R^5$ = Me] as a clear pale yellow oil.

PREPARATION 3

To a stirred solution of 100 g. of 2-chloro-2-cyano-$\Delta^5$-7-syn-benzyloxymethylbicyclo-(2.2.1)-heptane in 368 ml. of dimethylsulfoxide is added dropwise, in a 15 minute period and under an argon atmosphere, a hot solution of 105.2 g. of potassium hydroxide in 52.6 ml. of water. The reaction mixture is stirred for 28 hours at room temperature, diluted to twice its volume with ice water and extracted several times with ether. The combined organic extract is washed twice with saturated sodium carbonate solution, dried over magnesium sulfate and evaporated to dryness. The residue is purified by distillation under high vacuum (0.6 mm.) to yield 7-syn-benzyloxymethyl-2-norbornen-5-one (5, $R^5$ = benzyl), homogeneous on thin-layer chromatography.

By the same procedure but using 2-chloro-2-cyano-$\Delta^5$-7-syn-methoxymethylbicyclo-(2.2.1)-heptane in lieu of 2-chloro-2-cyano-$\Delta^5$-7-syn-benzyloxymethylbicyclo-(2.2.1)-heptane, there is obtained 7-syn-methoxymethyl-2-norbornen-5-one (5, $R^5$ = methyl).

PREPARATION 4

To a suspension of 55 g. of m-chloroperbenzoic acid and 43.5 g. of sodium bicarbonate in 570 ml. of anhydrous methylene chloride are added 57 g. of 7-syn-benzyloxymethyl-2-norbornen-5-one, in a 15 minute period and under stirring, maintaining the temperature at about 25°C. The reaction mixture is stirred for three hours further, and diluted with methylene chloride. The resulting mixture is vigorously stirred with 470 ml. of saturated aqueous sodium sulfite solution, the organic layer is separated and washed with saturated sodium sulfite solution. The aqueous phase is extracted with methylene chloride and the combined organic methylene chloride extracts are dried over magnesium sulfate and evaporated to dryness under reduced pressure, thus yielding 2-oxa-3-oxo-$\Delta^5$-8-syn-benzyloxymethylbicyclo-(3.2.1)-octane (6, $R^5$ = benzyl) as a homogeneus oil.

By the same procedure but using 7-syn-methoxymethyl-2-norbornen-5-one in place of 7-syn-benzyloxymethyl-2-norbornen-5-one there is obtained 2-oxa-3-oxo-$\Delta^5$-8-syn-methoxymethylbicyclo-(3.2.1)-octane (6, $R^5$ = Me).

PREPARATION 5

To a solution of 60 g. of 2-oxa-3-oxo-$\Delta^5$-8-syn-benzyloxymethylbicyclo-(3.2.1)-octane in 70 ml. of methanol is added, at 0°C, a solution of 30 g. of sodium hydroxide in 247 ml. of water, and the resulting mixture is stirred at room temperature for three hours. The methanol is then evaporated under vacuo at a temperature below 30°C, cooled to 0°C and extracted with ether to eliminate the unsaponified products. The aqueous phase is neutralized with carbon dioxide and immediately treated with a solution of 188.1 g. of iodine and 369 g. of potassium iodide in 275 ml. of water. The reaction mixture is stirred for 48 hours at 0°C and diluted with sodium sulfite solution until complete decoloration. It is then saturated with sodium potassium tartrate and extracted with methylene chloride. The organic extracts are dried over magnesium sulfate and evaporated to dryness under reduced pressure. The oily residue is crystallized from ether-methylene chloride, to yield the pure (2'α, 4'α-dihydroxy-3'β-iodo-5'β-benzyloxymethylcyclopent-1'α-yl)-acetic acid 1,2'-lactone (7, $R^5$ = benzyl; $R^6$ = H).

By the same procedure, 2-oxa-3-oxo-$\Delta^5$-8-syn-methoxymethylbicyclo-(3.2.1)-octane is converted itno (2'α,4'α-dihydroxy-3'β-iodo-5'β-methoxymethylcyclopent-1'α-yl)-acetic acid 1,2'-lactone.

PREPARATION 6

A mixture of 2.5 g. of (2'α,4'α-dihydroxy-3'β-iodo-5'β-benzyloxymethylcyclopent-1'α-yl)-acetic acid 1,2'-lactone, 2.5 ml. of pyridine and 5 ml. of acetic anhydride is kept at room temperature for 30 minutes. The solvents are then evaporated under reduced pressure, and the residue crystallized from ether, to yield (2'α-hydroxy-4'α-acetoxy-3'β-iodo-5'β-benzyloxymethylcyclopent-1'α-yl)-acetic acid 1,2'-lactone (7, $R^5$ = benzyl, $R^6$ = acetyl).

In a similar manner (2'α,4'α-dihydroxy-3'β-iodo-5'β-methoxymethylcyclopent-1'α-yl)-acetic acid 1,2'-lactone is converted into the corresponding 4'-acetoxy derivative.

Substituting 1'R-(2'α,4'α-dihydroxy-3'β-iodo-5'β-benzyloxymethylcyclopent-1'α-yl)-acetic acid 1,2'-lactone obtained as described by E. J. Corey et al, in *J. Am. Chem. Soc.* 93, 1491 (1971), for (2'α,4'α-dihydroxy-3'β-iodo-5'β-benzyloxymethylcyclopent-1'α-yl)-acetic acid 1,2'-lactone in the above procedure is productive of 1'R-(2'α-hydroxy-4'α-acetoxy-3'β-iodo-5'β-benzyloxymethylcyclopent-1'α-yl)-acetic acid 1,2'-lactone, (1'R-antimer of 7, $R^5$ = benzyl, $R^6$ = acetyl).

Likewise acetylation of 1'R-(2'α,4'α-dihydroxy-3'β-iodo-5'β-methoxymethylcyclopent-1'α-yl)-acetic acid 1,2'-lactone [obtained as described by E. J. Corey et al, in *J. Am. Chem. Soc.* 92, 397 (1970)], gives rise to 1'R-(2'α-hydroxy-4'α-acetoxy-3'β-iodo-5'β-methoxymethylcyclopent-1'α-yl)-acetic acid 1,2'-lactone, (1'R-antimer of 7, $R^5$ = methyl, $R^6$ = acetyl).

PREPARATION 7

To a solution of 6.2 g. of (2'α-hydroxy-4'α-acetoxy-3'β-iodo-5'β-benzyloxymethylcyclopent-1'α-yl)-acetic acid 1,2'-lactone in 80 ml. of anhydrous benzene (dried over molecular sieves) are added 4.0 g. of tri-n-butyl tin hydride, prepared according to the procedure of H. G. Kuivila and O. F. Beumel, Jr., *J. Am. Chem. Soc.*, 83, page 1216 (1961) and 20 mg. of azobisisobutyronitrile. The reaction mixture is stirred at 50°C for three hours then the benzene is removed by evaporation under reduced pressure, the oily residue is dissolved in 150 ml. of ether, and the ethereal solution is washed several times with 5 percent aqueous sodium hydroxide solution and then with saturated sodium chloride solution, dried over magnesium sulfate and evaporated under vacuo. The residue is dissolved in hexane and filtered through synthetic magnesium silicate, sold under the trademark Florisil by the Floridin Company, to remove nonpolar by-products, and the filtrate is purified by thin-layer chromatography using hexane-ethyl acetate (60:40) as eluant, to yield (2'α-hydroxy-4'α-acetoxy-5'β-benzyloxymethylcyclopent-1'α-yl)-acetic acid 1,2'-lactone.

In a similar manner, (2'α-hydroxy-4'α-acetoxy-3'β-iodo-5'β-methoxymethylcyclopent-1'α-yl)-acetic acid 1,2'-lactone, 1'R-(2'α-hydroxy-4'α-acetoxy-3'β-iodo-5'β-methoxymethylcyclopent-1'α-yl)-acetic acid 1,2'-lactone and 1'R-(2'α-hydroxy-4'α-acetoxy-3'β-iodo-5'β-benzyloxymethylcyclopent-1'α-yl)-acetic acid 1,2'-lactone, are converted respectively into:

(2'α-hydroxy-4'α-acetoxy-5'β-methoxymethylcyclopent-1'α-yl)-acetic acid 1,2'-lactone, 1'R-(2'α-hydroxy-4'α-acetoxy-5'β-methoxymethylcyclopent-1'α-yl)-acetic acid 1,2'-lactone and 1'R-(2'α-hydroxy-4'α-acetoxy-5'β-benzyloxymethylcyclopent-1'α-yl)-acetic acid 1,2'-lactone.

PREPARATION 8

A. To a prehydrogenated suspension of 600 mg. of 10 percent palladium charcoal catalyst in 20 ml. of ethyl acetate is added 6 g. of (2'α-hydroxy-4'α-acetoxy-5'β-benzyloxymethylcyclopent-1'α-yl)-acetic acid 1,2'-lactone and the mixture is stirred under hydrogen atmosphere until the absorption of hydrogen ceases. The catalyst is then separated by filtration and washed with ethyl acetate. The combined organic filtrates are evaporated to dryness under reduced pressure and the residue is purified by thin-layer chromatography using hexane-ethyl acetate (30:70) as eluant, to yield (2'α-hydroxy-4'α-acetoxy-5'β-hydroxymethylcyclopent-1'α-yl)-acetic acid 1,2'-lactone (8).

In a similar manner 1'R-(2'α-hydroxy-4'α-acetoxy-5'β-benzyloxymethylcyclopent-1'α-yl)-acetic acid 1,2'-lactone is converted into 1'R-(2'α-hydroxy-4'α-acetoxy-5'β-hydroxymethylcyclopent-1'α-yl)-acetic acid 1,2'-lactone (1'R-antimer of 8).

B. A stirred solution of 15 g. of (2'α-hydroxy-4'α-acetoxy-5'β-methoxymethylcyclopent-1'α-yl)-acetic acid 1,2'-lactone in 190 ml. of anhydrous methylene chloride is cooled to −78°C in a dry ice-acetone bath and treated with 25 ml. of boron tribromide. The stirred mixture is allowed to warm rapidly to 0°C and kept at this temperature for 50 minutes. To the resulting solution is added 270 ml. of ether to decompose excess boron tribromide, maintaining the reaction mixture at 0°C. The mixture is then poured into a vigorously stirred slurry of 95 g. of sodium bicarbonate in 500 ml. of a saturated aqueous solution of sodium potassium tartrate; the organic layer is separated and the aqueous phase extracted with methylene chloride. The combined organic extracts are dried over magnesium sulfate and evaporated under reduced pressure. The residue is purified by crystallization from chloroform to afford (2'α-hydroxy-4'α-acetoxy-5'β-hydroxymethylcyclopent-1'α-yl)-acetic acid 1,2'-lactone, identical to that obtained in part A.

By using 1'R-(2'α-hydroxy-4'α-acetoxy-5'β-methoxymethylcyclopent-1'α-yl)-acetic acid 1,2'-lactone as starting material there is obtained 1'R-(2'α-hydroxy-4'α-acetoxy-5'β-hydroxymethylcyclopent-1'α-yl)-acetic acid 1,2'-lactone, identical to that obtained in part A.

C. To a suspension of 60 g. of diatomaceous earth (dried for 24 hours at 105°C) and 60 g. of chromium trioxidedipyridine complex (prepared as described by J. C. Collins et al, *Tetrahedron Letters*, 3363 (1968) in 800 ml. of anhydrous methylene chloride, )) to 0° to 2°C is added under stirring 4.7 g. of (2'α-hydroxy-4'α-acetoxy-5'β-hydroxymethylcyclopent-1'α-yl)-acetic acid 1,2'-lactone dissolved in 500 ml. of methylene chloride and the mixture is stirred for 20 minutes further, maintaining the temperature at about 0°C; 20.8 g. of sodium bisulfate are then added and the mixture is stirred for an additional 10 minute period, the solids are separated by filtration and washed with methylene chloride. The combined filtrates are evaporated to dryness under reduced pressure, at a temperature below 0°C, obtaining (2'α-hydroxy-4'α-acetoxy-5'β-formylcyclopent-1'α-yl)-acetic acid 1,2'-lactone, A-I, as a homogeneous oil.

In a similar manner, 1'R-(2'α-hydroxy-4'α-acetoxy-5'β-hydroxymethylcyclopent-1'α-yl)-acetic acid 1,2'-lactone is converted into 1'R-(2'α-hydroxy-4'α-acetoxy-5'β-formylcyclopent-1'α-yl)-acetic acid 1,2'-lactone (1'R-antimer of A-I).

EXAMPLE 1

A. Preparation of dimethyl 2-oxo-n-alkylphosphonates. A solution of 100 g. of dimethyl methylphosphonate in 670 ml. of anhydrous tetrahydrofuran is cooled to −78°C under an argon atmosphere. To the cold solution is added dropwise under stirring and under an argon atmosphere, 495 ml. of 0.1M solution of n-butyllithium in tetrahydrofuran, maintaining the temperature at −70°C. When the addition is complete the reaction mixture is maintained under the same conditions for 10 additional minutes, a solution of 58 ml. of methyl caproate dissolved in 187 ml. of tetrahydrofuran is then carefully added, maintaining the temperature at −78°C. The reaction mixture is stirred at −78°C for two hours followed by stirring for four hours at room temperature. The excess base is neutralized with acetic acid and the solvent is evaporated under high vacuum. The residue is dissolved in ether-water (1:1, 950 ml. each), the ethereal phase is separated, washed with water and dried over magnesium sulfate. The ether is evaporated and the residue is purified by vacuum distillation, thus obtaining the pure dimethyl 2-oxo-heptylphosphonate.

In a similar manner but using methyl n-butanoate, methyl n-pentanoate, ethyl n-heptanoate, ethyl n-octanoate and methyl n-decanoate in place of methyl caproate, there are respectively obtained: dimethyl 2-oxopentylphosphonate, dimethyl 2-oxohexylphosphonate, dimethyl 2-oxo-octylphosphonate, dimethyl 2-oxononylphosphonate and dimethyl 2-oxoundecylphosphonate.

B. To a suspension of 1.8 g. of sodium hydride (previously washed with pentane, under argon) in 200 ml. of dimethoxyethane freshly distilled from lithium aluminum hydride is added, under stirring and under an atmosphere of argon, a solution of 8.1 g. of dimethyl 2-oxoheptylphosphonate in 100 ml. of anhydrous dimethoxyethane. The reaction mixture is stirred for 30 minutes at room temperature and 4.5 g. of 1'R-(2'α-hydroxy-4'α-acetoxy-5'β-formylcyclopent-1'α-yl)-acetic acid 1,2'-lactone dissolved in 120 ml. of dimethoxyethane are added. The reaction mixture is stirred at room temperature for two hours further, it is then carefully neutralized with acetic acid (to pH 7) and evaporated to dryness under reduced pressure at a temperature below 30°C. The solid residue is purified by chromatography using an 80 × 20 cm. silica plate and a benzenedioxane (90:10) mixture as eluant, to obtain 1'R-[2'α-hydroxy-4'α-acetoxy-5'β-(3''-oxo-oct-1''(t)-en-1''-yl)-cyclopent-1'α-yl]-acetic acid 1,2'-lactone, (II, R = $nC_5H_{11}$), [2'α-hydroxy-5'-(3''-oxo-oct-1''(t)-en-1''-yl)-cyclopent-4'-en-1'α-yl]-acetic acid 1,2'-lactone (III, R = $nC_5H_{11}$) and a small amount of dimethyl 2-oxoheptylphosphonate.

In a similar manner but using dimethyl 2-oxopentylphophonate, dimethyl 2-oxohexylphosphonate, dimethyl 2-oxooctylphosphonate, dimethyl 2-oxononylphosphonate and dimethyl 2-oxoundecylphosphonate in lieu of dimethyl 2-oxoheptylphosphonate there are respectively obtained:

1'R-[2'α-hydroxy-4'α-acetoxy-5'β-(3''-oxohex-1''(t)-en-1''-yl)-cyclopent-1'α-yl]-acetic acid 1,2'-lactone and 1'R-[2'α-hydroxy-5'-(3''-oxohex-1''(t)-en-1''-yl)-cyclopent-4'-en-1'α-yl]-acetic acid 1,2'-lactone;

1'R-[2'α-hydroxy-4'α-acetoxy-5'β-(3''-oxohept-1''(t)-en-1''-yl)-cyclopent-1'α-yl]-acetic acid 1,2'-lactone and 1'R-[2'α-hydroxy-5'-(3''-oxohept-1''(t)-en-1''-yl(-cyclopent-4'-en-1'α-yl]-acetic acid 1,2'-lactone;

1'R-[2'α-hydroxy-4'α-acetoxy-5'β-(3''-oxonon-1'(t)-en-1''-yl)-cyclopent-1'α-yl]-acetic acid 1,2'-lactone and 1'R-[2'α-hydroxy-5'-(3''-oxonon-1''(t)-en-1''-yl)-cyclopent-4'-en-1'α-yl]-acetic acid 1,2'-lactone;

1'R-[2'α-hydroxy-4'α-acetoxy-5'β-(3''-oxodec-1''(t)-en-1''-yl)-cyclopent-1'α-yl]-acetic acid 1,2'-lactone and 1'R[2'α-hydroxy-5'-(3''-oxodec-1''(t)-en-1''-yl)-cyclopent-4'-en-1'α-yl]-acetic acid 1,2'-lactone; and 1'R-[2'α-hydroxy-4'α-acetoxy-5'β-(3''-oxododec-1'(t)-en-1''-yl)-cyclopent-1'α-yl]-acetic acid 1,2'-lactone and 1'R-[2'α-hydroxy-5'-(3''-oxododec-1''(t)-en-1''-yl)-cyclopent-4'-en-1'α-yl]-acetic acid 1,2'-lactone.

Likewise, starting from racemic (2'α-hydroxy-4'α-acetoxy-5'β-formylcyclopent-1'α-yl)-acetic acid 1,2'-lactone there are obtained the corresponding racemates in place of the above-mentioned 1'R-antimers.

EXAMPLE 2

A solution of 1.1 g. of 1'R-[2'α-hydroxy-5'-(3''-oxo-oct-1''(t)-en-1''-yl)-cyclopent-4'-en-1'α-yl]-acetic acid 1,2'-lactone in 40 ml. of diglyme is heated to the boiling point and about 10 ml. are distilled off to remove moisture. To the stirred refluxing solution are added, dropwise and under continuous distillation, 22 g. of sodium chlorodifluoroacetate dissolved in 40 ml. of diglyme. After completion of the addition, the reaction mixture is refluxed for ten additional minutes. It is then evaporated to dryness under reduced pressure, the oily residue is dissolved in methylene chloride and filtered through alumina. The filtrate is evaporated to dryness and the residue purified by thin-layer chromatography using hexane-ethyl acetate (60:40) as eluant, to obtain two isomeric difluoromethylene compounds, namely, 1'S-[2'α-hydroxy-4'α,5'α-difluoromethylene-5'β-(3''-oxo-oct-1''(t)-en-1''-yl)-cyclopent-1'α-yl]-acetic acid 1,2'-lactone (IV, R = $nC_5H_{11}$) and 1'S-[2'α-hydroxy-4'β,5'β-difluoromethylene-5'α-(3''-oxo-oct-1''(t)-en-1''-yl)-cyclopent-1'α -yl]-acetic acid 1,2'-lactone (IV-A, R = $nC_5H_{11}$) which are recrystallized from methylene chloride-diethyl ether and diethyl etherhexane, respectively.

By the same method, starting from 1'R-[2'α-hdyroxy-5'-(3''-oxohex-1'(t)-en-1''-yl)-cyclopent-4'-en-1'α-yl]-acetic acid 1,2'-lactone, 1'R-[2'α-hydroxy-5'-(3''-oxohept-1''(t)-en-1''-yl)-cyclopent-4'-en-1'α-yl]-acetic acid 1,2'-lactone.

1'R-[2'α-hydroxy-5'-(3''-oxonon-1''(t)-en-1''-yl)-cyclopent-4'-en-1'α-yl]-acetic acid 1,2'-lactone, 1'R-[2'α-hydroxy-5'-(3''-oxodec-1''(t)-en-1''-yl)-cyclo-pent-4'-en-1'α-yl]-acetic acid 1,2'-lactone and 1'R-[2'α-hydroxy-5'-(3''-oxododec-1''(t)-en-1''-yl)-cyclopent-4'-en-1'α-yl]-acetic acid 1,2'-lactone, there are respectively obtained:

1'S-[2'α-hydroxy-4'α,5'α-difluoromethylene-5'β-(3''-oxohex-1''(t)-en-1''-yl)-cyclopent-1'α-yl]-acetic acid 1,2'-lactone and 1'S-[2'α-hydroxy-4'β,5'β-difluoromethylene-5'α-(3''-oxohex-1''(t)-en-1''-yl)-cyclopent-1'α-yl]-acetic acid 1,2'-lactone;

1'S-[2'α-hydroxy-4'α,5'α-difluoromethylene-5'β-(3''-oxohept-1''(t)-en-1''-yl)-cyclopent-1'α-yl]-acetic acid 1,2'-lactone and 1'S-[2'α-hydroxy-4'β,5'β-difluoromethylene-5'α-(3''-oxohept-1''(t)-en-1''-yl)-cyclopent-1'α-yl]-acetic acid 1,2'-lactone;

1'S-[2'α-hydroxy-4'α,5'α-difluoromethylene-5'β-(3''-oxonon-1''(t)-en-1''-yl)-cyclopent-1'α-yl]-acetic acid 1,2'-lactone and 1'S-[2'α-hydroxy-4'β,5'β-difluoromethylene-5'α-(3''-oxonon-1''(t)-en-1''-yl)-cyclopent-1'α-yl]-acetic acid 1,2'-lactone;

1'S-[2'α-hydroxy-4'α,5'α-difluoromethylene-5'β-(3''-oxodec-1''(t)-en-1''-yl)-cyclopent-1'α-yl]-acetic acid 1,2'-lactone and 1'S-[2'α-hydroxy-4'β,5'β-difluoromethylene-5'α-(3''-oxodec-1''(t)-en-1''-yl)-cyclopent-1'α-yl]-acetic acid 1,2'-lactone and 1'S-[2'α-hydroxy-4'α,5'α-difluoromethylene-5'β-(3''-oxododec-1''(t)-en-1''-yl)-cyclopent-1'α-yl]-acetic acid 1,2'-lactone and 1'S-[2'α-hydroxy-4'β,5'β-difluoromethylene-5'α-(3''-oxododec-1''(t)-en-1''-yl)-cyclopent-1'α-yl]-acetic acid 1,2'-lactone.

Likewise but using as starting materials the corresponding racemic compounds in place of the 1'R-antimers there are produced the corresponding racemic 4'α,5'α-difluoromethylene- and 4'β,5'β-difluoromethylene derivatives thereof.

EXAMPLE 3

To a stirred solution of 400 mg. of 1'S-[2'α-hydroxy-4'α,5'α-difluoromethylene-5'β-(3''-oxo-oct-1'''(t)-en-1'''-yl)-cyclopent-1'α-yl]-acetic acid 1,2'-lactone in 5 ml. of dimethoxyethane, freshly distilled from lithium aluminum hydride, are added 1.2 ml. of zinc borohydride reagent (prepared from 0.025 mol of fused zinc chloride, 0.050 mol of sodium borohydride in 50 ml. of dimethoxyethane, stirring the mixture for 16 hours and filtering the insoluble material under argon atmosphere). The reaction mixture is stirred for 90 minutes at room temperature, and then treated with a saturated solution of sodium bitartrate until the resulting evolution of gas ceases. It is then diluted with methylene chloride, dried over magnesium sulfate and evaporated to dryness under vacuo at a temperature below 30°C, to yield 1'S-[2'α-hydroxy-4'α,5'α-difluoromethylene-5'β-(3''α-hydroxyoct-1'''(t)-en-1'''-yl)-cyclopent-1'α-yl]-acetic acid 1,2'-lactone (V-A, R = nC$_5$H$_{11}$) in mixture with 1'S-[2'α-hydroxy-4'α,5'α-difluoromethylene-5'β-(3''β-hydroxyoct-1'''(t)-en-1'''-yl)-cyclopent-1'α-yl] acetic acid 1,2'-lactone (V-B, R = nC$_5$H$_{11}$).

This oily mixture is separated into the individual isomers by thin-layer chromatography using a mixture of methylene chloride-acetone (75:25) as eluant.

In a similar fashion, starting from 1'S-[2'α-hydroxy-4'β,5'β-difluoromethylene-5'α-(3''-oxo-oct-1'''(t)-en-1'''-yl)-cyclopent-1'α-yl]-acetic acid 1,2'-lactone, there is obtained a mixture of 1'S-[2'α-hydroxy-4'β,5'β-difluoromethylene-5'α-(3''α-hydroxyoct-1'''(t)-en-1'''-yl)-cyclopent-1'α-yl]-acetic acid 1,2'-lactone (V-C, R = nC$_5$H$_{11}$) and 1'S-[2'α-hydroxy-4'β,5'β-difluoromethylene-5'α-(3''β-hydroxyoct-1'''(t)-en-1'''-yl)-cyclopent-1'α-yl]-acetic acid 1,2'-lactone (V-D, R = nC$_5$H$_{11}$), which are separated into the individual isomers by t.l.c.

Likewise, the remaining 3''-oxo compounds obtained in Example 3 are converted into the corresponding 3''-hydroxy derivatives, namely:

1'S-[2'α-hydroxy-4'α,5'α-difluoromethylene-5'β-(3''α-hydroxy-hex-1'''(t)-en-1'''-yl)-cyclopent-1'α-yl]-acetic acid 1,2'-lactone and 1'S-[2'α-hydroxy-4'α,5'α-difluoromethylene-5'β-(3''β-hydroxy-hex-1'''(t)-en-1'''-yl)-cyclopent-1'α-yl]-acetic acid 1,2'-lactone;

1'S-[2'α-hydroxy-4'α,5'α-difluoromethylene-5'β-(3''α-hydroxy-hept-1'''(t)-en-1'''-yl)-cyclopent-1'α-yl]-acetic acid 1,2'-lactone and 1'S-[2'α-hydroxy-4'α,5'α-difluoromethylene-5'β-(3''β-hydroxy-hept-1'''(t)-en-1'''-yl)-cyclopent-1'α-yl]-acetic acid 1,2'-lactone;

1'S-[2'α-hydroxy-4'α,5'α-difluoromethylene-5'β-(3''α-hydroxy-non-1'''(t)-en-1'''-yl)-cyclopent-1'α-yl]-acetic acid 1,2'-lactone and 1'S-[2'α-hydroxy-4'α,5'α-difluoromethylene-5'β-(3''β-hydroxy-non-1'''(t)-en-1'''-yl)-cyclopent-1'α-yl]-acetic acid 1,2'-lactone;

1'S-[2'α-hydroxy-4'α,5'α-difluoromethylene-5'β-(3''α-hydroxy-dec-1'''(t)-en-1'''-yl)-cyclopent-1'α-yl]-acetic acid 1,2'-lactone and 1'S-[2'α-hydroxy-4'α,5'α-difluoromethylene-5'β-(3''β-hydroxy-dec-1'''(t)-en-1'''-yl)-cyclopent-1'α-yl]-acetic acid 1,2'-lactone;

1'S-[2'α-hydroxy-4'α,5'α-difluoromethylene-5'β-(3''α-hydroxy-dodec-1'''(t)-en-1'''-yl)-cyclopent-1'α-yl]-acetic acid 1,2'-lactone and 1'S-[2'α-hydroxy-4'α,5'α-difluoromethylene-5'β-(3''β-hydroxy-dodec-1'''(t)-en-1'''-yl)-cyclopent-1'α-yl]-acetic acid 1,2'-lactone;

1'S-[2'α-hydroxy-4'β,5'β-difluoromethylene-5'α-(3''α-hydroxyhex-1'''(t)-en-1'''-yl)-cyclopent-1'α-yl]-acetic acid 1,2'-lactone and 1'S-[2'α-hydroxy-4'β,5'β-difluoromethylene-5'α-(3''β-hydroxyhex-1'''(t)-en-1'''-yl)-cyclopent-1'α-yl]-acetic acid 1,2'-lactone;

1'S-[2'α-hydroxy-4'β,5'β-difluoromethylene-5'α-(3''α-hydroxyhept-1'''(t)-en-1'''-yl)-cyclopent-1'α-yl]-acetic acid 1,2'-lactone and 1'S-[2'α-hydroxy-4'β,5'β-difluoromethylene-5'α-(3''β-hydroxyhept-1'''(t)-en-1'''-yl)-cyclopent-1'α-yl]-acetic acid 1,2'-lactone;

1'S-[2'α-hydroxy-4'β,5'β-difluoromethylene-5'α-(3''α-hydroxynon-1'''(t)-en-1'''-yl)-cyclopent-1'α-yl]-acetic acid 1,2'-lactone and 1'S-[2'α-hydroxy-4'β,5'β-difluoromethylene-5'α-(3''β-hydroxynon-1'''(t)-en-1'''-yl)-cyclopent-1'α-yl]-acetic acid 1,2'-lactone;

1'S-[2'α-hydroxy-4'β,5'β-difluoromethylene-5'α-(3''α-hydroxydec-1'''(t)-en-1'''-yl)-cyclopent-1'α-yl]-acetic acid 1,2'-lactone and 1'S-[2'α-hydroxy-4'β,5'β-difluoromethylene-5'α-(3''β-hydroxydec-1'''-(t)-en-1'''-yl)-cyclopent-1'α-yl]-acetic acid 1,2'-lactone;

1'S-[2'α-hydroxy-4'β,5'β-difluoromethylene-5'α-(3''α-hydroxydodec-1'''(t)-en-1'''-yl)-cyclopent-1'α-yl]-acetic acid 1,2'-lactone and 1'S-[2'α-hydroxy-4'β,5'β-difluoromethylene-5'α-(3''β-hydroxydodec-1'''(t)-en-1'''-yl)-cyclopent-1'α-yl]-acetic acid 1,2'-lactone.

When using racemic mixtures in lieu of the 1'S-antimers as starting materials there are produced the corresponding racemates in place of the above-mentioned 1'S-antimeric compounds.

EXAMPLE 4

To a solution of 2 g. of 1'S-[2'α-hydroxy-4'α,5'α-difluoromethylene-5'β-(3''α-hydroxyoct-1'''(t)-en-1'''-yl)-cyclopent-1'α-yl]-acetic acid 1,2'-lactone in 20 ml. of methylene chloride are added 20 mg. of p-toluenesulfonic acid, and 2 ml. of freshly distilled dihydropyran. The reaction mixture is stirred for 15 minutes, at room temperature, a few drops of pyridine are added and diluted with ether. The ethereal solution is washed with 100 ml. of 50 percent aqueous sodium chloride solution and then with saturated aqueous sodium chloride solution. The organic phase is separated, dried over magnesium sulfate and evaporated to dryness under reduced pressure, at approximately 0°C. The oily residue is purified by thin-layer chromatography using chloroform-methanol (9:1) as eluant, to produce the pure 1-'S-[2'α-hydroxy-4'α,5'α-difluoromethylene-5'β-(3''α-tetrahydropyranyloxyoct-1'''(t)-en-1'''-yl)-cyclopent-1'α-yl]-acetic acid 1,2'-lactone (VI-A, R = nC$_5$H$_{11}$).

By the same method 1'S-[2'α-hydroxy-4'β, 5'β-difluoromethylene-5'α-(3''α-hydroxyoct-1'''(t)-en-1'''-yl)-cyclopent-1'α-yl]-acetic acid 1,2'-lactone is converted into the corresponding 3''-tetrahydropyranylether (VI-C, R = nC$_5$H$_{11}$).

In a similar manner, the remaining compounds obtained in Example 3 are converted into the corresponding 3''-tetrahydropyranylethers.

EXAMPLE 5

One gram of 1'S-[2'α-hydroxy-4'α,5'α- difluoromethylene-5'β-(3''α-tetrahydropyranyloxyoct-1'''(t)-en-1'''-yl)-cyclopent-1'α-yl]-acetic acid 1,2'-lactone is dissolved in 20 ml. of anhydrous toluene. The solution is cooled to −60°C and to the cold solution is added a solution of 650 mg. of diisobutylaluminum hydride in 2.7 ml. of anhydrous toluene, stirring the reaction mixture for 15 minutes at −60°C. It is then diluted with methanol until the evolution of gas ceases, the mixture is stirred for 15 minutes further at room temperature and diluted with ether. The organic phase is then separated, washed with saturated sodium chloride solution, dried over magnesium sulfate and evaporated to dryness at about 0°C to produce 1'S-[2'α-hydroxy-4'α,5'α-difluoromethylene-5'β-(3''α-tetrahydropyranyloxyoct-1'''(t)-en-1'''-yl)-cyclopent-1'α-yl]-acetaldehyde 1,2'-hemiacetal (VII-A, R = nC$_5$H$_{11}$).

By the same method, 1'S-[2'α-hydroxy-4'β,5'β-difluoromethylene-5'α-(3''α-tetrahydropyranyloxyoct-1'''(t)-en-1'''-yl)-cyclopent-1'α-yl]-acetic acid 1,2'-lactone is converted into 1'S-[2'α-hydroxy-4'β,5'β-difluoromethylene-5'α-(3''α-tetrahydropyranyloxyoct-1'''(t)-en-1'''-yl)-cyclopent-1'α-yl]-acetaldehyde 1,2'-hemiacetal (VII-C, R = nC$_5$H$_{11}$).

In a similar manner, the following compounds are produced, starting from the corresponding lactones:

1'S-[2'α-hydroxy-4'α,5'α-difluoromethylene-5'β-(3''β-tetrahydropyranyloxyoct-1'''(t)-en-1'''-yl)-cyclopent-1'α-yl]-acetaldehyde 1,2'-hemiacetal (VII-B, R=nC$_5$H$_{11}$), 1'S-[2'α-hydroxy-4'β,5'β-difluoromethylene-5'α-(3''β-tetrahydropyranyloxyoct-1'''(t)-en-1'''-yl)-cyclopent-1'α-yl]-acetaldehyde-1,2'-hemiacetal (VII-D, R = nC$_5$H$_{11}$), 1'S-[2'α-hydroxy-4'α,5'α-difluoromethylene-5'β-(3''α-tetrahydropyranyloxyhex-1'''(t)-en-1'''-yl)-cyclopent-1'α-yl]-acetal dehyde 1,2'-hemiacetal, 1'S-[2'α-hydroxy-4'α,5'α-difluoromethylene-5'β-(3''α-tetrahydropyranyloxyhept-1'''(t)-en-1'''-yl)-cyclopent-1'α-yl]-acetaldehyde 1,2'-hemiacetal, 1'S-[2'α-hydroxy-4'α,5'α-difluoromethylene-5'β-(3''α-tetrahydropyranyloxynon-1'''(t)-en-1'''-yl)-cyclopent-1'α-yl]-acetaldehyde 1,2'-hemiacetal, 1'S-[2'α-hydroxy-4'α,5'α-difluoromethylene-5'β-(3''α-tetrahydropyranyloxydec-1'''(t)-en-1'''-yl)-cyclopent-1'α-yl]-acetaldehyde 1,2'-hemiacetal, 1'S-[2'α-hydroxy-4'α,5'α-difluoromethylene-5'β-(3''α-tetrahydropyranyloxydodec-1'''(t)-en-1'''-yl)-cyclopent-1'α-yl]-acetaldehyde 1,2'-hemiacetal, 1'S-[2'α-hydroxy-4'β,5'β-difluoromethylene-5'α-(3''α-tetrahydropyranyloxyhex-1'''(t)-en-1'''-yl)-cyclopent-1'α-yl]-acetaldehyde 1,2'-hemiacetal, 1'S-[2'α-hydroxy-4'β,5'β-difluoromethylene-5'α-(3''α-tetrahydropyranyloxyhept-1'''(t)-en-1'''-yl)-cyclopent-1'α-yl]-acetaldehyde 1,2'-hemiacetal, 1'S-[2'α-hydroxy-4'β,5'β-difluoromethylene-5'α-(3''α-tetrahydropyranyloxynon-1'''(t)-en-1'''-yl)-cyclopent-1'α-yl]-acetaldehyde 1,2'-hemiacetal, 1'S-[2'α-hydroxy-4'β,5'β-difluoromethylene-5'α-(3''α-tetrahydropyranyloxydec-1'''(t)-en-1'''-yl)-cyclopent-1'α-yl]-acetaldehyde 1,2'-hemiacetal, 1'S-[2'α-hydroxy-4'β,5'β-difluoromethylene-5'α-(3''α-tetrahydropyranyloxydodec-1'''(t)-en-1'''-yl)-cyclopent-1'α-yl]-acetaldehyde 1,2'-hemiacetal, 1'S-[2'α-hydroxy-4'α,5'α-difluoromethylene-5'β-(3''β-tetrahydropyranyloxyhex-1'''(t)-en-1'''-yl)-cyclopent-1'α-yl]-acetaldehyde 1,2'-hemiacetal, 1'S-[2'α-hydroxy-4'α,5'α-difluoromethylene-5'β-(3''β-tetrahydropyranyloxydec-1'''(t)-en-1'''-yl)-cyclopent-1'α-yl]-acetaldehyde 1,2'-hemiacetal, 1'S-[2'α-hydroxy-4'β,5'β-difluoromethylene-5'α-(3''β-tetrahydropyranyloxyhept-1'''(t)-en-1'''-yl)-cyclopent-1'α-yl]-acetaldehyde 1,2'-hemiacetal, 1'S-[2'α-hydroxy-4'β,5'β-difluoromethylene-5'α-(3''β-tetrahydropyranyloxydodec-1'''(t)-en-1'''-yl)-cyclopent-1'α-yl]-acetaldehyde 1,2'-hemiacetal.

Likewise but using racemic compounds in place of 1'S-antimers there are produced the corresponding racemates of the above-mentioned compounds.

EXAMPLE 6

A stirred suspension of 440 mg. of sodium hydride in 5 ml. of anhydrous dimethylsulfoxide is heated to 80°C for half an hour under an argon atmosphere; 1.4 ml. of the resulting solution are added to a solution of 380 mg. of dried 5-triphenylphosphoniopentanoic acid bromide in 0.8 ml. of anhydrous dimethylsulfoxide, under an argon atmosphere, and under stirring. The reaction mixture is stirred for 5 minutes, 150 mg. of 1'S-[2'α-hydroxy-4'α,5'α-difluoromethylene-5'β-(3''α-tetrahydropyranyloxyoct-1'''(t)-en-1'''-yl)-cyclopent-1'α-yl]-acetaldehyde 1,2'-hemiacetal dissolved in 1 ml. of dimethylsulfoxide is added, and the reaction mixture is stirred at room temperature for 18 hours. The solvent is then evaporated under reduced pressure at a temperature below 35°C and the residue is dissolved in 10 ml. of water. The neutral products are extracted with ethyl acetate:ether (1:1) (4 × 4 ml.). The aqueous phase is acidified with saturated aqueous oxalic acid solution to pH 2, and extracted several times with a mixture of pentane:ether (1:1). The combined organic extracts are washed with saturated aqueous sodium chloride solution, dried over magnesium sulfate and evaporated to dryness at a temperature not higher than 20°C. Purification of the residue by thin-layer chromatography, using chloroform: methanol,(9:1) as eluant, affords the pure 8S-9α-hydroxy-11α,12α-difluoromethylene-15α-tetrahydropyranyloxyprosta-5-cis,13-trans-dienoic acid (VIII-A, R = nC$_5$H$_{11}$)

The 5-triphenylphosphoniopentanoic acid bromide used as reagent is prepared by reflux of a mixture of 9.5 g. of 5-bromopentanoic acid, 14.4 g. of triphenylphosphine and 100 ml. of acetonitrile for about 70 hours. The insoluble material is separated by filtration and the filtrate is concentrated to a small volume. The product is crystallized by addition of ether, and is further purified by two subsequent recrystallizations from acetonitrile-ether.

In a similar manner, starting from the corresponding lactols obtained in Example 5 there are produced the following prostadienoic acid derivatives:

8S-9α-hydroxy-11β,12β-difluoromethylene-15α-tetrahydropyranyloxy-12α-prosta-5-cis,13-trans-dienoic acid (VIII-C, R = nC$_5$H$_{11}$), 8S-9α-hydroxy-11α,12α-difluoromethylene-15β-tetrahydropyranyloxyprosta-5-cis,13-trans-dienoic acid (VIII-B, R = nC$_5$H$_{11}$), 8S-9α-hydroxy-11β,12β-difluoromethylene-15β-tetrahydropyranyloxy-12α-prosta-5-cis,13-trans-dienoic acid (VIII-D, R = nC$_5$H$_{11}$), 8S-9α-hydroxy-11α,12α-difluoromethylene-15α-tetrahydropyranyloxy-20-bisnorprosta-5-cis,13-trans-dienoic acid, 8S-9α-hydroxy-11α,12α-difluoromethylene-15α-tetrahydropyranyloxy-20-norprosta-5-cis,13-trans-dienoic acid, 8S-9α-hydroxy-11α,12α-difluoromethylene-15α-tetrahydropyranyloxy-20-methylprosta-5-cis,13-trans-dienoic acid, 8S-9α-hydroxy-11α,12α-difluoromethylene-15α-tetrahydropyranyloxy-20-ethylprosta-5-cis,13-trans-dienoic acid, 8S-9α-hydroxy-11α,12α-difluoromethylene-15α-tetrahydropyranyloxy-20-butylprosta-5-cis,13-trans-dienoic acid, 8S-9α-hydroxy-11β,12β-difluoromethylene-15α-tetrahydropyranyloxy-20-bisnor-12α-prosta-5-cis,13-trans-dienoic acid, 8S-9α-hydroxy-11β,12β-difluoromethylene-15α-tetrahydropyranyloxy-20-nor-12α-prosta-5-cis,13-trans-dienoic acid, 8S-9α-hydroxy-11β,12β-difluoromethylene-15α-tetrahydropyranyloxy-20-methyl-12α-prosta-5-cis,13-trans-dienoic acid, 8S-9α-hydroxy-11β,12β-difluoromethylene-15α-tetrahydropyranyloxy-20-ethyl-12α-prosta-5-cis,13-trans-dienoic acid, 8S-9α-hydroxy-11β,12β-difluoromethylene-15α-tetrahydropyranyloxy-20-butyl-12α-prosta-5-cis,-13-trans-dienoic acid, 8S-9α-hydroxy-11α,12α-difluoromethylene-15β-tetrahydropyranyloxy-20-bisnorprosta-5-cis,13-trans-dienoic acid, 8S-9α-hydroxy-11α,12α-difluoromethylene-15β-tetrahydropyranyloxy-20-ethylprosta-5-cis,13-trans-dienoic acid, 8S-9α-hydroxy-11β,12β-difluoromethylene-15β-tetrahydropyranyloxy-20-nor-12α-prosta-5-cis,13-trans-dienoic acid, and 8S-9α-hydroxy-11β,12β-difluoromethylene-15β-tetrahydropyranyloxy-20-butyl-12α-prosta-5-cis,13-trans-dienoic acid.

Likewise, starting from racemic [2'α-hydroxy-4'α,5'α-difluoromethylene-5'β-(3''α-tetrahydropyranyloxyoct-1''(t)-en-1''-yl)-cyclopent-1'α-yl]-acetaldehyde hemiacetal there is obtained racemic 9α-hydroxy-11α,12α-difluoromethylene-15α-tetrahydropyranyloxyprosta-5-cis,13-trans-dienoic acid.

EXAMPLE 7

A. A solution of 100 mg. of 8S-9α-hydroxy-11α,12α-difluoromethylene-15α-tetrahydropyranyloxyprosta-5-cis,13-trans-dienoic acid in 4 ml. of purified acetone is cooled to −10°C and treated under an atmosphere of nitrogen and with stirring, with 0.15 ml. of an 8N solution of chromic acid (prepared by mixing 26 g. of chromium trioxide with 23 ml. of concentrated sulfuric acid and diluting with water to 100 ml.). The reaction mixture is stirred for 30 minutes further at −10°C, 0.15 ml. of isopropanol are then added to destroy the excess reagent, and the mixture diluted with ethyl acetate. The solution is immediately washed three times with sodium chloride solution, dried over magnesium sulfate and evaporated to dryness under reduced pressure, to give 8R-9-keto-11α,12α-difluoromethylene-15α-tetrahydropyranyloxyprosta-5-cis,13-trans-dienoic acid (IX-A, R = nC$_5$H$_{11}$), which is purified by thin-layer chromatography using chloroform:methanol (9:1) as eluant.

B. A mixture of 173 mg. of 8R-9-keto-11α,12α-difluoromethylene-15α-tetrahydropyranyloxyprosta-5-cis,13-transdienoic acid, 0.45 ml. of tetrahydrofuran and 4.5 ml. of 65 percent aqueous acetic acid is stirred at 40°C for four hours, cooled to 0°C and evaporated to dryness under reduced pressure; the oily residue is purified by thin-layer chromatography using chloroform:methanol (9:1) as eluant, thus yielding the pure 8R-9-keto-11α,12α-difluoromethylene-15α-hydroxyprosta-5-cis, 13-trans-dienoic acid (X-A, R = nC$_5$H$_{11}$).

In another experiment the reaction mixture is kept at room temperature for 18 hours, obtaining the same results.

By repeating the procedures described in Parts A and B of this Example using as starting materials the remaining compounds obtained in Example 6, there are produced as final products respectively:

8R-9-keto-11β,12α-difluoromethylene-15β-hydroxy-12α-prosta-5-cis,13-trans-dienoic acid (X-C, R =nC$_5$H$_{11}$), 8R-9-keto-11α, 12α-difluoromethylene-15β-hydroxyprosta-5-cis,13-trans-dienoic acid (X-B, R = nC$_5$H$_{11}$), 8R-9-keto-11β, 12β-difluoromethylene-15β-hydroxy-12α-prosta-5-cis,13-trans-dienoic acid (X-D, R = nC$_5$H$_{11}$), 8R-9-keto-11α,12α-difluoromethylene-15α-hydroxy-20-bis-norprosta-5-cis,13-trans-dienoic acid, 8R-9-keto-11α,12α-difluoromethylene-15α-hydroxy-20-norprosta-5-cis,13-trans-dienoic acid, 8R-9-keto-11α, 12α-difluoromethylene-15α-hydroxyl-20-methylprosta-5-cis,13-trans-dienoic acid, 8R-9-keto-11α, 12α-difluoromethylene-15α-hydroxy-20-ethylprosta-5-cis,13-trans-dienoic acid, 8R-9-keto-11α, 12α-difluoromethylene-15α-hydroxy-20-butylprosta-5-cis,13-trans-dienoic acid, 8R-9-keto-11β, 12β-difluoromethylene-15α-hydroxy-20-bis-nor-12α-prosta-5-cis,13-trans-dienoic acid, 8R-9-keto-11β,12β-difluoromethylene-15α-hydroxy-20-nor-12α-prosta-5-cis,13-trans-dienoic acid, 8R-9-keto-11β,12β-difluoromethylene-15α-hydroxy-20-methyl-12α-prosta-5-cis,13-trans-dienoic acid, 8R-9-keto-11β,12β-difluoromethylene-15α-hydroxy-20-ethyl-12α-prosta-5-cis,13-trans-dienoic acid, 8R-9-keto-11β, 12β-difluoromethylene-15α-hydroxy-20-butyl-12α-prosta-5-cis,13-trans-dienoic acid, 8R-9-keto-11α, 12α-difluoromethylene-15β-hydroxy-20-bis-norprosta-5-cis,13-trans-dienoic acid, 8R-9-keto-11α, 12α-difluoromethylene-15β-hydroxy-20-ethylprosta-5-cis,13-trans-dienoic acid, 8R-9-keto-11β, 12β-difluoromethylene-15β-hydroxy-20-nor-12α-prosta-5-cis,13-trans-dienoic acid, and 8R-9-keto-11β,12β-difluoromethylene-15β-hydroxy-20-butyl-12α-prosta-5-cis,13-trans-dienoic acid.

Likewise, starting from racemic 9α-hydroxy-11α, 12-α-difluoromethylene-15α-tetrahydropyranyloxyprosta-5-cis,13-trans-dienoic acid there is obtained as final product racemic 9-keto-11α,12α-difluoromethylene-15α-hydroxyprosta-5-cis,13-trans-dienoic acid.

EXAMPLE 8

Fifteen milligrams of 8S-9α-hydroxy-11α,12α-difluoromethylene-15α-tetrahydropyranyloxyprosta-5-cis,13-trans-dienoic acid is dissolved in a mixture of 2 ml. of benzene and 3 ml. of acetone containing 5 mg. of freshly prepared tris-(triphenylphosphine) chlorohodium, at room temperature. The resulting mixture is stirred in a hydrogen atmosphere and aliquots are removed at periodic intervals. The aliquots are esterified with diazomethane and analyzed by gas liquid chromatography to determine whether hydrogenation has been completed. When the hydrogenation is determined to be essentially complete (ca. six hours), the reaction mixture is applied to 20 percent wt. silver nitrate impregnated silica gel (G) preparative plates developing with chloroform:methanol:acetic acid:water in a 95:75:1:0.6 parts by volume ratio. The zone corresponding to the desired monounsaturated compound is eluted with a 90:10, by volume, of a mixture of chloroform and methanol yielding pure 8S-9α-hydroxy-11α,12α-difluoromethylene-15α-tetrahydropyranyloxyprost-13-trans-enoic acid (XI-A, R = nC$_5$H$_{11}$).

Similarly by following the same procedure using as starting materials the corresponding prosta-5-cis,13-trans-dienoic acid derivatives obtained in Example 6, the following compounds are respectively prepared:

8S-9α-hydroxy-11β,12β-difluoromethylene-15α-tetrahydropyranyloxy-12α-prost-13-trans-enoic acid (XI-C, R = nC$_5$H$_{11}$)

8S-9α-hydroxy-11α,12α-difluoromethylene-15β-tetrahydropyranyloxyprost-13-trans-enoic (XI-B, R = nC$_5$H$_{11}$), 8S-9α-hydroxy-11β,12β-difluoromethylene-15β-tetrahydropyranyloxy-12α-prost-13-trans-enoic acid (XI-D, R = nC$_5$H$_{11}$).

8S-9α-hydroxy-11α,12α-difluoromethylene-15α-tetrahydropyranyloxy-20-bisnorprost-13-trans-enoic acid, 8S-9α-hydroxy-11α,12α-difluoromethylene-15α-tetrahydropyranyloxy-20-norprost-13-trans-enoic acid, 8S-9α-hydroxy-11α,12α-difluoromethylene-15α-tetrahydropyranyloxy-20-methylprost-13-trans-enoic acid, 8S-9α-hydroxy-11α,12α-difluoromethylene-15α-tetrahydropyranyloxy-20-ethylprost-13-trans-enoic acid, 8S-9α-hydroxy-11α,12α-difluoromethylene-15α-tetrahydropyranyloxy-20-butylprost-13-trans-enoic acid, 8S-9α-hydroxy-11β,12β-difluoromethylene-15α-tetrahydropyranyloxy-20-bisnor-12α-prost-13-trans-enoic acid, 8S-9α-hydroxy-11β,12β-difluoromethylene-15α-tetrahydropyranyloxy-20-nor-12α-prost-13-trans-enoic acid, 8S-9α-hydroxy-11β,12β-difluoromethylene-15α-tetrahydropyranyloxy-20-methyl-12α-prost-13-trans-enoic acid, 8S-9α-hydroxy-11β,12β-difluoromethylene-15α-tetrahydropyranyloxy-20-ethyl-12α-prost-13-trans-enoic acid, 8S-9α-hydroxy-11β,12β-difluoromethylene-15α-tetrahydropyranyloxy-20-butyl-12α-prost-13-trans-enoic acid, 8S-9α-hydroxy-11α,12α-difluoromethylene-15β-tetrahydropyranyloxy-20-bisnorprost-13-trans-enoic acid, 8S-9α-hydroxy-11α,12α-difluoromethylene-15α-tetrahydropyranyloxy-20-ethylprost-13-trans-enoic acid, 8S-9α-hydroxy-11β,12β-difluoromethylene-15β-tetrahydropyranyloxy-20-nor-12α-prost-13-trans-enoic acid, and 8S-9α-hydroxy-11β,12β-difluoromethylene-15β-tetrahydropyranyloxy-20-butyl-12α-prost-13-trans-enoic acid.

Likewise, racemic 9α-hydroxy-11α,12α-difluoromethylene-15α-tetrahydropyranyloxyprosta-5-cis,13-trans-dienoic acid is converted into racemic 9α-hydroxy-11α,12α-difluoromethylene-15α-tetrahydropyranyloxyprost-13-trans-enoic acid.

EXAMPLE 9

To a solution of 100 mg. of 8R-9-keto-11α,12α-difluoromethylene-15α-hydroxyprosta-5-cis,13-trans-dienoic acid in 5 ml. of methylene chloride is added 1 ml. of an ethereal solution of diazomethane and the reaction mixture is maintained at room temperature for 30 minutes. The solvents and excess reagent are eliminated under reduced pressure, to yield 8R-9-keto-11α,12α-difluoromethylene-15α-hydroxyprosta-5-cis,13-trans-dienoic acid methyl ester.

In a similar manner, the remaining prostadienoic acid compounds obtained in Example 7 are converted into the corresponding methyl esters.

EXAMPLE 10

A solution of 100 mg. of 8R-9-keto-11α,12α-difluoromethylene-15α-hydroxyprosta-5-cis,13-trans-dienoic acid methyl ester in 5 ml. of methanol is cooled to 0°C and treated with 50 mg. of sodium borohydride; the reaction mixture is stirred at room temperature for 30 minutes and then evaporated to dryness under reduced pressure, water is added to the oily residue and the product extracted with ethyl acetate. The organic extract is washed with dilute hydrochloric acid solution and water to neutral, dried over magnesium sulfate and evaporated to dryness under reduced pressure. The residue is purified by chromatography on silica gel using methylene chloride-ethyl acetate mixtures to thus obtain 8S-11α,12α-difluoromethylene-9α,15α-dihydroxyprosta-5-cis,13-trans-dienoic acid methyl ester (XII-A, R = nC$_5$H$_{11}$; R$^4$ = Me) and 8S-11α,12α-difluoromethylene-9β,15α-dihydroxyprosta-5-cis,13-trans-dienoic acid methyl ester (XIII-A, R = nC$_5$H$_{11}$; R$^4$ = Me) in approximately equal amounts.

In a similar manner, starting from the corresponding methyl esters of the 9-keto prostadienoic acid compounds of Example 7, there are produced:

8S-11α,12α-difluoromethylene-9α,15β-dihydroxyprosta-5-cis-13-trans-dienoic acid methyl ester (XII-B, R = nC$_5$H$_{11}$; R$^4$ = Me) and 8S-11α,12α-difluoromethylene-9β15β-dihydroxyprosta-5-cis-13-trans-dienoic acid methyl ester (XIII-B, R = nC$_5$H$_{11}$; R$^4$ = Me);

8S-11β,12β-difluoromethylene-9α,15α-dihydroxy-12α-prosta-5-cis-13-trans-dienoic acid methyl ester (XII-C, R = nC$_5$H$_{11}$; R$^4$ = Me) and 8S-11β,12β-difluoromethylene-9β,15α-dihydroxy-12α-prosta-5-cis,13-trans-dienoic acid methyl ester (XIII-C, R = nC$_5$H$_{11}$; R$^4$ = Me);

8S-11β,12β-difluoromethylene-9α,15β-dihydroxy-12α-prosta-5-cis,13-trans-dienoic acid methyl ester (XII-D, R = $nC_5H_{11}$; $R^4$ = Me) and 8S-11β,12β-difluoromethylene-9β,15β-dihydroxy-12α-prosta-5-cis,13-trans-dienoic acid methyl ester (XIII-D, R = $nC_5H_{11}$; $R^4$ = Me);

8S-11α,12α-difluoromethylene-9α,15α-dihydroxy-20-bisnorprosta-5-cis,13-trans-dienoic acid methyl ester and 8S-11α,12α-difluoromethylene-9β,15α-dihydroxy-20-bisnorprosta-5-cis,13-trans-dienoic acid methyl ester;

8S-11α,12α-difluoromethylene-9α,15α-dihydroxy-20-norprosta-5-cis,13-trans-dienoic acid methyl ester and 8S-11α,12α-difluoromethylene-9β,15α-dihydroxy-20-norprosta-5-cis,13-trans-dienoic acid methyl ester;

8S-11α,12α-difluoromethylene-9α,15α-dihydroxy-20-methylprosta-5-cis,13-trans-dienoic acid methyl ester and 8S-11α,12α-difluoromethylene-9β,15α-dihydroxy-20-methylprosta-5-cis,13-trans-dienoic acid methyl ester;

8S-11α,12α-difluoromethylene-9α,15α-dihydroxy-20-ethylprosta-5-cis,13-trans-dienoic acid methyl ester and 8S-11α,12α-difluoromethylene-9β,15α-dihydroxy-20-ethylprosta-5-cis,13-trans-dienoic acid methyl ester;

8S-11α,12α-difluoromethylene-9α,15α-dihydroxy-20-butylprosta-5-cis,13-trans-dienoic acid methyl ester and 8S-11α,12α-difluoromethylene-9β,15α-dihydroxy-20-butylprosta-5-cis,13-trans-dienoic acid methyl ester;

8S-11β,12β-difluoromethylene-9α,15α-dihydroxy-20-bisnor-12α-prosta-5-cis,13-trans-dienoic acid methyl ester and 8S-11β,12β-difluoromethylene-9β,15α-dihydroxy-20-bisnor-12α-prosta-5-cis,13-trans-dienoic acid methyl ester;

8S-11β,12β-difluoromethylene-9α,15α-dihydroxy-20-nor-12α-prosta-5-cis,13-trans-dienoic acid methyl ester and 8S-11β,12β-difluoromethylene-9β,15α-dihydroxy-20-nor12α-prosta-5-cis,13-trans-dienoic acid methyl ester;

8S-11β,12β-difluoromethylene-9α,15α-dihydroxy-20-methyl-12α-prosta-5-cis,13-trans-dienoic acid methyl ester and 8S-11β,12β-difluoromethylene-9β,15α-dihydroxy-20-methyl-12α-prosta-5-cis,13-trans-dienoic acid methyl ester;

8S-11β,12β-difluoromethylene-9α,15α-dihydroxy-20-ethyl-12α-prosta-5-cis,13-trans-dienoic acid methyl ester and 8S-11β,12β-difluoromethylene-9β,15α-dihydroxy-20-ethyl-12α-prosta-5-cis,13-trans-dienoic acid methyl ester;

8S-11β,12β-difluoromethylene-9α,15α-dihydroxy-20-butyl-12α-prosta-5-cis,13-trans-dienoic acid methyl ester and 8S-11β,12β-difluoromethylene-9β,15α-dihydroxy-20-butyl-12α-prosta-5-cis,13-trans-dienoic acid methyl ester;

8S-11α,12α-difluoromethylene-9α, 15β-dihydroxy-20-bisnorprosta-5-cis,13-trans-dienoic acid methyl ester and 8S-11α,12α-difluoromethylene-9β,15β-dihydroxy-20-bisnorprosta-5-cis,13-trans-dienoic acid methyl ester;

8S-11α,12α-difluoromethylene-9α,15β-dihydroxy-20-ethyl-prosta-5-cis,13-trans-dienoic acid methyl ester and 8S-11α,12α-difluoromethylene-9β,15β-dihydroxy-20-ethylprosta-5-cis,13-trans-dienoic acid methyl ester;

8S-11β,12β-difluoromethylene-9α,15β-dihydroxy-20-nor-12α-prosta-5-cis,13-trans-dienoic acid methyl ester and 8S-11β,12β-difluoromethylene-9β,15β-dihydroxy-20-nor-12α-prosta-5-cis,13-trans-dienoic acid methyl ester;

8S-11β,12β-difluoromethylene-9α,15β-dihydroxy-20-butyl-12α-prosta-5-cis,13-trans-dienoic acid methyl ester and 8S-11β,12β-difluoromethylene-9β,15β-dihydroxy-20-butyl-12α-prosta-5-cis,13-trans-dienoic acid methyl ester.

Likewise, starting from racemic 9-keto-11α,12α-difluoromethylene-15α-hydroxyprosta-5-cis, 13-trans-dienoic acid methyl ester there are obtained racemic 11α,12α-difluoromethylene-9α,15α-dihydroxyprosta-5-cis,13-trans-dienoic acid methyl ester and racemic 11α,12α-difluoromethylene-9β,15α-dihydroxyprosta-5-cis,13-trans-dienoic acid methyl ester.

EXAMPLE 11

Twenty milligrams of 8S-11α,12α-difluoromethylene-9α,15α-dihydroxyprosta-5-cis,13-trans-dienoic acid methyl ester are dissolved in a mixture of 2 ml. of methanol, 2 ml. of water and 90 mg. of potassium carbonate. The reaction mixture is maintained at 40°C for 16 hours under nitrogen atmosphere, 10 ml. of water are then added, and the reaction mixture is then evaporated under reduced pressure to half volume. It is then acidified with 2N hydrochloric acid to pH-2 and extracted several times with ethyl acetate. The combined organic extracts are dried over sodium sulfate and evaporated to dryness under reduced pressure to yield 8S-11α,12α-difluoromethylene-9α,15α-dihydroxyprosta-5-cis,13-trans-dienoic acid (XII-A, R = $nC_5H_{11}$; $R^4$ = H).

In a similar manner, the remaining prostadienoic acid methyl ester compounds obtained in Example 10 are converted into the corresponding free acids, e.g.:

8S-11α,12α-difluoromethylene-9α,15β-dihydroxyprosta-5-cis,13-trans-dienoic acid (XII-B, R = $nC_5H_{11}$; $R^4$ = H), 8S-11β,12β-difluoromethylene-9α,15α-dihydroxy-12α-prosta-5-cis,13-trans-dienoic acid (XII-C, R = $nC_5H_{11}$; $R^4$ = H), 8S-11β,12β-difluoromethylene-9α,15β-dihydroxy-12α-prosta-5-cis,13-trans-dienoic acid (XII-D, R = $nC_5H_{11}$; $R^4$ = H), 8S-11α,12α-difluoromethylene-9β,15α-dihydroxyprosta-5-cis, 13-trans-dienoic acid (XIII-A, R = $nC_5H_{11}$; $R^4$ = H), 8S-11α,12α-difluoromethylene-9β,15β-dihydroxyprosta-5-cis, 13-trans-dienoic acid (XIII-B, R = $nC_5H_{11}$; $R^4$ = H), 8S-11β,12β-difluoromethylene-9β,15α-dihydroxy-12α-prosta-5-cis,13-trans-dienoic acid (XIII-C, R = $nC_5H_{11}$; $R^4$ = H), 8S-11β,12β-difluoromethylene-9β,15β-dihydroxy-12α-prosta-5-cis,13-trans-dienoic acid (XIII-D, R = $nC_5H_{11}$; $R^4$ = H), 8S-11α,12α-difluoromethylene-9α,15α-dihydroxy-20-bisnorprosta-5-cis,13-trans-dienoic acid, 8S-11α,12α-difluoromethylene-9β,15α-dihydroxy-20-ethylprosta-5-cis,13-trans-dienoic acid, 8S-11β,12β-difluoromethylene-9α,15α-dihydroxy-20-nor-12α-prosta-5-cis,13-trans-dienoic acid, 8S-11β,12β-difluoromethylene-9β,15α-dihydroxy-20-methyl-12α-prosta-5-cis,13-trans-dienoic acid, and 8S-11β,12β-difluoromethylene-9β,15α-dihydroxy-20-ethyl-12α-prosta-5-cis,13-trans-dienoic acid.

EXAMPLE 12

To a solution of 80 mg. of 8R-9-keto-11α,12α-difluoromethylene-15α-hydroxyprosta-5-cis,13-trans-dienoic acid in 2 ml. of anhydrous methanol is added, at room temperature and under argon atmosphere, 0.22 ml. of a 2N solution of sodium methoxide in methanol. The reaction mixture is kept under the same conditions for 25 minutes, it is then acidified with dilute hydrochloric acid to pH-2 and extracted with ethyl acetate. The organic extract is washed with 50 percent saturated sodium chloride solution, dried over magnesium sulfate and evaporated to dryness under reduced pressure. Purification of the residue by thin layer chromatography using a methylene chloride-ether-acetic acid mixture (58:40:2) affords the pure 8S-9-keto-11α,12α-difluoromethylene-15α-hydroxy-8β-prosta-5-cis,13-trans-dienoic acid (XIV-A, R = nC$_5$H$_{11}$).

In a similar manner but using as starting materials the corresponding 8R-9-keto compounds obtained in Example 7, there are produced the following 8S-antimers:

8S-9-keto-11β, 12β-difluoromethylene-15α-hydroxy-8β,12α-prosta-5-cis,13-trans-dienoic acid (XIV-C, R = nC$_5$H$_{11}$).

8S-9-keto-11α,12α-difluoromethylene-15β-hydroxy-8β-prosta-5-cis,13-trans-dienoic acid (XIV-B, R = nC$_5$H$_{11}$), 8S-9-keto-11β,12β-difluoromethylene-15β-hydroxy-8β,12α-prosta-5-cis,13-trans-dienoic acid, (XIV-D, R = nC$_5$H$_{11}$), 8S-9-keto-11α,12α-difluoromethylene-15α-hydroxy-20-bis-nor-8β-prosta-5-cis,13-trans-dienoic acid, 8S-9-keto-11α,12α-difluoromethylene-15α-hydroxy-20-nor-8β-prosta-5-cis,13-trans-dienoic acid, 8S-9-keto-11α,12α-difluoromethylene-15α-hydroxy-20-methyl-8β-prosta-5-cis,13-trans-dienoic acid, 8S-9-keto-11α,12α-difluoromethylene-15α-hydroxy-20-ethyl-8β-prosta-5-cis,13-trans-dienoic acid, 8S-9-keto-11α,12α-difluoromethylene-15α-hydroxy-20-butyl-8β-prosta, -5-cis,13-trans-dienoic acid, 8S-9-keto-11β,12β-difluoromethylene-15α-hydroxy-20-bis-nor-8β,12α-prosta-5-cis,13-trans-dienoic acid, 8S-9-keto-k11β,12β-difluoromethylene-15α-hydroxy-20-nor-8β,12α-prosta-5-cis,13-trans-dienoic acid, 8S-9-keto-11β,12β-difluoromethylene-15α-hydroxy-20-methyl-8β,12α-prosta-5-cis,13-trans-dienoic acid, 8S-9-keto-11β,12β-difluoromethylene-15α-hydroxy-20-ethyl-8β,12α-prosta-5-cis,13-trans-dienoic acid, 8S-9-keto-11β,12β-difluoromethylene-15α-hydroxy-20-butyl-8β,12α-prosta-5-cis,13-trans-dienoic acid, 8S-9-keto-11α,12α-difluoromethylene-15β-hydroxy-20-bis-nor-8β-prosta-5-cis,13-trans-dienoic acid, 8S-9-keto-11α,12α-difluoromethylene-15β-hydroxy-20-ethyl-8β-prosta-5-cis,13-trans-dienoic acid, 8S-9-keto-11β,12β-difluoromethylene-15β-hydroxy-20-nor-8β,12α-prosta-5-cis,13-trans-dienoic acid, and 8S-9-keto-11β,12β-difluoromethylene-15β-hydroxy-20-butyl-8β,12β-prosta-5-cis,13-trans-dienoic acid.

Likewise, racemic 9-keto-11α,12α-difluoromethylene-15α-hydroxyprosta-5-cis,13-trans-dienoic acid is converted into racemic 9-keto-11α,12α-difluoromethylene-15α-hydroxy-8β-prosta-5-cis,13-trans-dienoic acid.

EXAMPLE 13

In accordance with the method of Example 9, 8S-9-keto-11α,12α-difluoromethylene-15α-hydroxy-8β-prosta-5-cis,13-trans-dienoic acid is converted into its methyl ester.

A solution of 100 mg. of 8S-9-keto-11α,12α-difluoromethylene-15α-hydroxy-8β-prosta-5-cis,13-trans-dienoic acid methyl ester in 5 ml. of methanol is cooled to 0°C and treated with 50 mg. of sodium borohydride, the reaction mixture is stirred at room temperature for 30 minutes; water is then added and the product extracted with ethyl acetate. The organic extract is washed with dilute hydrochloric acid solution and water to neutral, dried and evaporated to dryness under vacuo. The residue is purified by chromatography on silica gel using methylene chloride-ethyl acetate mixtures to thus obtain 8R-11α,12α-difluoromethylene-9α,15α-dihydroxy-8β-prosta-5-cis,13-trans-dienoic acid methyl ester (XV-A, R=nC$_5$H$_{11}$; R$^4$ = Me) and 8R-11α,12α-difluoromethylene-9β,15α-dihydroxy-8β-prosta-5-cis,13-trans-dienoic acid methyl ester (XVI-A, R=nC$_5$H$_{11}$; R$^4$ = Me).

Similarly, the remaining 8S-9-keto compounds of Example 12 are esterified with diazomethane and thereafter reduced with sodium borohydride, to yield respectively:

8R-11α,12α-difluoromethylene-9α,15β-dihydroxy-8β-prosta-5-cis,13-trans-dienoic acid methyl ester (XV-B, R = nC$_5$H$_{11}$; R$^4$ = Me) and 8R-11α,12α-difluoromethylene-9β,15β-dihydroxy-8β-prosta-5-cis,13-trans-dienoic acid methyl ester (XVI-B, R = nC$_5$H$_{11}$; R$^4$ = Me);

8R-11β,12β-difluoromethylene-9α,15α-dihydroxy-8β,12α-prosta-5-cis,13-trans-dienoic acid methyl ester, (XV-C, R = nC$_5$H$_{11}$; R$^4$ = Me) and 8R-11β,12β-difluoromethylene-9β,15α-dihydroxy-8β,12α-prosta-5-cis,13-trans-dienoic acid methyl ester (XVI-C, R = nC$_5$H$_{11}$; R$^4$ = Me);

8R-11β,12β-difluoromethylene-9α,15β-dihydroxy-8β,12α-prosta-5-cis,13-trans-dienoic acid methyl ester (XV-D, R = nC$_5$H$_{11}$; R$^4$ = Me) and 8R-11β,12β-difluoromethylene-9β,15β-dihydroxy-8β,12α-prosta-5-cis,13-trans-dienoic acid methyl ester (XVI-D, R = nC$_5$H$_{11}$; R$^4$ = Me);

8R-11α,12α-difluoromethylene-9α,15α-dihydroxy-20-bisnor-8β-prosta-5-cis,13-trans-dienoic acid methyl ester and 8R-11α,12α-difluoromethylene-9β,15α-dihydroxy-20-bisnor-8β-prosta-5-cis,13-trans-dienoic acid methyl ester;

8R-11α,12α-difluoromethylene-9α,15α-dihydroxy-20-nor-8β-prosta-5-cis,13-trans-dienoic acid methyl ester and 8R-11α,12α-difluoromethylene-9β,15α-dihydroxy-20-nor-8β-prosta-5-cis,13-trans-dienoic acid methyl ester;

8R-11α,12α-difluoromethylene-9α,15α-dihydroxy-20-methyl-8β-prosta-5-cis,13-trans-dienoic acid methyl ester and 8R-11α,12α-difluoromethylene-9β,15α-dihydroxy-20 -methyl-8β-prosta-5-cis,13-trans-dienoic acid methyl ester;

8R-11α,12α-difluoromethylene-9α,15α-dihydroxy-20-ethyl-8β-prosta-5-cis,13-trans-dienoic acid methyl ester and 8R-11α,12α-difluoromethylene-9β,15α-dihydroxy-20-ethyl-8β-prosta-5-cis,13-trans-dienoic acid methyl ester;

8R-11α,12α-difluoromethylene-9α,15α-dihydroxy-20-butyl-8β-prosta-5-cis,13-trans-dienoic acid methyl ester and 8R-11α,12α-difluoromethylene-9β,15α-dihydroxy-20-butyl-8β-prosta-5-cis,13-trans-dienoic acid methyl ester;

8R-11β,12β-difluoromethylene-9α,15α-dihydroxy-20-bisnor-8β,12α-prosta-5-cis,13-trans-dienoic acid methyl ester and 8R-11β,12β-difluoromethylene-9β,15α-dihydroxy-20-bisnor-8β,12α-prosta-5-cis,13-trans-dienoic acid methyl ester;

8R-11β,12β-difluoromethylene-9α,15α-dihydroxy-20-nor-8β,12α-prosta-5-cis,13-trans-dienoic acid methyl ester and 8R-11β,12β-difluoromethylene-9β,15α-dihydroxy-20-nor-8β,12α-prosta-5-cis,13-trans-dienoic acid methyl ester;

8R-11β,12β-difluoromethylene-9α,15α-dihydroxy-20-methyl-8β,12α-prosta-5-cis,13-trans-dienoic acid methyl ester and 8R-11β,12β-difluoromethylene-9β,15α-dihydroxy-20-methyl-8β,12α-prosta-5-cis,13-trans-dienoic acid methyl ester;

8R-11β,12β-difluoromethylene-9α,15α-dihydroxy-20-ethyl-8β,12α-prosta-5-cis,13-trans-dienoic acid methyl ester and 8R-11β,12β-difluoromethylene-9β,15α-dihydroxy-20-ethyl-8β,12α-prosta-5-cis,13-trans-dienoic acid methyl ester;

8R-11β,12β-difluoromethylene-9α,15α-dihydroxy-20-butyl-8β,12α-prosta-5-cis,13-trans-dienoic acid methyl ester and 8R-11β,12β-difluoromethylene-9β,15α-dihydroxy-20-butyl-8β,12α-prosta-5-cis,13-trans-dienoic acid methyl ester;

8R-11α,12α-difluoromethylene-9α,15α-dihydroxy-20-bisnor-8β-prosta-5cis,13-trans-dienoic acid methyl ester and 8R-11α,12α-difluoromethylene-9β,15β-dihydroxy-20-bisnor-8β-prosta-5-cis,13-trans-dienoic acid methyl ester;

8R-11α,12α-difluoromethylene-9α,15β-dihydroxy-20-ethyl-8β-prosta-5-cis,13-trans-dienoic acid methyl ester and 8R-11α,12α-difluoromethylene-9β,15β-dihydroxy-20-ethyl-8β-prosta-5-cis,13-trans-dienoic acid methyl ester;

8R-11β,12β-difluoromethylene-9α,15β-dihydroxy-20-nor-8β,12α-prosta-5-cis,13-trans-dienoic acid methyl ester and 8R-11β,12β-difluoromethylene-9β,15β-dihydroxy-20-nor-8β,12α-prosta-5-cis,13-trans-dienoic acid methyl ester;

8R-11β,12β-difluoromethylene-9α,15β-dihydroxy-20-butyl-8β,12α-prosta-5-cis,13-trans-dienoic acid methyl ester and 8R-11β,12β-difluoromethylene-9β,15β-dihydroxy-20-butyl-8β,12α-prosta-5-cis,13-trans-dienoic acid methyl ester.

Likewise, starting from racemic 9-keto-11α,12α-difluoromethylene-15α-hydroxy-8β-prosta-5-cis,13-trans-dienoic acid methyl ester there are obtained racemic 11α,12α-difluoromethylene-9α,15α-dihydroxy-8β-prosta-5-cis,13-trans-dienoic acid methyl ester and racemic 11α,12α-difluoromethylene-9β,15α-dihydroxy-8β-prosta-5-cis,13-trans-dienoic acid methyl ester.

EXAMPLE 14

A. A suspension of 4 g. of crude pancreatic lipase (Sigma L-3126) in 40 ml. of a 0.1M sodium chloride and 0.50M calcium chloride solution in water is stirred at 25°C. for one hour. The mixture is then centrifuged for one hour at 5000 rev/min and at 25°C to 30°C. The supernatant is neutralized with 1N sodium hydroxide solution to pH 7.2 to 7.4 and used directly for the hydrolysis of the prostaglandin derivatives of the invention.

B. Forty-two milligrams of 8R-11α,12α-difluoromethylene-9α,15α-dihydroxy-8β-prosta-5-cis,13-trans-dienoic acid methyl ester are dissolved by sonication at 37°C for 20 minutes in 30 ml. of the lipase solution prepared as described in Part A. The reaction mixture is magnetically stirred for 15 minutes at 25°C to 27°C, adjusting constantly the pH at 7.2 to 7.4 during the reaction period with 1N sodium hydroxide solution. The reaction mixture is then acidified using a 0.2N hydrochloric acid solution and the product extracted several times from the solution with ethyl acetate and ether. The combined organic extracts are dried over magnesium sulfate and evaporated to dryness under vacuo. The residue is dissolved in methylene chloride and chromatographed on 3 g. of Florisil. The column is eluted successively with methylene chloride-diethyl ether mixtures, diethyl ether, diethyl etherethyl acetate mixtures, pure ethyl acetate and ethyl acetatemethanol (80:20). The fractions eluted with the latter solvent mixture afford the pure 8R-11α,12α-difluoromethylene-9α,15α-dihydroxy-8β-prosta-5-cis,13-trans-dienoic acid (XV-A, R = $nC_5H_{11}$; $R^4$ = H).

In a similar manner by following the above procedure or the procedure described in Example 11 the remaining alkyl ester compounds obtained in Example 13 as final products are converted into the corresponding free acids. Representative compounds thus obtained are:

8R-11α,12α-difluoromethylene-9α,15β-dihydroxy-8β-prosta-5-cis,13-trans-dienoic acid (XV-B, R = $nC_5H_{11}$; $R^4$ = H), 8R-11β,12β-difluoromethylene-9α,15α-dihydroxy-8β,12α-prosta-5-cis,13-trans-dienoic acid (XV-C, R = $nC_5H_{11}$; $R^4$ = H), 8R-11β,12β-difluoromethylene-9α,15β-dihydroxy-8β,12α-prosta-5-cis,13-trans-dienoic acid (XV-D, R = $nC_5H_{11}$; $R^4$ = H), 8R-11α,12α-difluoromethylene-9β,15α-dihydroxy-8β-prosta-5-cis,13-trans-dienoic acid (XVI-A, R = $nC_5H_{11}$; $R^4$ = H), 8R-11α,12α-difluoromethylene-9β,15β-dihydroxy-8β-prosta-5-cis,13-trans-dienoic acid (XVI-B, R = $nC_5H_{11}$; $R^4$ =H), 8R-11β,12β-difluoromethylene-9β,15α-dihydroxy-8β,12α-prosta-5-cis,13-trans-dienoic acid (XVI-C, R = $nC_5H_{11}$; $R^4$ = H)

8R-11β,12β-difluoromethylene-9β,15β-dihydroxy-8β,12α-prosta-5-cis,13-trans-dienoic acid (XVI-D, R = $nC_5H_{11}$; $R^4$ = H), 8R-11α,12α-difluoromethylene-9α,15α-dihydroxy-20-ethyl-8β-prosta-5-cis,13-trans-dienoic acid, 8R-11α,12α-difluoromethylene-9β,15β-dihydroxy-20-butyl-8β-prosta-5-cis,13-trans-dienoic acid, 8R-11β,12β-difluoromethylene-9α,15α-dihydroxy-20-bisnor-8β,12α-prosta-5-cis,13-trans-dienoic acid and 8R-11β,12β-difluoromethylene-9α,15α-dihydroxy-20-ethyl-8β,12α-prosta-5-cis,13-trans-dienoic acid.

EXAMPLE 15

To a suspension of 2 g. of Celite, diatomaceous earth (dried for 24 hours at 105°C) and 1 g. of chromium trioxide-dipyridine complex [prepared as described by J. C. Collins et al, in *Tetrahedron Letters*, 3363 (1968)] in 15 ml. of methylene chloride cooled to −5°C is added, under stirring, a solution of 130 mg. of 8S-9α-hydroxy-11α,12α-difluoromethylene-15α-tetrahydropyranyloxyprost-13-trans-enoic acid in 5 ml. of methylene chloride and the mixture is stirred for 15 minutes further at 0° to 5°C; 300 mg. of sodium bisulfate monohydrate are then added and the reaction mixture is stirred for an additional 10 minute period. The insoluble material is separated by filtration and washed well with methylene chloride. The combined organic filtrates are evaporated to dryness under vacuo and the residue purified by thin-layer chromatography, thus obtaining 8R-9-keto-11α,12α-difluoromethylene-15α-tetrahydropyranyloxyprost13-trans-enoic acid (XVII-A, R = nC$_5$H$_{11}$).

Same results are obtained when using 8N chromic acid in acetone solution, in accordance with the method of Example 7, part A.

Upon hydrolysis of the tetrahydropyranyloxy group with 65 percent aqueous acetic acid, in accordance with the method of Example 7, part B, there is produced 8R-9-keto-11α,12α-difluoromethylene-15α-hydroxyprost-13-trans-enoic acid (XVIII-A, R = nC$_5$H$_{11}$).

In a similar manner, starting from the remaining compounds obtained in Example 8, there are produced as final products, respectively:

8R-9-keto-11β,12β-difluoromethylene-15α-hydroxy-12α-prost-13-trans-enoic acid (XVIII-C, R = nC$_5$H$_{11}$), 8R-9-keto-11α,12α-difluoromethylene-15β-hydroxyprost-13-trans-enoic acid (XVIII-B, R = nC$_5$H$_{11}$), 8R-9-keto-11β,12β-difluoromethylene-15β-hydroxy-12α-prost-13-trans-enoic acid (XVIII-D, R = nC$_5$H$_{11}$), 8R-9-keto-11α,12α-difluoromethylene-15α-hydroxy-20-bisnorprost-13-trans-enoic acid, 8R-9-keto-11α,12α-difluoromethylene-15α-hydroxy-20-norprost-13-trans-enoic acid, 8R-9-keto-11α,12α-difluoromethylene-15α-hydroxy-20-methylprost-13-trans-enoic acid, 8R-9-keto-11α,12α-difluoromethylene-15α-hydroxy-20-ethylprost-13-trans-enoic acid, 8R-9-keto-11α,12α-difluoromethylene-15α-hydroxy-20-butylprost-13-trans-enoic acid, 8R-9-keto-11β,12β-difluoromethylene-15α-hydroxy-20-bisnor-12α-prost-13-trans-enoic acid, 8R-9-keto-11β,12β-difluoromethylene-15α-hydroxy-20-nor-12α-prost-13-trans-enoic acid, 8R-9-keto-11β,12β-difluoromethylene-15α-hydroxy-20-methyl-12α-prost-13-trans-enoic acid, 8R-9-keto-11β,12β-difluoromethylene-15α-hydroxy-20-ethyl-12α-prost-13-trans-enoic acid, 8R-9-keto-11β,12β-difluoromethylene-15-hydroxy-20-butyl-12α-prost-13-trans-enoic acid, 8R-9-keto-11α,12α-difluoromethylene-15β-hydroxy-20-bisnorprost-13-trans-enoic acid, 8R-9-keto-11α,12α-difluoromethylene-15β-hydroxy-20-ethyl-prost-13-trans-enoic acid, 3R-9-keto-11β,12β-difluoromethylene-15β-hydroxy-20-nor-12α-prost-13-trans-enoic acid and 8R-9-keto-11β,12β-difluoromethylene-15β-hydroxy-20-butyl-12α-prost-13 -trans-enoic acid.

Likewise, racemic 9α-hydroxy,11α,12α-difluoromethylene-15α-tetrahydropyranyloxyprost-13-trans-enoic acid is converted into racemic 9-keto-11α,12α-difluoromethylene-15α-hydroxyprost-13-trans-enoic acid.

EXAMPLE 16

By following the method of Example 9 200 mg. of 8-R-9-keto-11α,12α-difluoromethylene-15α-hydroxyprost-13-trans-enoic acid are converted into the corresponding methyl ester.

A solution of 200 mg. of 8R-9-keto-11α,12αdifluoromethylene-15α-hydroxyprost-13-trans-enoic acid methyl ester in 10 ml. of methanol is cooled to 0°C and treated with 100 mg. of sodium borohydride. The reaction mixture is stirred at room temperature for 30 minutes, and thereafter the solvent eliminated under vacuo. Water is added to the oily residue and the product extracted with ethyl acetate; the organic extract is washed with dilute hydrochloric acid solution and water to neutral, dried over magnesium sulfate and evaporated to dryness under vacuo. Purification of the residue by chromatography on silica gel using methylene chloride-ethyl acetate mixtures affords the pure 9α and 9β-hydroxy compounds i.e., 8S-11α,12α-difluoromethylene-9α,15α-dihydroxyprost-13-trans-enoic acid methyl ester (XIX-A, R = nC$_5$H$_{11}$; R$^4$ = Me) and 8S-11α,12α-difluoromethylene-9β,15α-dihydroxyprost-13-trans-enoic acid methyl ester (XX-A, R = nC$_5$H$_{11}$; R$^4$ = Me).

In a similar manner, the remaining 8R-9-ketoprostenoic acid derivatives obtained in Example 15 are converted into the corresponding methyl esters, which are in turn reduced with sodium borohydride to yield the respective 8S-9α and 9β-hydroxylated compounds, namely:

8S-11β,12β-difluoromethylene-9α,15α-dihydroxy-12α-prost-13-trans-enoic acid methyl ester (XIX-C, R = nC$_5$H$_{11}$; R$^4$ = Me) and 8S-11β,12β-difluoromethylene-9β,15α-dihydroxy-12α-prost-13-trans-enoic acid methyl ester (XX-C, R = nC$_5$H$_{11}$; R$^4$ = Me);

8S-11α,12α-difluoromethylene-9α,15β-dihydroxyprost-13-trans-enoic acid methyl ester (XIX-B, R = nC$_5$H$_{11}$; R$^4$ = Me) and 8S-11α,12α-difluoromethylene-9β,15β-dihydroxyprost-13-trans-enoic acid methyl ester (XX-B, R = nC$_5$H$_{11}$; R$^4$ = Me);

8S-11β,12β-difluoromethylene-9α,15β-dihydroxy-12α-prost-13-trans-enoic acid methyl ester (XIX-D, R = nC$_5$H$_{11}$; R$^4$ = Me) and 8S-11β,12β-difluoromethylene-9β,15β-dihydroxy-12α-prost-13-trans-enoic acid methyl ester (XX-D, R = nC$_5$H$_{11}$; R$^4$ = Me);

8S-11α,12α-difluoromethylene-9α,15α-dihydroxy-20-bisnorprost-13-trans-enoic acid methyl ester and 8S-11α,12α-difluoromethylene-9β,15α-dihydroxy-20-bisnorprost-13-trans-enoic acid methyl ester;

8S-11α,12α-difluoromethylene-9α,15α-dihydroxy-20-norprost-13-trans-enoic acid methyl ester and 8S-11α,12α-difluoromethylene-9β,15α-dihydroxy-20-norprost-13-trans-enoic acid methyl ester;

8S-11α,12α-difluoromethylene-9α,15α-dihydroxy-20-methylprost-13-trans-enoic acid methyl ester and 8S-11α,12α-difluoromethylene-9β,15α-dihydroxy-20-methylprost-13-trans-enoic acid methyl ester;

8S-11α,12α-difluoromethylene-9α,15α-dihydroxy- 20-ethylprost-13-trans-enoic acid methyl ester and 8S-11α,12α-difluoromethylene-9β,15α-dihydroxy-20-ethylprost-13-trans-enoic acid methyl ester;

8S-11α,12α-difluoromethylene-9α,15α-dihydroxy-20-butylprost-13-trans-enoic acid methyl ester and 8S-11α,12α-difluoromethylene-9β,15α-dihydroxy-20-butylprost-13-trans-enoic acid methyl ester;

8S-11β,12β-difluoromethylene-9α,15α-dihydroxy-20-bisnor-12α-prost-13-trans-enoic acid methyl ester and 8S-11β,12β-difluoromethylene-9β,15α-dihydroxy-20-bisnor-12α-prost-13-trans-enoic acid methyl ester;

8S-11β,12β-difluoromethylene-9α,15α-dihydroxy-20-nor-12α-prost-13-trans-enoic acid methyl ester and 8S-11β,12β-difluoromethylene-9β,15α-dihydroxy-20-nor-12α-prost-13-trans-enoic acid methyl ester;

8S-11β,12β-difluoromethylene-9α,15α-dihydroxy-20-methyl-12α-prost-13-trans-enoic acid methyl ester and 8S-11β,12β-difluoromethylene-9β,15α-dihydroxy-20-methyl-12α-prost-13-trans-enoic acid methyl ester;

8S-11β,12β-difluoromethylene-9α,15α-dihydroxy-20-ethyl-12α-prost-13-trans-enoic acid methyl ester and 8S-11β,12β-difluoromethylene-9β,15α-dihydroxy-20-ethyl-12α-prost-13-trans-enoic acid methyl ester;

8S-11β,12β-difluoromethylene-9α,15α-dihydroxy-20-butyl-12α-prost-13-trans-enoic acid methyl ester and 8S-11β,12β-difluoromethylene-9β,15α-dihydroxy-20-butyl-12α-prost-13-trans-enoic acid methyl ester;

8S-11α,12α-difluoromethylene-9α,15β-dihydroxy-20-bisnorprost-13-trans-enoic acid methyl ester and 8S-11α,12α-difluoromethylene-9β,15β-dihydroxy-20-bisnorprost-13-trans-enoic acid methyl ester;

8S-11α,12α-difluoromethylene-9α,15β-dihydroxy-20-ethylprost-13-trans-enoic acid methyl ester and 8S-11α,12α-difluoromethylene-9β,15β-dihydroxy-20-ethylprost-13-trans-enoic acid methyl ester;

8S-11β,12β-difluoromethylene-9α,15β-dihydroxy-20-nor-12α-prost-13-trans-enoic acid methyl ester and 8S-11β,12β-difluoromethylene-9β,15β-dihydroxy-20-nor-12α-prost-13-trans-enoic acid methyl ester;

8S-11β,12β-difluoromethylene-9α,15β-dihydroxy-20-butyl-12α-prost-13-trans-enoic acid methyl ester and 8S-11β,12β-difluoromethylene-9β,15β-dihydroxy-20-butyl-12α-prost-13-trans-enoic methyl ester.

Likewise starting from racemic 9-keto-11α,12α-difluoromethylene-15α-hydroxyprost-13-trans-enoic acid there are produced racemic 11α,12α-difluoromethylene-9α,15α-dihydroxyprost-13-trans-enoic acid methyl ester and reacemic 11α,12α-difluoromethylene-9β,15α-dihydroxyprost-13-trans-enoic acid methyl ester.

EXAMPLE 17

By following the method of Example 11, the 9α and 9β-hydroxylated methyl ester compounds obtained in Example 16 are converted into the corresponding free acids, e.g., 8S-11α,12α-difluoromethylene-9α,15α-dihydroxyprost-13-trans-enoic acid (XIX-A, R = nC₅H₁₁; R⁴ = H), 8S-11α,12α-difluoromethylene-9α,15β-dihydroxyprost-13-trans-enoic acid (XIX-B, R = nC₅H₁₁; R⁴ = H), 8S-11β,12β-difluoromethylene-9α,15α-dihydroxy-12α-prost-13-trans-enoic 13trans-enoic acid (XIX-C, R = nC₅H₁₁; R⁴ = H), 8S-11β,12β-difluoromethylene-9α,15β-dihydroxy-12α-prost-13-trans-enoic acid (XIX-D, R = nC₅H₁₁; R⁴ = H), 8S-11α,12α-difluoromethylene-9β,15α-dihydroxyprost-13-trans-enoic acid (XX-A, R = nC₅H₁₁; R⁴ = H);

8S-11α,12α-difluoromethylene-9β,15β-dihydroxyprost-13-trans-enoic acid (XX-B, R = nC₅H₁₁; R⁴ = H), 8S-11β, 12β-difluoromethylene-9β,15α-dihydroxy-12α-prost-13-trans-enoic acid (XX-C, R = nC₅H₁₁; R⁴ = H), 8S-11β,12β-difluoromethylene-9β,15β-dihydroxy-12α-prost-13-trans-enoic acid (XX-D, R = nC₅H₁₁; R⁴ = H), 8S-11α,12α-difluoromethylene-9α,15α-dihydroxy-20-ethylprost-13-trans-enoic acid, and 8S-11β,12β-difluromethylene-9β,15α-dihydroxy-20-ethyl-12α-prost-13-trans-enoic acid.

EXAMPLE 18

To a solution of 120 mg. of 8R-9-keto-11α,12α-difluoromethylene-15α-hydroxyprost-13-trans-enoic acid in 3 ml. of anhydrous methanol is added, at room temperature and under argon atmosphere, 0.33 ml. of 2N solution of sodium methoxide in methanol, and the reaction mixture is maintained at room temperature for 30 minutes. It is then acidified with dilute hydrochloric acid to pH-2 and extracted with methylene chloride. The organic extract is washed with 50 percent saturated sodium chloride solution, dried and evaporated to dryness under vacuo. The residue is purified by thin layer chromatography, to obtain the pure 8S-9-keto-11α,12α-difluoromethylene-15α-hydroxy-8β-prost-13-trans-enoic acid (XXI-A, R = nC₅H₁₁).

By the same method, the remaining 8R-prostenoic acid compounds of Example 15 are converted into the corresponding 8S-antimers, namely:

8S-9-keto-11β,12β-difluoromethylene-15α-hydroxy-8β,12α-prost-13-trans-enoic acid (XXI-C, R = nC₅H₁₁), 8S-9-keto-11α,12α-difluoromethylene-15β-hydroxy-8β-prost-13-trans-enoic acid (XXI-B, R = nC₅H₁₁), 8S-9-keto-11β,12β-difluromethylene-15β-hydroxy-8β,12α-prost-13-trans-enoic acid (XXI-D, R = nC₅H₁₁), 8S-9-keto-11α,12α-difluromethylene-15α-hydroxy-20-bis-nor-8β-prost-13-trans-enoic acid, 8S-9-keto-11α,12α-difluoromethylene-15α-hydroxy-20-nor-8β-prost-13-trans-enoic acid, 8S-9-keto-11α,12α-difluoromethylene-15α-hydroxy-20-methyl-8β-prost-13-trans-enoic acid, 8S-9-keto-11α,12α-difluoromethylene-15α-hydroxy-20-ethyl-8β-prost-13-trans-enoic acid, 8S-9-keto-11α,12α-difluoromethylene-15α-hydroxy-20-butyl-8β-prost-13-trans-enoic acid, 8S-9-keto-11β,12β-difluoromethylene-15α-hydroxy-20-bisnor-8β,12α-prost-13-trans-enoic acid, 8S-9-keto-11β,12β-difluoromethyene-15α-hydroxy-20-nor-8β,12α-prost-13-trans-enoic acid, 8S-9-keto-11β,12β-difluoromethylene-15α-hydroxy-20-methyl-8β,12α-prost-13-trans-enoic acid, 8S-9-keto-11β,12β-difluoromethylene-15α-hydroxy-20-ethyl-8β,12α-prost-13-trans-enoic acid, 8S-9-keto-11β,12β-difluoromethylene-15α-hydroxy-20-butyl-8β,12α-prost-13-trans-enoic acid, 8S-9-keto-11α,12α-difluoromethylene-15β-hydroxy-20-bisnor-8β-prost-13-trans-enoic acid, 8S-9-keto-11α,12α-difluoromethylene-15β-hydroxy-20-ethyl-8β-prost-13-trans-enoic acid, 8S-9-keto-11β,12β-difluoromethylene-15β-hydroxy-20-nor-8β,12α-prost-13-trans-enoic acid, and 8S-9-keto-11β,12β-difluoromethylene-15β-hydroxy-20-butyl-8β,12α-prost-13-trans-enoic acid.

Likewise racemic 9-keto-11α,12α-difluoromethylene-15α-hydroxyprost-13-trans-enoic acid is converted into racemic 9-keto-11α,12α-difluoromethylene-15α-hydroxy-8β-prost-13-trans-enoic acid.

EXAMPLE 19

In accordance with the method of Example 9, 200 mg. of 8S-9-keto-11α, 12α-difluoromethylene-15α-hydroxy-8β-prost-13-trans-enoic acid is esterified with diazomethane, to yield the corresponding methyl ester.

A solution of 200 mg. of 8S-9-keto-11α,12α-difluoromethylene-15α-hydroxy-8β-prost-13-trans-enoic acid methyl ester in 10 ml. of methanol is cooled to 0°C and treated with 100 mg. of sodium borohydride. The reaction mixture is stirred at room temperature for 30 minutes and thereafter the solvent is eliminated under vacuo. Water is added to the oily residue and the product extracted with ethyl acetate. The organic extract is washed with dilute hydrochloric acid solution and water to neutral, dried over magnesium sulfate and evaporated to dryness under vacuo. Purification of the residue by chromatography on silica gel, using methylene chloride-ethyl acetate mixtures affords the pure 9α and 9β-hydroxy compounds i.e., 8R-11α,12α-difluoromethylene-9α, 15α-dihydroxy-8β-prost-13-trans-enoic acid methyl ester (XXII-A, R = $nC_5H_{11}$; $R^4$ = Me) and 8R-11α,12α-difluoromethylene-9β, 15α-dihydroxy-8β-prost-13-trans-enoic acid methyl ester (XXIII-A, R = $nC_5H_{11}$; $R^4$ = Me).

In a similar manner the remaining 8S-9-ketoprostenoic acid derivatives obtained in Example 18 are converted into the corresponding methyl esters, which are in turn reduced with sodium borohydride to yield the respective 8R-9α and 9β-hydroxylated compounds, namely:

8R-11β,12β-difluromethylene-9α,15α-dihydroxy-8β,12α-prost-13-trans-enoic acid methyl ester (XXII-C, R = $nC_5H_{11}$; $R^4$ = Me) and 8R-11β,12β-difluoromethylene-9β,15α-dihydroxy-8β,12α-prost-13-trans-enoic acid methyl ester (XXIII-C, R = $nC_5H_{11}$; $R^4$ = Me);

8R-11α,12α-difluoromethylene-9α,15β-dihydroxy-8β-prost-13-trans-enoic acid methyl ester (XXII-B, R = $nC_5H_{11}$; $R^4$ = Me) and 8R-11α,12α-difluoromethylene-9β,15β-dihydroxy-8β-prost-13-trans-enoic acid methyl ester (XXIII-B, R = $nC_5H_{11}$; $R^4$ = Me);

8R-11β,12β-difluoromethylene-9α,15β-dihydroxy-8β,12α-prost-13-trans-enoic acid methyl ester (XXII-D, R = $nC_5H_{11}$; $R^4$ = Me)and 8R-11β,12β-difluoromethylene-9β,15β-dihydroxy-8β,12α-prost-13-trans-enoic acid methyl ester (XXIII-D, R = $nC_5H_{11}$; $R^4$ = Me), 8R-11α,12α-difluoromethylene-9α,15α-dihydroxy-20-bisnor-8β-prost-13-trans-enoic acid methyl ester and 8R-11α,12α-difluoromethylene-9β,15α-dihydroxy-20-bisnor-8β-prost-13-trans-enoic acid methyl ester;

8R-11α,12α-difluoromethylene-9α,15α-dihydroxy-20-nor-8β-prost-13-trans-enoic acid methyl ester and 8R-11α,12α-difluoromethylene-9β,15α-dihydroxy-20-nor-8β-prost-13-trans-enoic acid methyl ester;

8R-11α,12α-difluoromethylene-9α,15α-dihydroxy-20-methyl-8β-prost-13-trans-enoic acid methyl ester and 8R-11α,12α-difluoromethylene-9β,15α-dihydroxy-20-methyl-8β-prost-13-trans-enoic acid methyl ester;

8R-11α,12α-difluoromethylene-9α,15α-dihydroxy-20-ethyl-8β-prost-13-trans-enoic acid methyl ester and 8R-11α,12α-difluoromethylene-9β,15α-dihydroxy-20-ethyl-8β-prost-13-trans-enoic acid methyl ester;

8R-11α,12α-difluoromethylene-9α,15α-dihydroxy-20-butyl-8β-prost-13-trans-enoic acid methyl ester and 8R-11α,12α-difluoromethylene-9β,15α-dihydroxy-20-butyl-8β-prost-13-trans-enoic acid methyl ester;

8R-11β,12β-difluoromethylene-9α,15α-dihydroxy-20-bisnor-8β,12α-prost-13-trans-enoic acid methyl ester and 8R-11β,12β-difluoromethylene-9β,15α-dihydroxy-20-bisnor-8β,12α-prost-13-trans-enoic acid methyl ester;

8R-11β,12β-difluoromethylene-9α,15α-dihydroxy-20-nor-8β,12α-prost-13-trans-enoic acid methyl ester and 8R-11β,12β-difluoromethylene-9β,15α-dihydroxy-20-nor-8β,12α-prost-13-trans-enoic acid methyl ester;

8R-11β,12β-difluoromethylene-9α,15α-dihydroxy-20-methyl-8β,12α-prost-13-trans-enoic acid methyl ester and 8R-11β,12β-difluoromethylene-9β,15α-dihydroxy-20-methyl-8β,12α-prost-13-trans-enoic acid methyl ester;

8R-11β,12β-difluoromethylene-9α,15α-dihydroxy-20-ethyl-8β,12α-prost-13-trans-enoic acid methyl ester and 8R-11β,12β-difluoromethylene-9β,15α-dihydroxy-20-ethyl-8β,12α-prost-13-trans-enoic acid methyl ester;

8R-11β,12β-difluoromethylene-9α,15α-dihydroxy-20-butyl-8β,12α-prost-13-trans-enoic acid methyl ester and 8R-11β,12β-difluoromethylene-9β,15α-dihydroxy-20-butyl-8β,12α-prost-13-trans-enoic acid methyl ester; 8R-11α,12α-difluoromethylene-9α,15β-dihydroxy-20-bisnor-8β-prost-13-trans-enoic acid methyl ester and 8R-11α,12α-difluoromethylene-9β,15β-dihydroxy-20-bisnor-8β-prost-13-trans-enoic acid methyl ester;

8R-11α,12α-difluoromethylene-9α,15β-dihydroxy-20-ethyl-8β-prost-13-trans-enoic acid methyl ester and 8R-11α,12α-difluoromethylene-9β,15β-dihydroxy-20-ethyl-8β-prost-13-trans enoic acid methyl ester;

8R-11β,12β-difluoromethylene-9α,15β-dihydroxy-20-nor-8β,12α-prost-13-trans-enoic acid methyl ester and 8R-11β,12β-difluoromethylene-9β,15β-dihydroxy-20-nor-8β,12α-prost-13-trans-enoic acid methyl ester;

8R-11β,12β-difuoromethylene-9α,15β-dihydroxy-20-butyl-8β,12α-prost-13-trans-enoic acid methyl ester and 8R-11β,12β-difluoromethylene-9β,15β-dihydroxy-20-butyl-8β,12α-prost-13-trans-enoic acid methyl ester.

Likewise, starting from racemic 9-keto-11α,12α-difluoromethylene-15α-hydroxy-8β-prost-13-trans-enoic acid there are produced racemic 11β,12β-difluoromethylene-9α,15α-dihydroxy-8β-prost-13-trans-enoic acid methyl ester and racemic 11α,12α-difluoromethylene-9β,15α-dihydroxy-8β,12α-prost-13-trans-enoic acid methyl ester.

EXAMPLE 20

By following the methods of Examples 11 or 14 the 9α and 9β-hydroxylated-methyl ester 8R-antimeric compounds obtained in Example 19 are converted into the corresponding free acids. Representative compounds thus obtained are:

8R-11α,12α-difluoromethylene-9α,15α-dihydroxy-8β-prost-13-trans-enoic acid (XXII-A, R = nC$_5$H$_{11}$; R$^4$ = H);

8R-11α,12α-difluoromethylene-9α,15β-dihydroxy-8β-prost-13-trans-enoic acid (XXII-B, R = nC$_5$H$_{11}$; R$^4$ = H);

8R-11β,12β-difluoromethylene-9α,15α-dihydroxy-8β,12α-prost-13-trans-enoic acid (XXII-C, R = nC$_5$H$_{11}$; R$^4$ = H);

8R-11β,12β-difluoromethylene-9α,15β-dihydroxy-8β,12α-prost-13-trans-enoic acid (XXII-D, R = nC$_5$H$_{11}$; R$^4$ = H);

8R-11α,12α-difluoromethylene-9β,15α-dihydroxy-8β-prost-13-trans-enoic acid (XXIII-A, R = nC$_5$H$_{11}$; R$^4$ = H);

8R-11α,12α-difluoromethylene-9β,15β-dihydroxy-8β-prost-13-trans-enoic acid (XXIII-B, R = nC$_5$H$_{11}$; R$^4$ = H);

8R-11β,12β-difluoromethylene-9β,15α-dihydroxy-8β,12α-orist-13-trans-enoic acid acid (XXIII-C, R = nC$_5$H$_{11}$; R$^4$ = H);

8R-11β,12β-difluoromethylene-9β,15β-dihydroxy-8β,12α-prost-13-trans-enoic acid (XXIII-D, R = nC$_5$H$_{11}$; R$^4$ = H), 8R-11α,12α-difluoromethylene-9α,15α-dihydroxy-20-ethyl-8β-prost-13-trans-enoic acid and 8R-11β,12β-difluoromethylene-9β,15α-dihydroxy-20-ethyl-8β,12α-prost-13-trans-enoic acid.

EXAMPLE 21

By following the hydrolysis methods of Examples 11 or 14, using as starting materials the methyl esters of the racemic prostadienoic and prostenoic acid derivatives obtained in Examples 10, 13, 16 and 19, there are produced the corresponding free acids, namely:

Racemic 11α,12α-difluoromethylene-9α,15α-dihydroxyprosta-5-cis,13-trans-dienoic acid, racemic 11α,12α-difluoromethylene-9β,15α-dihydroxyprosta-5-cis,13-trans-dienoic acid, racemic 11α,12α-difluoromethylene-9α,15α-dihydroxy-8β-prosta-5-cis,13-trans-dienoic acid, racemic 11α,12α-difluoromethylene-9β,15α-dihydroxy-8β-prosta-5-cis,13-trans-dienoic acid, racemic 11α,12α-difluromethylene-9α,15α-dihydroxyprost-13-trans-enoic acid, racemic 11α,12α-difluoromethylene-9β,15α-dihydroxyprost-13-trans-enoic acid, racemic 11α,12α-difluoromethylene-9α,15α-dihydroxy-8β-prost-13-trans-enoic acid and racemic 11α,12α-difluoromethylene-9β,15α-dihydroxy-8β-prost-13-trans-enoic acid.

EXAMPLE 22

Examples 6, 7 and 12 are repeated starting from racemic [2'α-hydroxy-4'β,5'β-difluoromethylene-5α-(3''α-tetrahydropyranyloxyoct-1''(t)-en-1'''-yl)-cyclopent-1'β-yl] acetaldehyde 1,2'-hemiacetal, thus obtaining successively:

racemic 9α-hydroxy-11β,12β-difluoromethylene-15α-tetrahydropyranyloxy-12α-prosta-5-cis,13-trans-dienoic acid, racemic 9-keto-11β,12β-difluoromethylene-15α-tetrahydropyranyloxy-12α-prosta-5-cis,13-trans-dienoic acid, racemic 9-keto-11β,12β-difluoromethylene-15α-hydroxy-12α-prosta-5-cis,13-trans-dienoic acid and racemic 9-keto-11β,12β-difluoromethylene-15α-hydroxy-8β,12α-prosta-5-cis,13-trans-dienoic acid.

EXAMPLE 23

In accordance with the methods of Examples 8, 15 and 18, racemic 9α-hydroxy-11β,12β-difluoromethylene-15α-tetrahydropyranyloxy-12α-prosta-5-cis,13-trans-dienoic acid is converted successively into:

racemic 9α-hydroxy-11β,12β-difluoromethylene-15α-tetrahydropyranyloxy-12α-prost-13-trans-enoic acid, racemic 9-keto-11β,12β-difluoromethylene-15 α-tetrahydropyranyloxy-12α-prost-13-trans-enoic acid, racemic-9-keto-11β,12β-difluoromethylene-15α-hydroxy-12α-prost-13-trans-enoic acid and racemic 9-keto-11β,12β-difluoromethylene-15α-hydroxy-8β,12α-prost-13-trans-enoic acid.

EXAMPLE 24

By following the method of Example 9, racemic 9-keto-11β,12β-difluoromethylene-15α-hydroxy-12α-prosta-5-cis,13-trans-dienoic acid, racemic 9-keto-11β,12β-difluoromethylene-15α-hydroxy-8β,12α-prosta-5-cis,13-trans-dienoic acid, racemic 9-keto-11β,12β-difluoromethylene-15α-hydroxy-12α-prost-13-trans-enoic acid and racemic 9-keto-11β,12β-difluoromethylene-15α-hydroxy-8β,12α-prost-13-trans-enoic acid, are converted into the corresponding methyl esters.

EXAMPLE 25

Example 10 is repeated using as starting materials the racemic methyl ester compounds of Example 24, thus obtaining respectively:

racemic 11β,12β-difluoromethylene-9α,15α-dihydroxy-12α-prosta-5-cis,13-trans-dienoic acid methyl ester and racemic 11β,12β-difluoromethylene-9β,15α-dihydroxy-12α-prosta-5-cis, 13-trans-dienoic acid methyl ester;

racemic 11β,12β-difluoromethylene-9α,15α-dihydroxy-8β,12α-prosta-5-cis,13-trans-dienoic acid methyl ester and racemic 11β,12β-difluoromethylene-9β,15α-dihydroxy-8β,12α-prosta-5-cis,13-trans-dienoic acid methyl ester;

racemic 11β,12β-difluoromethylene-9α,15α-dihydroxy-12α-prost-13-trans-enoic acid methyl ester and racemic 11β,12β-difluoromethylene-9β,15α-dihydroxy-12α-prost-13-trans-enoic acid methyl ester and racemic 11β,12β-difluoromethylene-9α,15α-dihydroxy-8β,12α-prost-13-trans-enoic acid methyl ester and racemic 11β,12β-difluoromethylene-9β,15α-dihydroxy-8β,12α-prost-13-trans-enoic acid methyl ester.

Upon saponification of the methyl ester group, in accordance with the methods of Examples 11 or 14 there are produced the corresponding racemic free acids, i.e., racemic 11β,12β-difluoromethylene-9α,15α-dihydroxy-12α-prosta-5-cis,13-trans-dienoic acid, racemic 11β,12β-difluoromethylene-9α,15α-dihydroxy-8β,12α-prosta-5-cis,13-trans-dienoic acid, racemic 11β,12β-difluoromethylene-9α,15α-dihydroxy-12α-prost-13-trans-enoic acid, racemic 11β,12β-difluoromethylene-9α,15α-dihydroxy-8β,12α-prost-13-trans-enoic acid, and the corresponding 9β-isomers.

EXAMPLE 26

This Example illustrates the methods according to the invention for converting the compounds of formula XXIV into the compounds of formula XXV.

A. A mixture of 80 mg. of 8S-11α,12α-difluoromethylene-9α,15β-dihydroxyprosta-5-cis,13-trans-dienoic acid methyl ester, 2ml. of dioxane and 160 mg. of 2,3-dichloro-5,6-dicyano-1,4-benzoquinone is stirred at room temperature for 18 hours. The reaction mixture is then evaporated to dryness under reduced pressure and the residue is dissolved in methylene chloride and chromatographed on Florisil. The fractions eluted with methylene chloride-ether-methanol (78:20:2) afford 8S-9α-hydroxy-11α,12α-difluoromethylene-15-ketoprosta-5-cis,13-trans-dienoic acid methyl ester in pure form.

B. To a solution of 100 mg. of 8S-11α,12α-difluoromethylene-9α,15α-dihydroxyprosta-5-cis,13-trans-dienoic acid methyl ester in 5 ml. of anhydrous tetrahydrofuran are added 400 mg. of activated manganese dioxide, and the reaction mixture is stirred at room temperature for 6 hours. The manganese dioxide is then filtered off and washed with acetone and the combined filtrates are evaporated to dryness under reduced pressure. The residue is redissolved in tetrahydrofuran and stirred with another 400 mg. batch of manganese dioxide as above, repeating the operation twice. After final evaporation of the solvent and purification of the residue by chromatography on Florisil there is obtained the pure 8S-9α-hydroxy-11α,12α-difluoromethylene-15-ketoprosta-5-cis,13-trans-dienoic acid methyl ester, identical to the compound obtained in part A.

By the above-described methods, starting from the corresponding 8R- or 8S-antimeric 9,15-dihydroxylated prostaglandin derivatives obtained in Examples 10, 13, 16 and 19, in which the hydroxyl group at C-15 may be in α or β configuration, there are produced the following compounds:

8S-11α,12α-difluoromethylene-9β-hydroxy-15-ketoprosta-5-cis,13-trans-dienoic acid methyl ester, 8S-11β,12β-difluoromethylene-α-hydroxy-15-keto-12α-prosta-5-cis,13-trans-dienoic acid methyl ester, 8S-11β,12β-difluoromethylene-9β-hydroxy-15-keto-12α-prosta-5-cis,13-trans-dienoic acid methyl ester, 8S-11α,12α-difluoromethylene-9α-hydroxy-15-keto-20-bis-norprosta-5-cis,13-trans-dienoic acid methyl ester, 8S-11α,12α-difluoromethylene-9β-hydroxy-15-keto-20-methylprosta-5-cis,13-trans-dienoic acid methyl ester, 8S-11α,12α-difluoromethylene-9α-hydroxy-15-keto-20-ethylprosta-5-cis,13-trans-dienoic acid methyl ester, 8S-11β,12β-difluoromethylene-9β-hydroxy-15-ketone-20-nor-12α-prosta-5-cis,13-trans-dienoic acid methyl ester, 8S-11β,12β-difluoromethylene-9α-hydroxy-15-keto-20-ethyl-12α-prosta-5-cis,13-trans-dienoic acid methyl ester, 8S-11β,12β-difluoromethylene-9β-hydroxy-15-keto-20-butyl-12α-prosta-5-cis,13-trans-dienoic acid methyl ester, 8R-11α,12α-difluoromethylene-9α-hydroxy-15-keto-8β-prosta-5-cis,13-trans-dienoic acid methyl ester, 8R-11β,12β-difluoromethylene-9α-hydroxy-15-keto-8β,12α-prosta-5-cis,13-trans-dienoic acid methyl ester, 8R-11α,12α-difluoromethylene-9β-hydroxy-15-keto-8β-prosta-5-cis,13-trans-dienoic acid methyl ester, 8R-11β,12β-difluoromethylene-9β-hydroxy-15-keto-8β,12α-prosta-5-cis,13-trans-dienoic acid methyl ester, 8R-11α,12α-difluoromethylene-9α-hydroxy-15-keto-20-ethyl-8β-prosta-5-cis,13-trans-dienoic acid methyl ester, 8R-11α,12α-difluoromethylene-9β-hydroxy-15-keto-20-bisnor-8β-prosta-5-cis,13-trans-dienoic acid methyl ester, 8R-11β,12β-difluoromethylene-9α-hydroxy-15-keto-20-methyl-8β,12α-prosta-5-cis,13-trans-dienoic acid methyl ester, 8S-11α,12α-difluoromethylene-9α-hydroxy-15-keto-prost-13-trans-enoic acid methyl ester, 8S-11α,12α-difluoromethylene-9β-hydroxy-15-keto-prost-13-trans-enoic acid methyl ester, 8S-11β,12β-difluoromethylene-9α-hydroxy-15-keto-12α-prost-13-trans-enoic acid methyl ester, 8S-11α,12α-difluoromethylene-9α-hydroxy-15-keto-20-bisnorprost-13-trans-enoic acid methyl ester, 8S-11α,12α-difluoromethylene-9α-hydroxy-15-keto-20-ethylprost-13-trans-enoic acid methyl ester, 8S-11β,12β-difluoromethylene-9β-hydroxy-15-keto-12α-prost-13-trans-enoic acid methyl ester, 8S-11β,12β-difluoromethylene-9β-hydroxy-15-keto-20-butyl-12α-prost-13-trans-enoic acid methyl ester, 8R-11α,12α-difluoromethylene-9α-hydroxy-15-keto-8β-prost-13-trans-enoic acid methyl ester, 8R-11α,12α-difluoromethylene-9β-hydroxy-15-keto-8β-prost-13-trans-enoic acid methyl ester, 8R-11α,12α-difluoromethylene-9α-hydroxy-15-keto-20-ethyl-8β-prost-13-trans-enoic acid methyl ester, 8R-11α,12α-difluoromethylene-9β-hydroxy-15-keto-20-nor-8β-prost-13-trans-enoic acid methyl ester, 8R-11β,12β-difluoromethylene-9α-hydroxy-15-keto-8β,12α-prost-13-trans-enoic acid methyl ester, 8R-11β,12β-difluoromethylene-9β-hydroxy-15-keto-8β,12α-prost-13-trans-enoic acid methyl ester, 8R-11β,12β-difluoromethylene-9α-hydroxy-15-keto-20-bisnor-8β,12α-prost-13-trans-enoic acid methyl ester, and 8R-11β,12β-difluoromethylene-9α-hydroxy-15-keto-20-ethyl-8β,12α-prost-13-trans-enoic acid methyl ester.

Likewise, racemic 11α,12α-difluoromethylene-9α,15α-dihydroxyprosta-5-cis,13-trans-dienoic acid methyl ester and racemic 11β,12β-difluoromethylene-9β,15α-dihydroxy-12α-prost-13-trans-enoic acid methyl ester are converted into the corresponding 15-keto derivatives.

EXAMPLE 27

This Example illustrates the methods, according to the invention, for converting the compounds of formula XXV into the methyl ester compounds of formulas XXVI and XXVII.

A. A solution of 60 mg. of 8S-9α-hydroxy-11α,12α-difluoromethylene-15-ketoprosta-5-cis,13-trans-dienoic acid methyl ester in 10 ml. of anhydrous ether is cooled to −78°C and treated dropwise, under stirring and under argon atmosphere with 6 molar equivalents of methylmagnesium bromide (using a 3N etheral solution of this reagent). The temperature of the reaction mixture is allowed to rise to −25°C., 6 additional molar equivalents of methylmagnesium bromide solution are added, and the resulting mixture is stirred for 2 hours more, at the end of which time there are added 5 ml. of methanol. The resulting mixture is diluted with ether and washed several times with saturated sodium chloride solution. The ethereal extract is then dried over magnesium sulfate and evaporated to dryness under reduced pressure. The oily residue is purified by thin layer chromatography, using a mixture of methylene chloride-diethyl ether-methanol (88:10:2) as gradient to produce 8S-11α,12α-difluoromethylene-15β-methyl-9α,15α-dihydroxyprosta-5-cis,13-trans-dienoic acid methyl ester and 8S-11α,12α-difluoromethylene-15α-methyl-9α,15β-dihydroxyprosta-5-cis,13-trans-dienoic acid methyl ester in pure form.

In a similar manner but using ethylmagnesium bromide in place of methylmagnesium bromide, there are obtained 8S-11α,12α-difluoromethylene-15β-ethyl-9α,15α-dihydroxyprosta-5-cis,13-trans-dienoic acid methyl ester and 8S-11α,12α-difluoromethylene-15α-ethyl-9α,15β-dihydroxyprosta-5-cis,13-trans-dienoic acid methyl ester, which are separated by t.l.c.

B. One hundred milligrams of 8S-9α-hydroxy-11α,12α-difluoromethylene-15-ketoprosta-5-cis,13-trans-dienoic acid methyl ester are dissolved in 10 ml. of anhydrous diethyl ether, and the resulting solution is cooled to −78°C in a dry ice-acetone bath. To the stirred cold solution is added dropwise 1.4 ml. of 0.22M methyllithium in ether, under stirring and under an argon atmosphere. The resulting stirred mixture is allowed to attain room temperature, and stirred 2 additional hours at this temperature. It is then poured into saturated ammonium chloride solution, the ethereal phase is separated, washed with saturated sodium chloride solution, dried over magnesium sulfate and evaporated to dryness under vacuo. Purification of the residue by thin layer chromatography, as described in part A of this Example affords 8S-11α,12α-difluoromethylene-15β-methyl-9α,15α-dihydroxyprosta-5-cis,13-trans-dienoic acid methyl ester and 8S-11α,12α-difluoromethylene-15α-methyl-9α,15β-dihydroxyprosta-5-cis,13-trans-dienoic acid methyl ester, identical to the products obtained in part A of this Example.

Similarly, by following the methods described in parts A or B, using methyl magnesium bromide or methyllithium as reagents, and the corresponding 15-keto compounds obtained in Example 26 as starting materials there are produced:

8S-11α,12α-difluoromethylene-15ξ-methyl-9β,15ξ-dihydroxyprosta-5-cis,13-trans-dienoic acid methyl ester, 8S-11β,12β-difluoromethylene-15ξ-methyl-9α,15ξ-dihydroxy-12α-prosta-5-cis,13-trans-dienoic acid methyl ester, 8S-11β,12β-difluoromethylene-15ξ-methyl-9β,15ξ-dihydroxy-12α-prosta-5-cis,13-trans-dienoic acid methyl ester, 8S-11α,12α-difluoromethylene-15ξ-methyl-9α,15ξ-dihydroxy-20-bisnorprosta-5-cis,13-trans-dienoic acid methyl ester, 8S-11α,12α-difluoromethylene-15ξ-methyl-9β,15ξ-dihydroxy-20-ethylprosta-5-cis,13-trans-dienoic acid methyl ester, 8S-11α,12α-difluoromethylene-15ξ-methyl-9α,15ξ-dihydroxy-20-ethylprosta-5-cis,13-trans-dienoic acid methyl ester, 8S-11β,12β-difluoromethylene-15ξ-methyl-9β,15ξ-dihydroxy-20-nor-12α-prosta-5-cis,13-trans-dienoic acid methyl ester, 8S-11β,12β-difluoromethylene-15ξ-methyl-9α,15ξ-dihydroxy-20-ethyl-12α-prosta-5-cis,13-trans-dienoic acid methyl ester, 8S-11β,12β-difluoromethylene-15ξ-methyl-9β,15ξ-dihydroxy-20-butyl-12α-prosta-5-cis,13-trans-dienoic acid methyl ester, 8R-11α,12α-difluoromethylene-15ξ-methyl-9α,15ξ-dihydroxy-8β-prosta-5-cis,13-trans-dienoic acid methyl ester, 8R-11β,12β-difluoromethylene-15ξ-methyl-9α,15ξ-dihydroxy-8β,12α-prosta-5-cis,13-trans-dienoic acid methyl ester, 8R-11α,12α-difluoromethylene-15ξ-methyl-9β,15ξ-dihydroxy-8β-prosta-5-cis,13-trans-dienoic acid methyl ester, 8R-11β,12β-difluoromethylene-15ξ-methyl-9α,15ξ-dihydroxy-8β,12α-prosta-5-cis,13-trans-dienoic acid methyl ester, 8R-11α,12α-difluoromethylene-15ξ-methyl-9α,15ξ-dihydroxy-20-ethyl-8β-prosta-5-cis,13-trans-dienoic acid methyl ester, 8R-11α,12α-difluoromethylene-15ξ-methyl-9β,15ξ-dihydroxy-20-bisnor-8β-prosta-5-cis,13-trans-dienoic acid methyl ester, 8R-11β,12β-difluoromethylene-15ξ-methyl-9α,15ξ-dihydroxy-20-methyl-8β,12α-prosta-5-cis,13-trans-dienoic acid methyl ester, 8S-11α,12α-difluoromethylene-15ξ-methyl-9α,15ξ-dihydroxyprost-13-trans-enoic acid methyl ester, 8S-11α,12α-difluoromethylene-15ξ-methyl-9β,15ξ-dihydroxyprost-13-trans-enoic acid methyl ester, 8S-11β,12β-difluoromethylene-15ξ-methyl-9α,15ξ-dihydroxy-12α-prost-13-trans-enoic acid methyl ester, 8S-11α,12α-difluoromethylene-15ξ-methyl-9α,15ξ-dihydroxy-20-bisnorprost-13-trans-enoic acid methyl ester, 8S-11α,12α-difluoromethylene-15ξ-methyl-9α,15ξ-dihydroxy-20-ethylprost-13-trans-enoic acid methyl ester, 8S-11β,12β-difluoromethylene-15ξ-methyl-9β,15ξ-dihydroxy-12α-prost-13-trans-enoic acid methyl ester, 8S-11β,12β-difluoromethylene-15ξ-methyl-9β,15ξ-dihydroxy-20-butyl-12α-prost-13-trans-enoic acid methyl ester, 8R-11α,12α-difluoromethylene-15ξ-methyl-9α,15ξ-dihydroxy-8β-prost-13-trans-enoic acid methyl ester, 8R-11α,12α-difluoromethylene-15ξ-methyl-9β,15ξ-dihydroxy-8β-prost-13-trans-enoic acid methyl ester, 8R-11α,12α-difluoromethylene-15ξ-dihydroxy-20-ethyl-8β-prost-13-trans-enoic acid methyl ester, 8R-11α,12α-difluoromethylene-15ξ-methyl-9β,15ξ-dihydroxy-20-nor-8β-prost-13-trans-enoic acid methyl ester, 8R-11β,12β-difluoromethylene-15ξ-methyl-9α,15ξ-dihydroxy-8β,12α-prost-13-trans-enoic acid methyl ester, 8R-11β,12β-difluoromethylene-15ξ-methyl-9β,15ξ-dihydroxy-8β,12α-prost-13-trans-enoic acid methyl ester, 8R-11β,12β-difluoromethylene-15ξ-methyl-9α,15ξ-dihydroxy-20-bisnor-8β,12α-prost-13-trans-enoic acid methyl ester, and 8R-11β,12β-difluoromethylene-15ξ-methyl-9α,15ξ-dihydroxy-20-ethyl-8β,12α-prost-13-trans-enoic acid methyl ester.

Likewise racemic 9α-hydroxy-11α,12α-difluoromethylene-15-ketoprosta-5-cis,13-trans-dienoic acid methyl ester and racemic 9β-hydroxy-11β,12β-difluoromethylene-15-keto-12α-prost-13-trans-enoic acid methyl ester are converted respectively into racemic 11α,12α-difluoromethylene-15ξ-methyl-9α,15ξ-dihydroxyprosta-5-cis,13-trans-dienoic acid methyl ester and racemic 11β,12β-difluoromethylene-15ξ-methyl-9β,15ξ-dihydroxy-12α-prost-13-trans-enoic acid methyl ester.

The individual 15α-hydroxy-15β-methyl and 15β-hydroxy-15α-methyl isomers are separated by thin layer chromatographic techniques.

The corresponding 15-ethyl compounds are produced when using ethylmagnesium bromide or ethyllithium as reagents in place of methylmagnesium bromide or methyllithium, respectively, in the procedures described in parts A and B of this Example.

EXAMPLE 28

This Example illustrates the method according to the invention, for converting the methyl ester compounds of formulas XXVI and XXVII into the corresponding free prostadienoic and prostenoic acids.

Eighty milligrams of 8S-11α,12α-difluoromethylene-15β-methyl-9α,15α-dihydroxyprosta-5-cis,13-trans-dienoic acid methyl ester are dissolved by sonication at 37°C for 20 minutes in 60 ml. of the lipase solution prepared as described in part A of Example 16. The reaction mixture is magnetically stirred for 15 minutes at 25° to 27°C, adjusting constantly the pH at 7.2 to 7.4 during the reaction period with 1N sodium hydroxide solution. The reaction mixture is then acidified to pH 5 using a 0.2N hydrochloric acid solution and the product extracted several times from the solution with ethyl acetate and ether. The combined organic extracts are dried over magnesium sulfate and evaporated to dryness under vacuo. The residue is dissolved in methylene chloride and chromatographed on 6 g. of Florisil. The fractions eluted with ethyl acetate containing 20 percent of methanol yield the pure 8S-11α,12α-difluoromethylene-15β-methyl-9α,15α-dihydroxyprosta-5-cis,13-trans-dienoic acid.

By the same procedure, the remaining methyl ester compounds obtained in Example 27 are hydrolyzed to produce the corresponding free acids. Representative compounds thus obtained are:

8S-11α,12α-difluoromethylene-15β-ethyl-9α,15α-dihydroxyprosta-5-cis,13-trans-dienoic acid, 8S-11β,12β-difluoromethylene-15β-methyl-9α,15α-dihydroxy-12α-prosta-5-cis,13-trans-dienoic acid, 8S-11α,12α-difluoromethylene-15β-methyl-9β,15α-dihydroxyprosta-5-cis,13-trans-dienoic acid, 8S-11α,12α-difluoromethylene-15β-methyl-9α,15α-dihydroxy-20-ethylprosta-5-cis,13-trans-dienoic acid, 8S-11β,12β-difluoromethylene-15β-methyl-9β,15α-dihydroxy-12α-prosta-5-cis,13-trans-dienoic acid, 8S-11β,12β-difluoromethylene-15α-methyl-9α,15β-dihydroxy-12α-prosta-5-cis,13-trans-dienoic acid, 8R-11α,12α-difluoromethylene-15β-methyl-9α,15α-dihydroxy-8β-prosta-5-cis,13-trans-dienoic acid, 8R-11α,12α-difluoromethylene-15β-ethyl-9β,15α-dihydroxy-8β-prosta-5-cis,13-trans-dienoic acid, 8R-11β,12β-difluoromethylene-15β-methyl-9α,15α-dihydroxy-8β,12α-prosta-5-cis, 13-trans-dienoic qcid, 8R-11β,12β-difluoromethylene-15β-methyl-9β,15α-dihydroxy-8β,12α-prosta-5-cis,13-trans-dienoic acid, 8S-11α,12α-difluoromethylene-15β-methyl-9α,15α-dihydroxy-prost-13-trans-enoic acid, 8S-11α,12α-difluoromethylene-15β-ethyl-9α,15α-dihydroxyprost-13-trans-enoic acid, 8S-11β,12β-difluoromethylene-15α-dihydroxy-12α-prost-13-trans-enoic acid, 8S-11α,12α-difluoromethylene-15β-methyl-9β,15α-dihydroxyprost-13-trans-enoic acid, 8S-11α,12α-difluoromethylene-15β-methyl-9α,15α-dihydroxy-20-ethylprost-13-trans-enoic acid, 8S-11β,12β-difluoromethylene-15α-ethyl-9β,15β-dihydroxy-12α-prost-13-trans-enoic acid, 8S-11β,12β-difluoromethylene-15β-methyl-9β,15α-dihydroxy-12α-prost-13-trans-enoic acid, 8R-11α,12α-difluoromethylene-15β-methyl-9α,15α-dihydroxy-8β-prost-13-trans-enoic acid, 8R-11α,12α-difluoromethylene-15β-ethyl-9β,15α-dihydroxy-8β-prost-13-trans-enoic acid, 8R-11β,12β-difluoromethylene-15β-methyl-9α,15α-dihydroxy-8β,12α-prost-13-trans-enoic acid, and 8R-11β,12β-difluoromethylene-15β-methyl-9β,15α-dihydroxy-8β,12α-prost-13-trans-enoic acid.

Likewise, racemic 11α,12α-difluoromethylene-15β-methyl-9α,15α-dihydroxyprosta-5-cis,13-trans-dienoic acid methyl ester and racemic 11β,12β-difluoromethylene-15β-methyl-9β,15α-dihydroxy-12α-prost-13-trans-enoic acid methyl ester are converted into the corresponding free acids.

EXAMPLE 29

The Example illustrates the methods according to the invention, for converting compounds of formulas XXVI and XXVII into compounds of formulas XXVIII and XXIX respectively.

To a suspension of 2 g. of Celite, diatomaceous earth (dried for 24 hours at 105°C) and 1 g. of chromium trioxide-dipyridine complex [prepared as described by J.C. Collins et al, in *Tetrahedron Letters*, 3363 (1968)] in 15 ml. of methylene chloride cooled to −5°C is added, under stirring, a solution of 130 mg. of 8S-11α,12α-difluoromethylene-15β-methyl-9α,15α-dihydroxyprosta-5-cis,13-trans-dienoic acid methyl ester in 5 ml. of methylene chloride and the mixture is stirred for 15 minutes further at 0°C to 5°C; 300 mg. of sodium bisulfate monohydrate are then added and the reaction mixture is stirred for an additional 10 minute period. The insoluble material is separated by filtration and washed well with methylene chloride. The combined organic filtrates are evaporated to dryness under vacuo and the residue purified by thin-layer chromatography, thus obtaining 8R-9-keto-11α,12α-difluoromethylene-15β-methyl-15α-hydroxyprosta-5-cis,13-trans-dienoic acid methyl ester.

Upon hydrolysis of the methyl ester group, by following the method of Example 28 there is produced 8R-9-keto-11α,12α-difluoromethylene-15β-methyl-15β-methyl-15α-hydroxyprosta-5-cis,13-trans-dienoic acid.

The latter compound can also be obtained by oxidation of 8S-11α,12α-difluoromethylene-15β-methyl-9α,15α-dihydroxyprosta-5-cis,13-trans-dienoic acid or its 9β-hydroxyisomer.

In a similar manner, starting from the corresponding 9α- or 9β-hydroxylated compounds of Example 27 there are produced the following compounds as final products, via the corresponding methyl esters:

8R-9-keto-11α,12α-difluoromethylene-15α-methyl-15β-hydroxyprosta-5-cis,13-trans-dienoic acid, 8R-9-keto-11β,12β-difluoromethylene-15β-methyl-15α-hydroxy-12α-prosta-5-cis,13-trans-dienoic acid, 8R-9-keto-11α,12α-difluoromethylene-15α-methyl-15β-hydroxy-20-bisnorprosta-5-cis,13-trans-dienoic acid, 8R-9-keto-11α,12α-difluoromethylene-15β-methyl-15α-hydroxy-20-methylprosta-5-cis,13-trans-dienoic acid, 8R-9-keto-11α,12α-difluoromethylene-15β-methyl-15α-hydroxy-20-ethylprosta-5-cis,13-trans-dienoic acid, 8R-9-keto-11β,12β-difluoromethylene-15α-methyl-15β-hydroxy-20-nor-12α-prosta-5-cis,13-trans-dienoic acid, 8R-9-keto-11β,12β-difluoromethylene-15α-methyl-15β-hydroxy-20-ethyl-12α-prosta-5-cis,13-trans-dienoic acid, 8R-9-keto-11β,12β-difluoromethylene-15α-ethyl-15β-hydroxy-20-butyl-12α-prosta-5-cis,13-trans-dienoic acid, 8S-9-keto-11α,12α-difluoromethylene-15β-methyl-15α-hydroxy-8β-prosta-5-cis,13-trans-dienoic acid, 8S-9-keto-11β,12β-difluoromethylene-15β-methyl-15α-hydroxy-8β,12α-prosta-5-cis,13-trans-dienoic acid, 8S-9-keto-11α,12β-difluoromethylene-15β-methyl-15α-hydroxy-20-ethyl-8β-prosta-5-cis,13-trans-dienoic acid, 8S-9keto-11α,12α-difluoromethylene-15β-ethyl-15α-hydroxy-20-bisnor-8β-prosta-5-cis,13-trans-dienoic acid, 8S-9-keto-11β,12β-difluoromethylene-15β-hydroxy-15α,20-dimethyl-8β,12α-prosta-5-cis,13-trans-dienoic acid, 8R-9-keto-11α,12α-difluoromethylene-15β-methyl-15α-hydroxyprost-13-trans-enoic acid, 8R-9-keto-11β,12β-difluoromethylene-15β-methyl-15α-hydroxy-12α-prost-13-trans-enoic acid, 8R-9-keto-11α,12α-difluoromethylene-15β-ethyl-15α-hydroxyprost-13-trans-enoic acid, 8R-9-keto-11α,12α-difluoromethylene-15α-methyl-15β-hydroxy-20-ethylprost-13-trans-enoic acid, 8R-9-keto-11β,12β-difluoromethylene-15β-ethyl-15α-hydroxy-20-nor-12α-prost-13-trans-enoic acid, 8R-9-keto-11β,12β-difluoromethylene-15β-methyl-15α-hydroxy-20-butyl-12α-prost-13-trans-enoic acid, 8S-9-keto-11α,12α-difluoromethylene-15β-methyl-15α-hydroxy-8β-prost-13-trans-enoic acid, 8S-9-keto-11α,12α-difluoromethylene-15β-methyl-15α-hydroxy-20-ethyl-8β-prost-13-trans-enoic acid, 8S-9-keto-11α,12α-difluoromethylene-15α-ethyl-15α-hydroxy-20-nor-8β-prost-13-trans-enoic acid, 8S-9-keto-11β,12β-difluoromethylene-15β-methyl-15α-hydroxy-8β,12α-prost-13-trans-enoic acid, 8S-9-keto-11β,12β-difluoromethylene-15α-methyl-15β-hydroxy-20-bisnor-8β,12α-prost-13-trans-enoic acid and 8S-9-keto-11β,12β-difluoromethylene-15α,20-diethyl-15β-hydroxy-8β,12α-prost-13-trans-enoic acid.

EXAMPLE 30

In accordance with the oxidation method of Example 29, racemic 11α,12α-difluoromethylene-15β-methyl-9α,15α-dihydroxyprosta-5-cis,13-trans-dienoic acid and racemic 11β,12β-difluoromethylene-15β-methyl-9β,15α-dihydroxy-12α-prost-13-trans-enoic acid are converted respectively into racemic 9-keto-11α,12α-difluoromethylene-15β-methyl-15α-hydroxyprosta-5-cis,13-trans-dienoic acid and racemic 9-keto-11β,12β-difluoromethylene-15β-methyl-15α-hydroxy-12α-prost-13-trans-enoic acid.

EXAMPLE 31

To a solution of 100 mg. of 8R-9-keto-11α,12α-difluoromethylene-15α-hydroxyprosta-5-cis,13-trans-dienoic acid in 10 ml. of methanol is added 3 ml. of a 0.1N solution of sodium hydroxide, and the mixture is stirred at room temperature is then evaporated to dryness under reduced pressure, to give theسo sodium salt of 8R-9-keto-11α,12α-difluoromethylene-15α-hydroxyprosta-5-cis, 13-trans-dienoic acid.

By employing 1.1 molar equivalents of potassium hydroxide (in the form of a 0.1N solution) in place of sodium hydroxide in the above procedure, the potassium salt of 8R-9-keto-11α,12α-difluoromethylene-15α-hydroxyprosta-5-cis, 13-trans-dienoic acid is obtained.

Similarly, the sodium and potassium salts of the other free antimeric 8R- and 8S-11α,12α- or 11β,12β-difluoromethylene prostaglandin derivatives, or the racemic mixtures thereof, obtained in the previous Examples, are produced.

EXAMPLE 32

To a solution of 100 mg. of 8R-11β,12β-difluoromethylene-9α,15α-dihydroxy-12α-prosta-5-cis,13-trans-dienoic acid in 10 ml. of methanol is added a mixture of 3 ml. of concentrated ammonium hydroxide solution and 5 ml. of methanol. The resulting mixture is stirred for two hours at room temperature and then evaporated to dryness under vacuo, to yield the ammonium salt of 8R-11β,12β-difluoromethylene-9α,15α-dihydroxy-12α-prosta-5-cis,13-trans-dienoic acid.

By employing dimethylamine, diethylamine or dipropylamine in place of ammonium hydroxide in the above process, the corresponding salts of 8R-11β,12β-difluoromethylene- 9α,15α-dihydroxy-12α-prosta-5-cis,13-trans-dienoic acid are obtained.

In a similar manner, the ammonia, dimethylamine, diethylamine and dipropylamine salts of the other antimers, 8R- and 8S-11α,12α- or 11β,12β-difluoromethylene free prostenoic or prostadienoic acids or the racemic mixtures thereof, obtained in the previous Examples, are produced.

What is claimed is:

1. A compound selected from the group of antimers and racemic mixtures thereof of the formula:

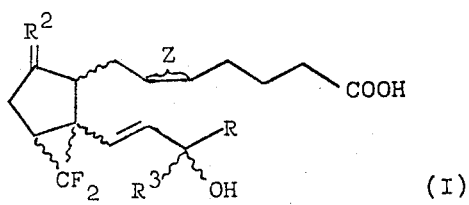

(I)

wherein

R represents alkyl of three through nine carbon atoms;

$R^2$ represents a keto group or the grouping

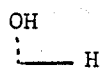

and

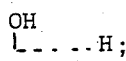

$R^3$ represents hydrogen, methyl or ethyl;

z represents a single bond or a cis double bond; and the wavy line ($\wr$) represents the $\alpha$ or $\beta$ configuration or mixtures thereof, provided that a. when the side chain attached at the 12-position is $\beta$, the difluoromethylene group at the 11,12-position is $11\alpha,12\alpha$ only; and when the side chain attached at the 12 position is $\alpha$, the difluoromethylene group at the 11,12-position is $11\beta,12\beta$ only; and b. when $R^3$ is $\alpha$ the hydroxyl group, attached to the same carbon as $R^3$, is $\beta$; and when $R^3$ is $\beta$ the hydroxyl group, attached to the same carbon as $R^3$, is $\alpha$; and the pharmaceutically acceptable salts or methyl esters thereof.

2. The antimeric compounds of Formula (I) of claim 1 wherein $R^2$ is keto and the side chain attached at the 12-position is $\beta$, the compounds of the formulas:

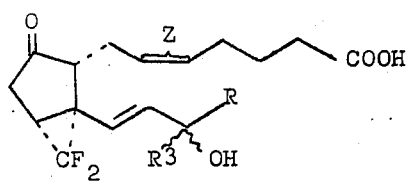

(A), and

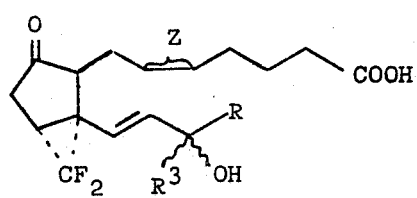

(B).

3. The antimeric compounds of Formula (I) of claim 1 wherein $R^2$ is

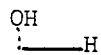

and the side chain attached at the 12-position is $\beta$, the compounds of the formulas:

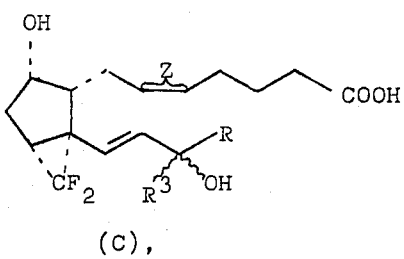

(C), and

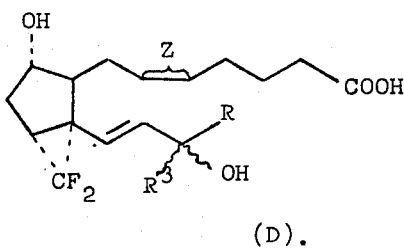

(D).

4. The antimeric compounds of Formula (I) of claim 1 wherein $R^2$ is

and the side chain attached at the 12-position is $\beta$, the compounds of the formulas:

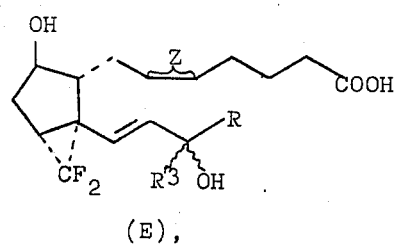

(E), and

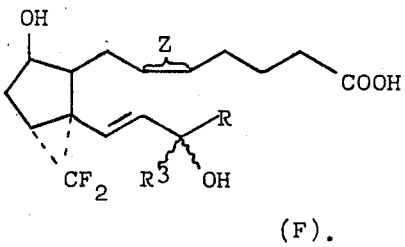

(F).

5. The antimeric compounds of Formula (I) of claim 1 wherein $R^2$ is keto and the side chain attached at the 12-position is $\alpha$, the compounds of the formulas:

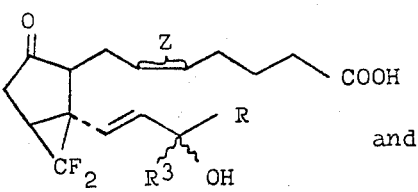

and (G),

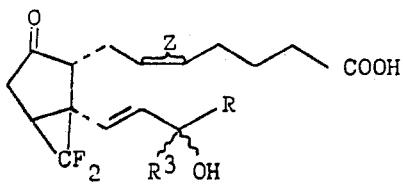

(H).

6. The antimeric compounds of Formula (I) of claim 1 wherein R² is

and the side chain attached at the 12-position is α, the compounds of the formulas:

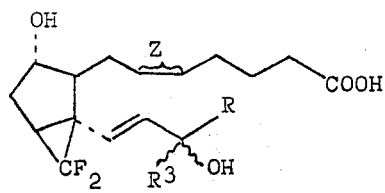

(J), and

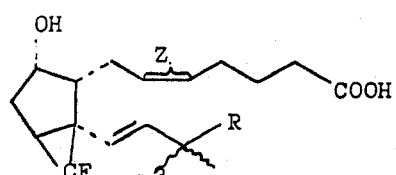

(K).

7. The antimeric compounds of formula (I) of claim 1 wherein R² is keto and the side chain attached at the 12-position is α, the compounds of the formulas:

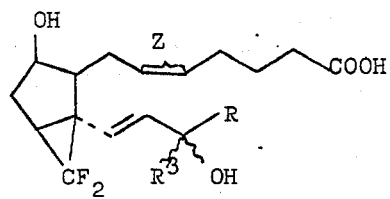

(L), and

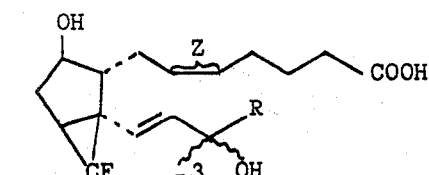

(M).

8. The antimeric compounds of Formulas (A), and (B) of claim 2 wherein R³ is α and the hydroxyl group, attached to the same carbon atom as R³, is β, the compounds of the formulas:

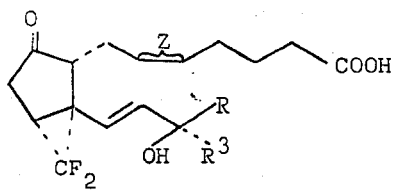

(A'), and

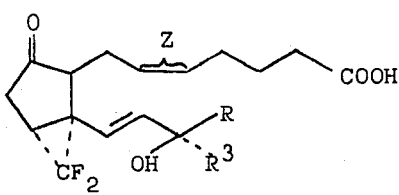

(B').

9. The antimeric compounds of Formulas (C), and (D) of claim 3 wherein R³ is α and the hydroxyl group, attached to the same carbon atom as R³, is β, the compounds of the formulas:

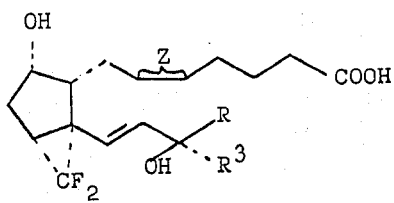

(C'), and

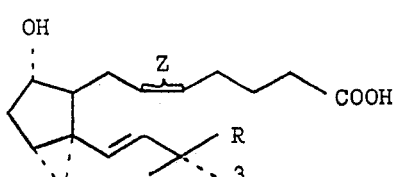

(D').

10. The antimeric compounds of Formulas (E) and (F) of claim 4 wherein R³ is α and the hydroxyl group, attached to the same carbon atom as R³, is β, the compounds of the formulas:

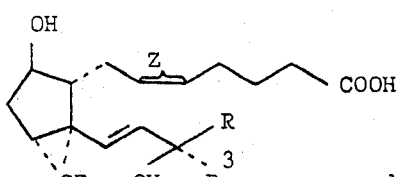

and (E'),

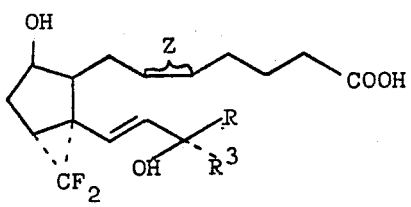

(F').

11. The antimeric compounds of Formulas (G) and (H) of claim 5 wherein $R^3$ is α and the hydroxyl group, attached to the same carbon atom as $R^3$, is β, the compounds of the formulas:

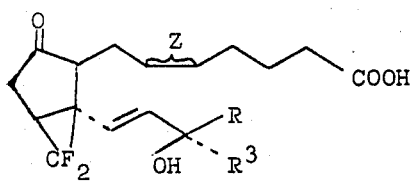

(G'), and

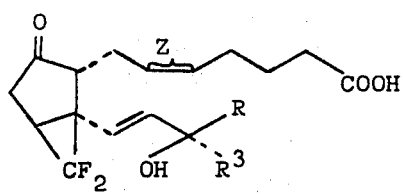

(H').

12. The antimeric compounds of Formulas (J) and (K) of claim 6 wherein $R^3$ is α and the hydroxyl group, attached to the same carbon atom as $R^3$, is β, the compounds of the formulas:

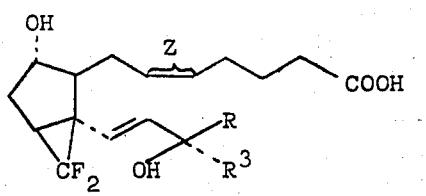

(J'), and

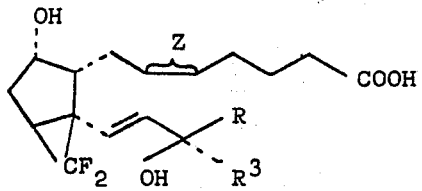

(K').

13. The antimeric compounds of Formulas (L) and (M) of claim 7 wherein $R^3$ is α and the hydroxyl group, attached to the same carbon atom as $R^3$, is β, the compounds of the formulas:

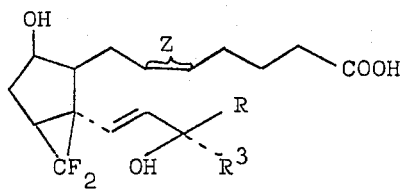

(L'), and

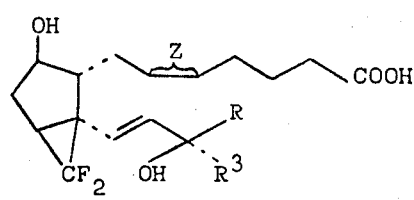

(M').

14. The antimeric compounds of Formulas (A) and (B) of claim 2 wherein $R^3$ is β and the hydroxyl group, attached to the same carbon atom as $R^3$, is α, the compounds of the formulas:

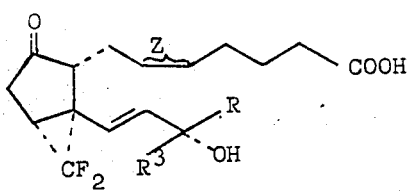

(A"), and

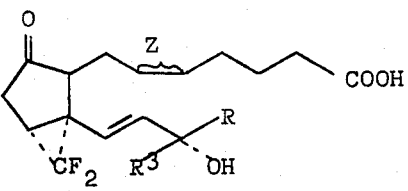

(B").

15. The antimeric compounds of Formulas (C) and (D) of claim 3 wherein $R^3$ is β and the hydroxyl group, attached to the same carbon atom as $R^3$, is α, the compounds of the formulas:

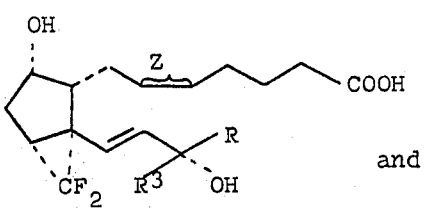

and (C"),

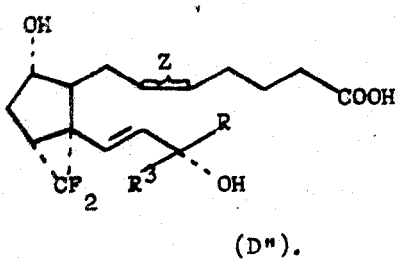

(D″).

16. The antimeric compounds of Formulas (E) and (F) of claim 4 wherein $R^3$ is $\beta$ and the hydroxyl group, attached to the same carbon atom as $R^3$, is $\alpha$, the compounds of the formulas:

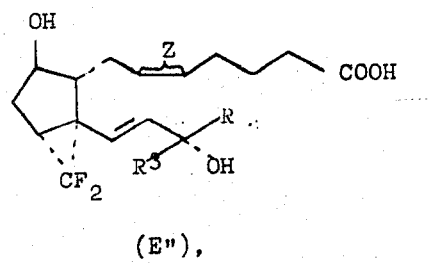

(E″), and

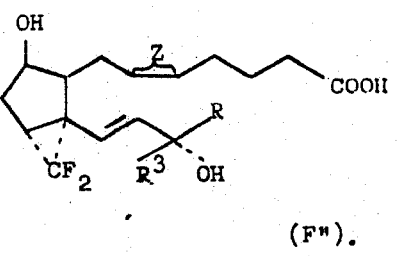

(F″).

17. The antimeric compounds of Formulas (G) and (H) of claim 5 wherein $R^3$ is $\beta$ and the hydroxyl group, attached to the same carbon atom as $R^3$, is $\alpha$, the compounds of the formulas:

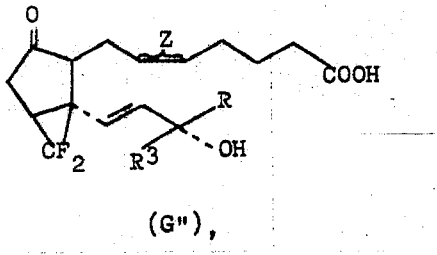

(G″), and

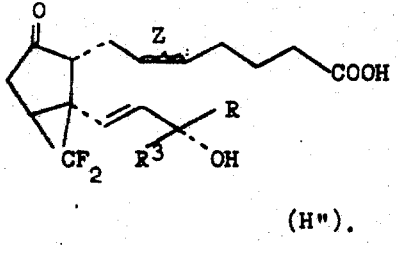

(H″).

18. The antimeric compounds of Formulas (J) and (K) of claim 6 wherein $R^3$ is $\beta$ and the hydroxyl group, attached to the same carbon atom as $R^3$, is $\alpha$, the compounds of the formulas:

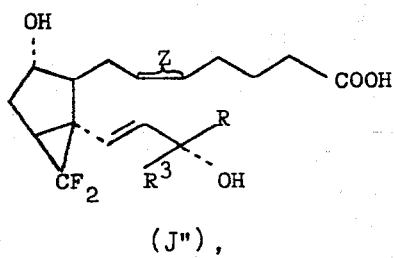

(J″), and

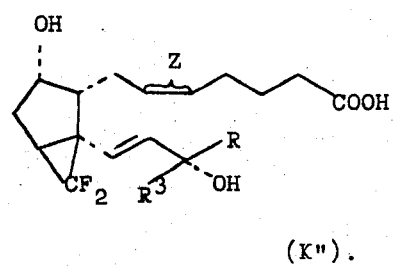

(K″).

19. The antimeric compounds of Formulas (L) and (M) of claim 7 wherein $R^3$ is $\beta$ and the hydroxyl group, attached to the same carbon atom as $R^3$, is $\alpha$, the compounds of the formulas:

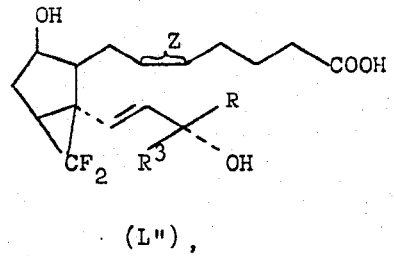

(L″), and

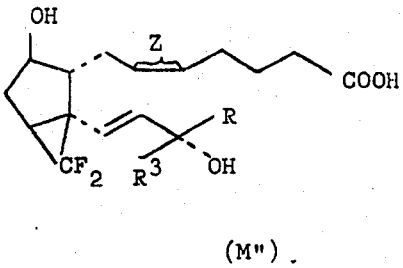

(M″).

20. The racemic mixture of the compounds of Formula (A′) of claim 8,

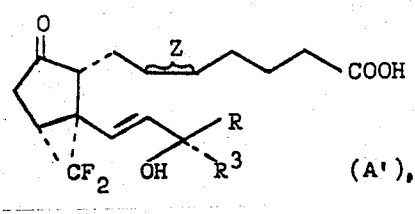

(A′), and its antimers, the compounds of the formula:

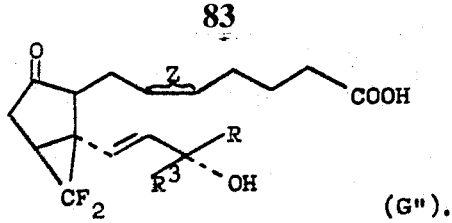

(G'').

21. The racemic mixture of the compounds of Formula (B') of claim 8,

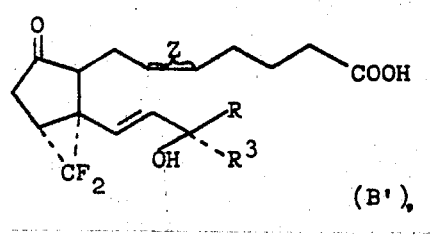

(B'), and its antimers, the compounds of the formula:

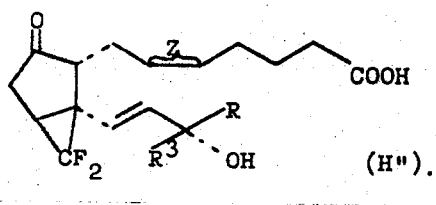

(H'').

22. The racemic mixture of the compounds of Formula (C') of claim 9,

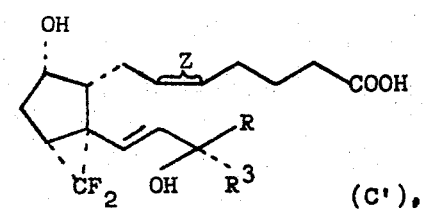

(C'), and its antimers, the compounds of the formula:

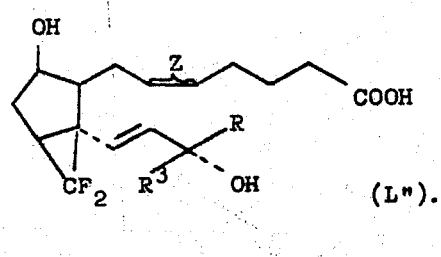

(L'').

23. The racemic mixture of the compounds of Formula (D') of claim 9.

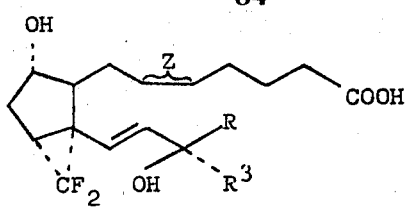

(D'), and its antimers, the compounds of the formula:

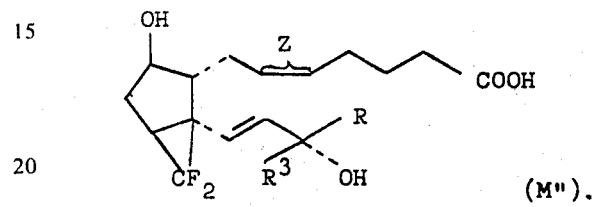

(M'').

24. The racemic mixture of the compounds of Formula (E') of claim 10,

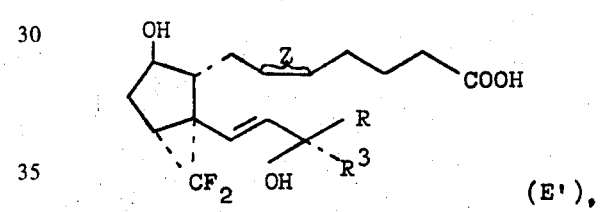

(E'), and its antimers, the compounds of the formula:

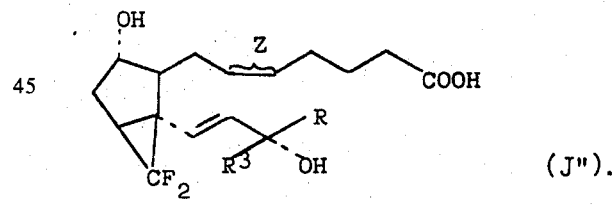

(J'').

25. The racemic mixture of the compounds of Formula (F') of claim 10,

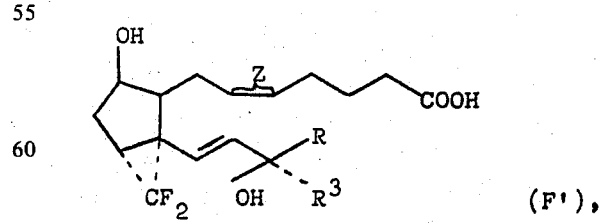

(F'), and its antimers, the compounds of the formula:

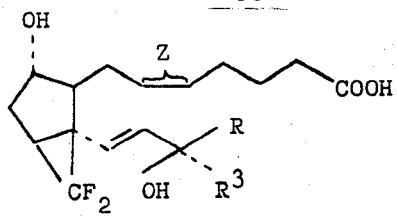

(J'),

26. The racemic mixture of the compounds of Formula (G') of claim 11.

and its antimers, the compounds of the formula:

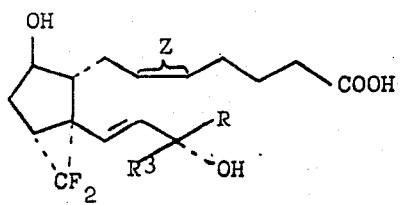

(E").

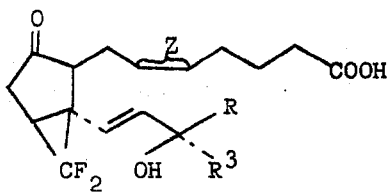

(G'),

29. The racemic mixture of the compounds of Formula (K') of claim 12, and its antimers, the compounds of the formula:

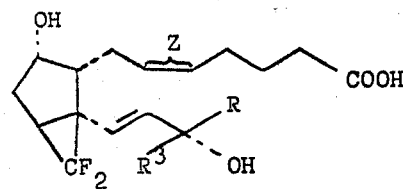

(K"),

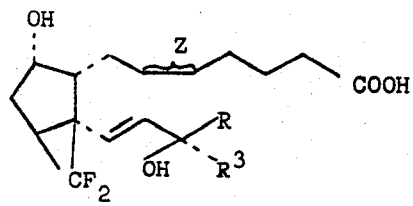

(K'), and its antimers, the compounds of the formula:

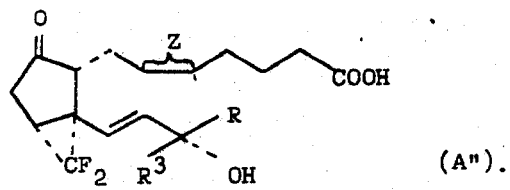

(A").

27. The racemic mixture of the compounds of Formula (H') of claim 11,

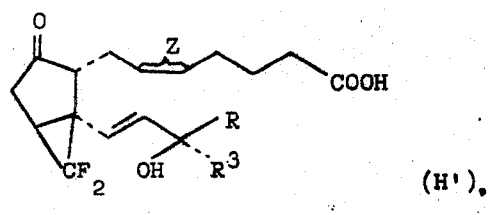

(H'),

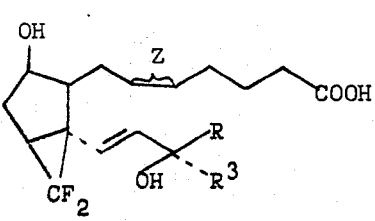

(F").

30. The racemic mixture of the compounds of Formula (L') of claim 13, and its antimers, the compounds of the formula:

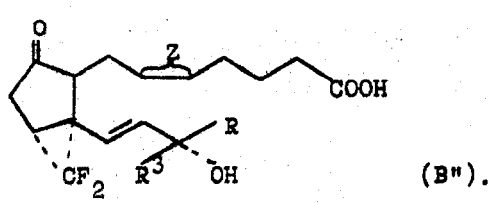

(B").

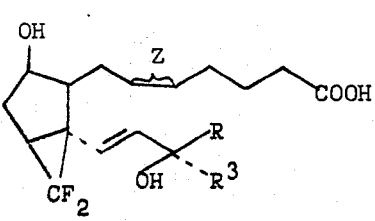

(L'),

28. The racemic mixture of the compounds of Formula (J') of claim 12, and its antimers, the compounds of the formula:

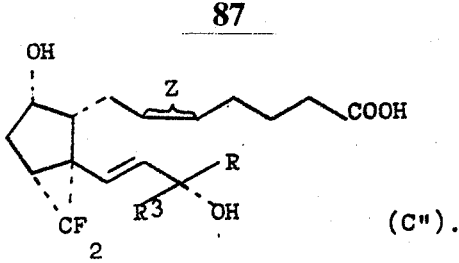

31. The racemic mixture of the compounds of Formula (M') of claim 13,

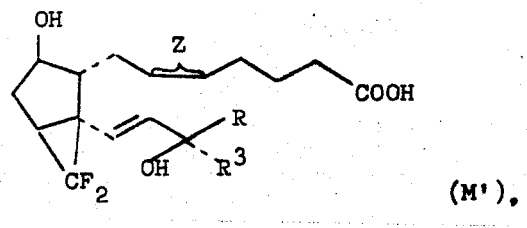

and its antimers, the compounds of the formula:

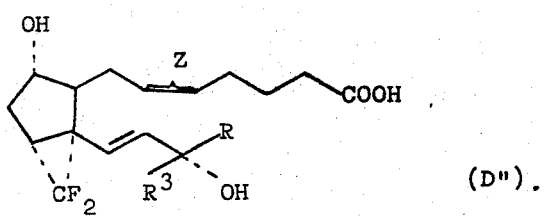

32. A compound according to claim 14, formula (A'') wherein R is n-pentyl, $R^3$ is hydrogen and Z is a cis double bond, 8R-9-keto-11α,12α-difluoromethylene-15α-hydroxyprosta-5-cis,13-trans-dienoic acid and the methyl ester or pharmaceutically acceptable salts thereof.

33. A compound according to claim 14, formula (A'') wherein R is n-pentyl, $R^3$ is hydrogen and Z is a single bond, 8R-9-keto-11α,12α-difluoromethylene-15α-hydroxyprost-13-trans-enoic acid and the methyl ester or pharmaceutically acceptable salts thereof.

34. A compound according to claim 14, formula(A'') wherein R is n-pentyl, $R^3$ is methyl and Z is a cis double bond, 8R-9-keto-11α,12α-difluoromethylene-15β-methyl-15α-hydroxyprosta-5-cis,13-trans-dienoic acid and the methyl ester or pharmaceutically acceptable salts thereof.

35. A compound according to claim 14, formula (A'') wherein R is n-pentyl, $R^3$ is methyl and Z is a single bond, 8R-9-keto-11α,12α-difluoromethylene-15β-methyl-15α-hydroxyprost-13-trans-enoic acid and the methyl ester or pharmaceutically acceptable salts thereof.

36. A compound according to claim 14, formula (A'') wherein R is n-heptyl, $R^3$ is hydrogen and Z is a cis double bond, 8R-9-keto-11α,12α-difluoromethylene-15α-hydroxy-20-ethylprosta-5-cis,13-trans-dienoic acid and the methyl ester or pharmaceutically acceptable salts thereof.

37. A compound according to claim 14, formula (A'') wherein R is n-heptyl, $R^3$ is hydrogen and Z is a single bond, 8R-9-keto-11α,12α-difluoromethylene-15α-hydroxy-20-ethylprost-13-trans-enoic acid and the methyl ester or pharmaceutically acceptable salts thereof.

38. A compound according to claim 14, formula (B'') wherein R is n-pentyl, $R^3$ is hydrogen and Z is a cis double bond, 8S-9-keto-11α,12α-difluoromethylene-15α-hydroxy-8β-prosta-5-cis,13-trans-dienoic acid and the methyl ester or pharmaceutically acceptable salts thereof.

39. A compound according to claim 14, formula (B'') wherein R is n-pentyl, $R^3$ is hydrogen and Z is a single bond, 8S-9-keto-11α,12α-difluoromethylene-15α-hydroxy-8β-prost-13-trans-enoic acid and the methyl ester or pharmaceutically acceptable salts thereof.

40. A compound according to claim 14, formula (B'') wherein R is n-pentyl, $R^3$ is methyl and Z is a cis double bond, 8S-9-keto-11α,12α-difluoromethylene-15β-methyl-15α-hydroxy-8β-prosta-5-cis,13-trans-dienoic acid and the methyl ester or pharmaceutically acceptable salts thereof.

41. A compound according to claim 14, formula (B'') wherein R is n-pentyl, $R^3$ is methyl and Z is a single bond, 8S-9-keto-11α,12α-difluoromethylene-15β-methyl-15α-hydroxy-8β-prost-13-trans-enoic acid and the methyl ester or pharmaceutically acceptable salts thereof.

42. A compound according to claim 14, formula (B'') wherein R is n-heptyl, $R^3$ is hydrogen and Z is a cis double bond, 8S-9-keto-11α,12α-difluoromethylene-15α-hydroxy-20-ethyl-8β-prosta-5-cis,13-trans-dienoic acid and the methyl ester or pharmaceutically acceptable salts thereof.

43. A compound according to claim 14, formula (B''), wherein R is n-heptyl, $R^3$ is hydrogen and Z is a single bond, 8S-9-keto-11α,12α-difluoromethylene-15α-hydroxy-20-ethyl-8β-prost-13-trans-enoic acid and the methyl ester or pharmaceutically acceptable salts thereof.

44. A compound according to claim 15, formula (C'') wherein R is n-pentyl, $R^3$ is hydrogen and Z is a cis double bond, 8S-11α,12α-difluoromethylene-9α,15α-dihydroxyprosta-5-cis,13-trans-dienoic acid and the methyl ester or pharmaceutically acceptable salts thereof.

45. A compound according to claim 15, formula (C'') wherein R is n-pentyl, $R^3$ is hydrogen and Z is a single bond, 8S-11α,12α-difluoromethylene-9α,15α-dihydroxyprost-13-trans-enoic acid and the methyl ester or pharmaceutically acceptable salts thereof.

46. A compound according to claim 15, formula (C'') wherein R is n-pentyl, $R^3$ is methyl and Z is a cis double bond, 8S-11α,12α-difluoromethylene-15β-methyl-9α,15α-dihydroxyprosta-5-cis,13-trans-dienoic acid and the methyl ester or pharmaceutically acceptable salts thereof.

47. A compound according to claim 15, formula (C'') wherein R is n-pentyl, $R^3$ is methyl and Z is a single bond, 8S-11α,12α-difluoromethylene-15β-methyl-9α,15α-dihydroxyprost-13-trans-enoic acid and the methyl ester or pharmaceutically acceptable salts thereof.

48. A compound according to claim 15, formula (C'') wherein R is n-heptyl, $R^3$ is hydrogen and Z is a cis double bond, 8S-11α,12α-difluoromethylene-9α,15α-dihydroxy-20-ethylprosta-5-cis,13-transdienoic acid and the methyl ester or pharmaceutically acceptable salts thereof.

49. A compound according to claim 15, formula (C'') wherein R is n-heptyl, $R^3$ is hydrogen and Z is a single bond, 8S-11α,12α-difluoromethylene-9α,15α-dihydroxy-20-ethylprost-13-trans-enoic acid and the methyl ester or pharmaceutically acceptable salts thereof.

50. A compound according to claim 15 formula (D'') wherein R is n-pentyl, $R^3$ is hydrogen and Z is a cis double bond, 8RL-11α,12α-difluoromethylene-9α,15α-dihydroxy-8β-prosta-5-cis,13-trans-dienoic acid and the methyl ester or pharmaceutically acceptable salts thereof.

51. A compound according to claim 15, formula (D'') wherein R is n-pentyl, $R^3$ is hydrogen and Z is a single bond, 8R-11α,12α-difluoromethylene-9α,15α-dihydroxy-8β-prost-13-trans-enoic acid and the methyl ester or pharmaceutically acceptable salts thereof.

52. A compound according to claim 15, formula (D'') wherein R is n-pentyl, $R^3$ is methyl and Z is a cis double bond, 8R-11α,12α-difluoromethylene-15β-methyl-9α,15α-dihydroxy-8β-prosta-5-cis,13-trans-dienoic acid and the methyl ester or pharmaceutically acceptable salts thereof.

53. A compound according to claim 15, formula (D'') wherein R is n-pentyl, $R^3$ is methyl and Z is a single bond, 8R-11α,12α-difluoromethylene-15β-methyl-9α,15α-dihydroxy-8β-prost-13-trans-enoic acid and the methyl ester or pharmaceutically acceptable salts thereof.

54. A compound according to claim 15, formula (D'') wherein R is n-heptyl, $R^3$ is hydrogen and Z is a cis double bond, 8R-11α,12α-difluoromethylene-9α,15α-dihydroxy-20-ethyl-8β-prosta-5-cis,13-trans-dienoic acid and the methyl ester or pharmaceutically acceptable salts thereof.

55. A compound according to claim 15, formula (D'') wherein R is n-heptyl, $R^3$ is hydrogen and Z is a single bond, 8R-11α,12α-difluoromethylene-9α,15α-dihydroxy-20-ethyl-8β-prost-13-trans-enoic acid and the methyl ester or pharmaceutically acceptable salts thereof.

56. A compound according to claim 16, formula (E'') wherein R Is n-pentyl, $R^3$ is hydrogen and Z is a cis double bond, 8S-11α,12α-difluoromethylene-9β,15α-dihydroxyprosta-5-cis,13-trans-dienoic acid and the methyl ester or pharmaceutically acceptable salts thereof.

57. A compound according to claim 16, formula (E'') wherein R is n-pentyl, $R^3$ is hydrogen and Z is a single bond, 8S-11α,12α-difluoromethylene-9β,15α-dihydroxyprost-13-trans-enoic acid and the methyl ester or pharmaceutically acceptable salts thereof.

58. A compound according to claim 16, formula (E'') wherein R is n-pentyl, $R^3$ is methyl and Z is a cis double bond, 8S-11α,12α-difluoromethylene-15β-methyl-9β,15α-dihydroxyprosta-5-cis,13-trans-dienoic acid and the methyl ester or pharmaceutically acceptable salts thereof.

59. A compound according to claim 16, formula (E'') wherein R is n-pentyl, $R^3$ is methyl and Z is a single bond, 8S-11α,12α-difluoromethylene-15β-methyl-9β,15α-dihydroxyprost-13-trans-enoic acid and the methyl ester or pharmaceutically acceptable salts thereof.

60. A compound according to claim 16, formula (E'') wherein R is n-heptyl, $R^3$ is hydrogen and Z is a cis double bond, 8S-11α,12α-difluoromethylene-9β,15α-dihydroxy-20-ethylprosta-5-cis,13-trans-dienoic acid and the methyl ester or pharmaceutically acceptable salts thereof.

61. A compound according to claim 16, formula l(E'') wherein R is n-heptyl, $R^3$ is hydrogen and Z is a single bond, 8S-11α,12α-difluoromethylene-9β,15α-dihydroxy-20-ethylprost-13-trans-enoic acid and the methyl ester or pharmaceutically acceptable salts thereof.

62. A compound according to claim 16 formula (F'') wherein R is n-pentyl, $R^3$ is hydrogen and Z is a cis double bond, 8R-11α,12α-difluoromethylene-9β,15α-dihydroxy-8β-prosta-5-cis,13-trans-dienoic acid and the methyl ester or pharmaceutically acceptable salts thereof.

63. A compound according to claim 16, formula (F'') wherein R is n-pentyl, $R^3$ is hydrogen and Z is a single bond, 8R-11α,12α-difluoromethylene-9β,15α-dihydroxy-8β-prost-13-trans-enoic acid and the methyl ester or pharmaceutically acceptable salts thereof.

64. A compound according to claim 16, formula (F'') wherein R is n-pentyl, $R^3$ is methyl and Z is a cis double bond, 8R-11α,12α-difluoromethylene-15β-methyl-9β,15α-dihydroxy-8β-prosta-5-cis,13-trans-dienoic acid and the methyl ester or pharmaceutically acceptable salts thereof.

65. A compound according to claim 16, formula (F'') wherein R is n-pentyl, $R^3$ is methyl and Z is a single bond, 8R-11α,12α-difluoromethylene-15β-methyl-9β,15α-dihydroxy-8β-prost-13-trans-enoic acid and the methyl ester or pharmaceutically acceptable salts thereof.

66. A compound according to claim 16, formula (F'') wherein R is n-heptyl, $R^3$ is hydrogen and Z is a cis double bond, 8R-11α,12α-difluoromethylene-9β,15α-dihydroxy-20-ethyl-8β-prosta-5-cis,13-trans-dienoic acid and the methyl ester or pharmaceutically acceptable salts thereof.

67. A compound according to claim 16, formula (F'') wherein R is n-heptyl, $R^3$ is hydrogen and Z is a single bond, 8R-11α,12α-difluoromethylene-9β,15α-dihydroxy-20-ethyl-8β-prost-13-trans-enoic acid and the methyl ester or pharmaceutically acceptable salts thereof.

68. A compound according to claim 17, formula (G'') wherein R is n-pentyl, $R^3$ is hydrogen and Z is a cis double bond, 8S-9-keto-11β,12β-difluoromethylene-15α-hydroxy-8β,12α-prosta-5-cis,13-trans-dienoic acid and the methyl ester or pharmaceutically acceptable salts thereof.

69. A compound according to claim 17, formula (G'') wherein R is n-pentyl, $R^3$ is hydrogen and Z is a single bond, 8S-9-keto-11β,12β-difluoromethylene-15α-hydroxy-8β,12α-prost-13-trans-enoic acid and the methyl ester or phramaceutically acceptable salts thereof.

70. A compound according to claim 17, formula (G'') wherein R is n-pentyl, $R^3$ is methyl and Z is a cis double bond, 8S-9-keto-11β,12β-difluoromethylene-15β-methyl-15α-hydroxy-8β,12α-prosta-5-cis,13-trans-dienoic acid and the 71. A compound according to claim 17, formula (G'') wherein R is n-pentyl, $R^3$ is methyl and Z is a single bond, 8S-9-keto-11$\beta$,12$\beta$-difluoromethylene-15$\beta$-methyl-15$\alpha$-hydroxy-8$\beta$, 12$\alpha$-prost-13-trans-enoic acid and the methyl ester or pharmaceutically acceptable salts thereof.

72. A compound according to claim 17, formula (G'') wherein R is n-heptyl, $R^3$ is hydrogen and Z is a cis double bond, 8S-9-keto-11$\beta$,12$\beta$-difluoromethylene-15$\alpha$-hydroxy-20-ethyl-8$\beta$,12$\alpha$-prosta-5-cis,13-trans-dienoic acid and the methyl ester or pharmaceutically acceptable salts thereof.

73. A compound according to claim 17, formula (G'') wherein R is n-heptyl, $R^3$ is hydrogen and Z is a single bond, 8S-9-keto-11$\beta$,12$\beta$-difluoromethylene-15$\alpha$-hydroxy-20-ethyl-8$\beta$,12$\alpha$-prost-13-trans-enoic acid the the methyl ester or pharmaceutically acceptable salts thereof.

74. A compound according to claim 17, formula (H'') wherein R is n-pentyl, $R^3$ is hydrogen and Z is a cis double bond, 8R-9-keto-11$\beta$,12$\beta$-difluoromethylene-15$\alpha$-hydroxy-12$\alpha$-prosta-5-cis, 13-trans-dienoic acid and the methyl ester or pharmaceutically acceptable salts thereof.

75. A compound according to claim 17, formula (H'') wherein R is n-pentyl, $R^3$ is hydrogen and Z is a single bond, 8R-9-keto-11$\beta$,12$\beta$-difluoromethylene-15$\alpha$-hydroxy-12$\alpha$-prost-13-trans-enoic acid and the methyl ester or pharmaceutically acceptable salts thereof.

76. A compound according to claim 17, formula (H'') wherein R is n-pentyl, $R^3$ is methyl and Z is a cis double bond, 8R-9-keto-11$\beta$,12$\beta$-difluoromethylene-15$\beta$-methyl-15$\alpha$-hydroxy-12$\alpha$-prosta-5-cis, 13-trans-dienoic acid and the methyl ester or pharmaceutically acceptable salts thereof.

77. A compound according to claim 17, formula (H'') wherein R is n-pentyl, $R^3$ is methyl and Z is a single bond, 8R-9-keto-11$\beta$,12$\beta$-difluoromethylene-15$\beta$-methyl-15$\alpha$-hydroxy-12$\alpha$-prost-13-trans-enoic acid and the methyl ester or pharmaceutically acceptable salts thereof.

78. A compound according to claim 17, formula (H'') wherein R is n-heptyl, $R^3$ is hydrogen and Z is a cis-double bond, 8R-9-keto-11$\beta$,12$\beta$-difluoromethylene-15$\alpha$-hydroxy-20-ethyl-12$\alpha$-prosta-5-cis, 13-trans-dienoic acid and the methyl ester or pharmaceutically acceptable salts thereof.

79. A compound according to claim 17, formula (H'') wherein R is n-heptyl, $R^3$ is hydrogen and Z is a single bond, 8R-9-keto-11$\beta$,12$\beta$-difluoromethylene-15$\alpha$-hydroxy-20-ethyl-12$\alpha$-prost-13-trans-enoic acid and the methyl ester or pharmaceutically acceptable salts thereof.

80. A compound according to claim 18, formula (J'') wherein R is n-pentyl, $R^3$ is hydrogen and Z is a cis double bond, 8R-11$\beta$,12$\beta$-difluoromethylene-9$\alpha$,15$\alpha$-dihydroxy-8$\beta$,12$\alpha$-prosta-5-cis, 13-trans-dienoic acid and the methyl ester or pharmaceutically acceptable salts thereof.

81. A compound according to claim 18, formula (J'') wherein R is n-pentyl, $R^3$ is hydrogen and Z is a single bond, 8R-11$\beta$,12$\beta$-difluoromethylene-9$\alpha$,15$\alpha$-dihydroxy-8$\beta$, 12$\alpha$-prost-13-trans-enoic acid and the methyl ester or pharmaceutically acceptable salts thereof.

82. A compound according to claim 18, formula (J'') wherein R is n-pentyl, $R^3$ is methyl and Z is a cis double bond, 8R-11$\beta$,12$\beta$-difluoromethylene-15$\beta$-methyl-9$\alpha$,15$\alpha$-dihydroxy-8$\beta$,12$\alpha$-prosta-5-cis,13-trans-dienoic acid and the methyl ester or pharmaceutically acceptable salts thereof.

83. A compound according to claim 18, formula (J'') wherein R is n-pentyl, $R^3$ is methyl and Z is a single bond, 8R-11$\beta$,12$\beta$-difluoromethylene-15$\beta$-methyl-9$\alpha$,15$\alpha$-dihydroxy-8$\beta$,12$\alpha$-prost-13-trans-enoic acid and the methyl ester or pharmaceutically acceptable salts thereof.

84. A compound according to claim 18, formula (J'') wherein R is n-heptyl, $R^3$ is hydrogen and Z is a cis double bond, 8R-11$\beta$,12$\beta$-difluoromethylene-9$\alpha$,15$\alpha$-dihydroxy-20-ethyl-8$\beta$,12$\alpha$-prosta-5-cis,13-trans-dienoic acid and the methyl ester or pharmaceutically acceptable salts thereof.

85. A compound according to claim 18, formula (J'') wherein R is n-heptyl, $R^3$ is hydrogen and Z is a single bond, 8R-11$\beta$,12$\beta$-difluoromethylene-9$\alpha$,15$\alpha$-dihydroxy-20-ethyl-8$\beta$,12$\alpha$-prost-13-trans-enoic acid and the methyl ester or pharmaceutically acceptable salts thereof.

86. A compound according to claim 18, formula (K'') wherein R is n-pentyl, $R^3$ is hydrogen and Z is a cis double bond, 8S-11$\beta$,12$\beta$-difluoromethylene-9$\alpha$,15$\alpha$-dihydroxy-12$\alpha$-prosta-5-cis,13-trans-dienoic acid and the methyl ester or pharmaceutically acceptable salts thereof.

87. A compound according to claim 18, formula (K'') wherein R is n-pentyl, $R^3$ is hydrogen and Z is a single bond, 8S-11$\beta$,12$\beta$-difluoromethylene-9$\alpha$,15$\alpha$-dihydroxy-12$\alpha$-prost-13-trans-enoic acid and the methyl ester or pharmaceutically acceptable salts thereof.

88. A compound according to claim 18, formula (K'') wherein R is n-pentyl, $R^3$ is methyl and Z is a cis double bond, 8S-11$\beta$,12$\beta$-difluoromethylene-15$\beta$-methyl-9$\alpha$,15$\alpha$-dihydroxy-12$\alpha$-prosta-5-cis, 13-trans-dienoic acid and the methyl ester or pharmaceutically acceptable salts thereof.

89. A compound according to claim 18, formula (K'') wherein R is n-pentyl, $R^3$ is methyl and Z is a single bond, 8S-11$\beta$,12$\beta$-difluoromethylene-15$\beta$-methyl-9$\alpha$,15$\alpha$-dihydroxy-12$\alpha$-prost-13-trans-enoic acid and the methyl ester or pharmaceutically acceptable salts thereof.

90. A compound according to claim 18, formula (K'') wherein R is n-heptyl, $R^3$ is hydrogen and Z is a cis double bond, 8S-11$\beta$,12$\beta$-difluoromethylene-9$\alpha$,15$\alpha$-dihydroxy-20-ethyl-12$\alpha$-prosta-5-cis,13-trans-dienoic acid and the methyl ester or pharmaceutically acceptable salts thereof.

91. A compound according to claim 18, formula (K'') wherein R is n-heptyl, $R^3$ is hydrogen and Z is a single bond, 8S-11$\beta$,12$\beta$-difluoromethylene-9$\alpha$,15$\alpha$-dihydroxy-20-ethyl-12$\alpha$-prost-13-trans-enoic acid and the methyl ester or pharmaceutically acceptable salts thereof.

92. A compound according to claim 19 formula (L'') wherein R is n-pentyl, $R^3$ is hydrogen and Z is a cis double bond, 8R-11$\beta$,12$\beta$-difluoromethylene-9$\beta$,15$\alpha$- dihydroxy-8β,12α-prosta-5-cis,13-trans-dienoic acid and the methyl ester or pharmaceutically acceptable salts thereof.

93. A compound according to claim 19, formula (L'') wherein R is n-pentyl, R³ is hydrogen and Z is a single bond, 8R-11β,12β-difluoromethylene-9β,15α-dihydroxy-8β,12α-prost-13-trans-enoic acid and the methyl ester or pharmaceutically acceptable salts thereof.

94. A compound according to claim 19, formula (L'') wherein R is n-pentyl, R³ is methyl and Z is a cis double bond, 8R-11β,12β-difluoromethylene-15β-methyl-9β,15α-dihydroxy-8β,12α-prosta-5-cis,13-trans-dienoic acid and the methyl ester or pharmaceutically acceptable salts thereof.

95. A compound according to claim 19, formula (L'') wherein R is n-pentyl, R³ is methyl and Z is a single bond, 8R-11β,12α-difluoromethylene-15β-methyl-9β,15α-dihydroxy-8β,12α-prost-13-trans-enoic acid and the methyl ester or pharmaceutically acceptable salts thereof.

96. A compound according to claim 19, formula (L'') wherein R is n-heptyl, R³ is hydrogen and Z is a cis double bond, 8R-11β,12β-difluoromethylene-9β,15β-dihydroxy-20-ethyl-8β,12α-prosta-5-cis,13-trans-dienoic acid and the methyl ester or pharmaceutically acceptable salts thereof.

97. A compound according to claim 19, formula (L'') wherein R is n-heptyl, R³ is hydrogen and Z is a single bond, 8R-11β,12β-difluoromethylene-9β,15β-dihydroxy-20-ethyl-8β,12α-prost-13-trans-enoic acid and the methyl ester or pharmaceutically acceptable salts thereof.

98. A compound according to claim 19, formula (M'') wherein R is n-pentyl, R³ is hydrogen and Z is a cis double bond, 8S-11β,12β-difluoromethylene-9β,15β-dihydroxy-12α-prosta-5-cis,13-trans-dienoic acid and the methyl ester or pharmaceutically acceptable salts thereof.

99. A compound according to claim 19, formula (M'') wherein R is n-pentyl, R³ is hydrogen and Z is a single bond, 8S-11β,12β-difluoromethylene-9β,15α-dihydroxy-12α-prost-13-trans-enoic acid and the methyl ester or pharmaceutically acceptable salts thereof.

100. A compound according to claim 19, formula (M'') wherein R is n-pentyl, R³ is methyl and Z is a cis double bond, 8S-11β,12β-difluoromethylene-15β-methyl-9β,15α-dihydroxy-12α-prosta-5-cis,13-trans-dienoic acid and the methyl ester or pharmaceutically acceptable salts thereof.

101. A compound according to claim 19, formula (M'') wherein R is n-pentyl, R³ is methyl and Z is a single bond, 8S-11β,12β-difluoromethylene-15β-methyl-9β,15α-dihydroxy-12α-prost-13-trans-enoic acid and the methyl ester or pharmaceutically acceptable salts thereof.

102. A compound according to claim 19, formula (M'') wherein R is n-heptyl, R³ is hydrogen and Z is a cis double bond, 8S-11β,12β-difluoromethylene-9β,15α-dihydroxy-20-ethyl-12α-prosta-5-cis,13-trans-dienoic acid and the methyl ester or pharmaceutically acceptable salts thereof.

103. A compound according to claim 19, formula (M'') wherein R is n-heptyl, R³ is hydrogen and Z is a Single bond, 8S-11β,12β-difluoromethylene-9β,15α-dihydroxy-20-ethyl-12α-prost-13-trans-enoic acid and the methyl ester or pharmaceutically acceptable salts thereof.

104. The racemic mixture of claim 20 wherein R is n-pentyl, R³ is hydrogen and Z is a cis double bond, 9-keto-11α,12α-difluoromethylene-15β-hydroxyprosta-5-cis,13-trans-dienoic acid and its mirror image, 9-keto-11β,12β-difluoromethylene-15α-hydroxy-8β,12α-prosta-5-cis,13-trans-dienoic acid and the methyl ester or pharmaceutically acceptable salts thereof.

105. The racemic mixture of claim 20 wherein R is n-pentyl, R³ is hydrogen and Z is a single bond, 9-keto-11β,12α-difluoromethylene-15β-hydroxyprost-13-trans-enoic acid and its mirro image, 9-keto-11β,12β-difluoromethylene-15α-hydroxy-8β,12α-prost-13-trans-enoic acid and the methyl ester or pharmaceutically acceptable salts thereof.

106. The racemic mixture of claim 21 wherein R is n-pentyl, R³ is hydrogen and Z is a cis double bond, 9-keto-11α,12α-difluoromethylene-15β-hydroxy-8β-prosta-5-cis-13-trans-dienoic acid and its mirror image, 9-keto-11β,12β-difluoromethylene-15α-hydroxy-12α-prosta-5-cis,13-trans-dienoic acid and the methyl ester or pharmaceutically acceptable salts thereof.

107. The racemic mixture of claim 21, wherein R is n-pentyl, R³ is hydrogen and Z is a single bond, 9-keto-11α,12α-difluoromethylene-15β-hydroxy-8β-prost-13-trans-enoic acid and its mirror image, 9-keto-11β,12β-difluoromethylene-15α-hydroxy-12α-prost-13-trans-enoic acid and the methyl ester or pharmaceutically acceptable salts thereof.

108. The racemic mixture of claim 22 wherein R is n-pentyl, R³ is hydrogen and Z is a cis double bond, 11-α,12α-difluoromethylene-9α,15β-dihydroxyprosta-5-cis,13-trans-dienoic acid and its mirror image, 11β,12β-difluoromethylene-9β,15α-dihydroxy-8β,12α-prosta-5-cis,13-trans-dienoic acid and the methyl ester or pharmaceutically acceptable salts thereof.

109. The racemic mixture of claim 22 wherein in R is n-pentyl, R³ is hydrogen and Z is a single bond, 11α,-12α-difluoromethylene-9α,15β-dihydroxyprost-13-trans-enoic acid and its mirror image, 11β,12β-difluoromethylene-9β,15α-dihydroxy-8β,12α-prost-13-trans-enoic acid and the methyl ester or pharmaceutically acceptable salts thereof.

110. The racemic mixture of claim 23 wherein R is a n-pentyl, R³ is hydrogen and Z is a cis double bond, 11α,12α-difluoromethylene-9α,15β-dihydroxy-8β-prosta-5-cis,13-trans-dienoic acid and its mirror image, 11β,12β-difluoromethylene-9β,15α-dihydroxy-12α-prosta-5-cis,13-trans-dienoic acid and the methyl ester or pharmaceutically acceptable salts thereof.

111. The racemic mixture of claim 23, wherein R is n-pentyl, R³ is hydrogen and Z is a single bond, 11α,12-α-difluoromethylene-9α,15β-dihydroxy-8β-prost-13-trans-enoic acid and its mirror image, 11β,12β-difluoromethylene-9β,15α-dihydroxy-12α-prost-13-trans-enoic acid and the methyl ester or pharmaceutically acceptable salts thereof.

112. The racemic mixture of claim 24 wherein R is n-pentyl, R³ is hydrogen and Z is a cis double bond, 11-α,12α-difluoromethylene-9β,15β-dihydroxyprosta-5-cis-13-trans-dienoic acid and its mirror image, 11β,12-

β-difluoromethylene-9α,15α-dihydroxy-8β,12α-prosta-5-cis,13trans-dienoic acid and the methyl ester pharmaceutically acceptable salts thereof.

113. The racemic mixture of claim 24 wherein R is n-pentyl, $R^3$ is hydrogen and Z is a single bond, 11α,12α-difluoromethylene-9β,15β-dihydroxyprost-13-trans-enoic acid and its mirror image, 11β,12β-difluoromethylene-9α,15α-dihydroxy-8β,12α-prost-13-trans-enoic acid and the methyl ester or pharmaceutically acceptable salts thereof.

114. The racemic mixture of claim 25 wherein R is n-pentyl, $R^3$ is hydrogen and Z is a cis double bond, 11α,12α-difluoromethylene-9β,15β-dihydroxy-8β-prosta-5-cis,13-trans-dienoic acid and its mirror image, 11β,12β-difluoromethylene-9α,15α-dihydroxy-12α-prosta-5-cis,13-trans-dienoic acid and the methyl ester or pharmaceutically acceptable salts thereof.

115. The racemic mixture of claim 25, wherein R is n-pentyl, $R^3$ is hydrogen and Z is a single bond, 11α,12α-difluoromethylene-9β,15β-dihydroxy-8β-prost-13-trans-enoic acid and its mirror image, 11β,12β-difluoromethylene-9α,15α-dihydroxy-12α-prost-13-trans-enoic acid and the methyl ester or pharmaceutically acceptable salts thereof.

116. The racemic mixture of claim 26 wherein R is n-pentyl, $R^3$ is hydrogen and Z is a cis double bond, 9-keto-11β,12β-difluoromethylene-15β-hydroxy-8β,12α-prosta-5-cis,13-trans-dienoic acid and its mirror image, 9-keto-11α,12α-difluoromethylene-15α-hydroxyprosta-5-cis,13-trans-dienoic acid and the methyl ester or pharmaceutically acceptable salts thereof.

117. The racemic mixture of claim 26 wherein R is n-pentyl, $R^3$ is hydrogen and Z is a single bond, 9-keto-11β,12β-difluoromethylene-15β-hydroxy-8β,12α-prost-13-trans-enoic acid and its mirror image, 9-keto-11α,12α-difluoromethylene-15α-hydroxyprost-13-trans-enoic acid and the methyl ester or pharmaceutically acceptable salts thereof.

118. The racemic mixture of claim 27 wherein R is n-pentyl, $R^3$ is hydrogen and Z is a cis double bond, 9-keto-11β,12β-difluoromethylene-15β-hydroxy-12α-prosta-5-cis,13-trans-dienoic acid and its mirror image, 9-keto-11α,12α-difluoromethylene-15α-hydroxy-8β-prosta-5-cis,13-trans-dienoic acid and the methyl ester of pharmaceutically acceptable salts thereof.

119. The racemic mixture of claim 27, wherein R is n-pentyl, $R^3$ is hydrogen and Z is a single bond, 9-keto-11β,12β-difluoromethylene-15β-hydroxy-12α-prost-13-trans-enoic acid and its mirror image, 9-keto-11α,12α-difluoromethylene-15α-hydroxy-8β-prost-13-trans-enoic acid and the methyl ester or pharmaceutically acceptable salts thereof.

120. The racemic mixture of claim 28 wherein R is n-pentyl, $R^3$ is hydrogen and Z is a cis doubld bond 11β,12β-difluoromethylene-9α,15β-dihydroxy-8β,12α-prosta-5-cis-13-trans-dienoic acid and its mirror image, 11α,12α-difluoromethylene-9β,15α-dihydroxyprosta-5-cis,13-trans-dienoic acid and the methyl ester or pharmaceutically acceptable salts thereof.

121. The racemic mixture of claim 28 wherein R is n-pentyl, $R^3$ is hydrogen and Z is a single bond, 11β,12β-difluoromethylene-9α,15β-dihydroxy-8β,12α-prost-13-trans-enoic acid and its mirror image, 11α,12α-difluoromethylene-9β,15α-dihydroxyprost-13-trans-enoic acid and the methyl ester or pharmaceutically acceptable salts thereof.

122. The racemic mixture of claim 29 wherein R is n-pentyl, $R^3$ is hydrogen and Z is a cis double bond, 11β,12β-difluoromethylene-9α,15β-dihydroxy-12α-prosta-5-cis,13-trans-dienoic acid and its mirror image, 11α,12α-difluoromethylene-9β,15α-dihydroxy-8β-prosta-5-cis,13-trans-dienoic acid and the methyl ester or pharmaceutically acceptable salts thereof.

123. The racemic mixture of claim 29, wherein R is n-pentyl, $R^3$ is hydrogen and Z is a single bond, 11β,12β-difluoromethylene-9α,15β-dihydroxy-12α-prost-13-trans-enoic acid and its mirror image, 11α,12α-difluoromethylene-9β,15α-dihydroxy-8β-prost-13-trans-enoic acid and the methyl ester or pharmaceutically acceptable salts thereof.

124. The racemic mixture of claim 30 wherein R is n-pentyl, $R^3$ is hydrogen and Z is a cis double bond, 11β,12β-difluoromethylene-9β,15β-dihydroxy-8β,12α-prosta-5-cis-13-trans-dienoic acid and its mirror image, 11α,12α-difluoromethylene-9α,15α-dihydroxyprosta-5-cis,13-trans-dienoic acid and the methyl ester or pharmaceutically acceptable salts thereof.

125. The racemic mixture of claim 30 wherein R is n-pentyl, $R^3$ is hydrogen and Z is a single bond, 11β,12β-difluoromethylene-9β,15β-dihydroxy-8β,12α-prost-13-trans-enoic acid and its mirror image, 11α,12α-difluoromethylene-9α,15α-dihydroxyprost-13-trans-enoic acid and the methyl ester or pharmaceutically acceptable salts thereof.

126. The racemic mixture of claim 31 wherein in R is n-pentyl, $R^3$ is hydrogen and Z is a cis double bond, 11β,12β-difluoromethylene-9β,15β-dihydroxy-12α-prosta-5-cis-13-trans-dienoic acid and its mirror image, 11α,12α-difluoromethylene-9α,15α-dihydroxy-8β-prosta-5-cis,13-trans-dienoic acid and the methyl ester or pharmaceutically acceptable salts thereof.

127. The racemic mixture of claim 31, wherein R is n-pentyl, $R^3$ is hydrogen and Z is a single bond, 11β,12β-difluoromethylene-9β,15β-dihydroxy-12α-prost-13-trans-enoic acid and its mirror image, 11α,12α-difluoromethylene-9α,15α-dihydroxy-8β-prost-13-trans-enoic acid and the methyl ester or pharmaceutically acceptable salts thereof.

* * * * *

PO-1050
(5/69)

UNITED STATES PATENT OFFICE
CERTIFICATE OF CORRECTION

Patent No. 3,867,423      Dated February 18, 1975

Inventor(s) PIERRE CRABBE

It is certified that error appears in the above-identified patent and that said Letters Patent are hereby corrected as shown below:

Column 1, line 59, "95" should read --- 93 ---. Column 8, line 11, "(C")" should read --- (C") and ---. Column 33, line 44, after "XV-C," should read --- XVI-C ---. Column 38, line 35, "as" should read --- is ---. Column 50, line 18, "12α" should read --- 12β--- and "15β" should read --- 15α ---. Column 57, line 26, "15α" should read 15β ---. Column 59, line 55, "-15-" should read --- -15α- ---. Column 59, line 61, "3" should read --- 8 ---. Column 65, line 28, "orist" should read --- prost ---. Column 65, line 66, "1'β" should read --- 1'α ---. Column 68, line 1, "ketone" should read --- keto ---. Column 68, line 61, "bisnor" should read --- bis-nor ---. Column 72, line 18, "qcid" should read --- acid ---. Column 73, lines 9 and 10, "difluoromethylene-15β-methyl-15β-methyl-" should read --- difluoromethylene-15β-methyl- ---. Column 73, line 47, "12β" should read --- 12α ---. Column 74, line 33, "temperature is then evaporated" should read --- temperature for one hour. It is then evaporated ---. Column 89, Claim 50, line 11, "8RL" should read --- 8R ---. Column 89, Claim 56, line 45, "R Is" should read --- R is ---. Column 90, Claim 61, line 8, "1(E")" should read --- (E") ---. Column 93, Claim 95, line 18, "12α" should read --- 12β ---. Column 93, Claim 97, line 32, "15β" should read --- 15α ---. Column 93, Claim 98, line 38, "15β" should read --- 15α ---. Column 94, Claim 105, line 15 and 16, "11β" should read --- 11α --- and line 16 "mirro" should read --- mirror ---. Column 94, Claim 110, line 50, "a n-pentyl" should read --- n-pentyl ---. Column 95, Claim 112, line 2, "13trans" should read --- 13-trans ---. Column 95, Claim 120, line 56, "doubld" should read --- double ---. Column 96, Claim 126, line 41, "wherein in R" should read --- wherein R ---.

Signed and Sealed this twenty-seventh Day of April 1976

[SEAL]

Attest:

RUTH C. MASON
Attesting Officer

C. MARSHALL DANN
Commissioner of Patents and Trademarks